(12) United States Patent
Matake et al.

(10) Patent No.: US 11,433,350 B2
(45) Date of Patent: Sep. 6, 2022

(54) CARBON DIOXIDE RECOVERY SYSTEM, THERMAL POWER GENERATION FACILITY, AND CARBON DIOXIDE RECOVERY METHOD

(71) Applicant: MITSUBISHI HEAVY INDUSTRIES, LTD., Tokyo (JP)

(72) Inventors: Norihisa Matake, Tokyo (JP); Kouji Horizoe, Tokyo (JP); Hideyuki Uechi, Tokyo (JP); Shigenori Suemori, Tokyo (JP); Takuya Hirata, Tokyo (JP); Yasutaka Aoki, Tokyo (JP); Tatsuo Ishiguro, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 746 days.

(21) Appl. No.: 16/319,664

(22) PCT Filed: Oct. 17, 2017

(86) PCT No.: PCT/JP2017/037459
§ 371 (c)(1),
(2) Date: Jan. 22, 2019

(87) PCT Pub. No.: WO2018/074443
PCT Pub. Date: Apr. 26, 2018

(65) Prior Publication Data
US 2021/0299609 A1    Sep. 30, 2021

(30) Foreign Application Priority Data

Oct. 19, 2016 (JP) .............................. JP2016-205074
Oct. 26, 2016 (JP) .............................. JP2016-209767
(Continued)

(51) Int. Cl.
*B01D 53/62* (2006.01)
*H01M 8/06* (2016.01)
(Continued)

(52) U.S. Cl.
CPC .......... *B01D 53/62* (2013.01); *B01D 53/1493* (2013.01); *B01D 53/343* (2013.01);
(Continued)

(58) Field of Classification Search
CPC ...... H01M 8/04; H01M 8/04223; H01M 8/06; B01F 3/04; B01F 23/23
See application file for complete search history.

(56) References Cited

U.S. PATENT DOCUMENTS 4,921,765 A * 5/1990 Gmeindl ............. H01M 8/0662
429/411
5,554,453 A * 9/1996 Steinfeld ............. H01M 8/0643
429/415
(Continued)

FOREIGN PATENT DOCUMENTS

JP       05-283090       10/1993
JP       09-320620       12/1997
(Continued)

OTHER PUBLICATIONS

The Office Action dated Apr. 7, 2020 in counterpart JP application No. 2018-546341 with Machine Translation.
(Continued)

*Primary Examiner* — Robert A Hopkins
(74) *Attorney, Agent, or Firm* — Wenderoth, Lind & Ponack, L.L.P.

(57) ABSTRACT

A carbon dioxide recovery system for collecting carbon dioxide from an exhaust gas generated in a facility including a combustion device includes: a first exhaust gas passage through which the exhaust gas containing carbon dioxide
(Continued)

flows; a fuel cell including an anode, a cathode disposed on the first exhaust gas passage so that the exhaust gas from the first exhaust gas passage is supplied to the cathode, and an electrolyte transferring, from the cathode to the anode, a carbonate ion derived from carbon dioxide contained in the exhaust gas from the first exhaust gas passage; and a second exhaust gas passage diverging from the first exhaust gas passage upstream of the cathode so as to bypass the cathode. A part of the exhaust gas is introduced to the second exhaust gas passage.

19 Claims, 23 Drawing Sheets

(30) Foreign Application Priority Data

| Jan. 20, 2017 | (JP) | JP2017-008408 |
| Jan. 20, 2017 | (JP) | JP2017-008409 |
| Jan. 27, 2017 | (JP) | JP2017-012938 |

(51) Int. Cl.

| B01D 53/14 | (2006.01) |
| B01D 53/34 | (2006.01) |
| B01D 53/50 | (2006.01) |
| B01D 53/78 | (2006.01) |
| F01K 11/02 | (2006.01) |
| F01K 23/10 | (2006.01) |
| H01M 8/04746 | (2016.01) |

(52) U.S. Cl.
CPC .............. *B01D 53/50* (2013.01); *B01D 53/78* (2013.01); *F01K 11/02* (2013.01); *F01K 23/10* (2013.01); *H01M 8/04761* (2013.01); *H01M 8/06* (2013.01); *B01D 2252/204* (2013.01); *B01D 2257/302* (2013.01); *B01D 2257/504* (2013.01); *B01D 2258/0283* (2013.01)

(56) References Cited

U.S. PATENT DOCUMENTS

| 2012/0318141 A1 | 12/2012 | Tsujiuchi et al. |
| 2014/0102096 A1 | 4/2014 | Yonekawa et al. |
| 2014/0260310 A1* | 9/2014 | Berlowitz ................. C25B 3/23 60/780 |
| 2014/0272619 A1 | 9/2014 | Berlowitz et al. |
| 2014/0373720 A1 | 12/2014 | Nakagawa et al. |
| 2017/0106332 A1 | 4/2017 | Hirata et al. |
| 2017/0114718 A1 | 4/2017 | Iijima |

FOREIGN PATENT DOCUMENTS

| JP | 2006-196268 | 7/2006 |
| JP | 4216152 | 1/2009 |
| JP | 2011-173047 | 9/2011 |
| JP | 2013-158685 | 8/2013 |
| JP | 2015-136687 | 7/2015 |
| JP | 2015-218634 | 12/2015 |
| JP | 2016-511526 | 4/2016 |
| JP | 2016-512917 | 5/2016 |
| JP | 2016-513866 | 5/2016 |
| JP | 2016-515297 | 5/2016 |
| WO | 2014/058007 | 4/2014 |

OTHER PUBLICATIONS

International Search Report dated Jan. 23, 2018 in International (PCT) Application No. PCT/JP2017/037459 with English translation.

International Preliminary Report on Patentability and Written Opinion of the International Searching Authority dated Apr. 23, 2019 in International (PCT) Application No. PCT/JP2017/037459 with English translation.

\* cited by examiner

CARBON DIOXIDE RECOVERY SYSTEM, THERMAL POWER GENERATION FACILITY, AND CARBON DIOXIDE RECOVERY METHOD

TECHNICAL FIELD

The present disclosure relates to a carbon dioxide recovery system, a thermal power generation facility, and a carbon dioxide recovery method.

BACKGROUND ART

Carbon dioxide ($CO_2$) produced by burning carbon-containing fuels such as petroleum, natural gas, and coal is a greenhouse gas which affects global warming. To suppress release of carbon dioxide into the atmosphere, many techniques have been proposed for recovering carbon dioxide from exhaust gas of a thermal power generation facility or the like.

For instance, Patent Document 1 discloses a power generation system for recovering $CO_2$ in exhaust gas from a gas turbine by using a molten carbonate fuel cell. In this power generation system, exhaust gas containing $CO_2$ from the gas turbine is supplied to the cathode of the molten carbonate fuel cell, and $CO_2$ in the exhaust gas is transferred from the cathode to the anode by reaction in the fuel cell. Then, $CO_2$ is separated by a separator from the anode output stream containing $CO_2$ and $H_2O$.

CITATION LIST

Patent Literature

Patent Document 1: 2016-511526A

SUMMARY

Problems to be Solved

The power generation system disclosed in Patent Document 1 applies fuel cells to a gas turbine or the like and thereby enables generation of electric power while recovering carbon dioxide in exhaust gas, which can contribute to an improvement in energy efficiency of the entire plant. On the other hand, for stable operation of the fuel cells, it is necessary to supply exhaust gas within an appropriate flow rate range to the fuel cells. Thus, the fuel cells are difficult to respond to the change in exhaust gas flow rate from an exhaust gas generation facility such as a gas turbine.

In this regard, Patent Document 1 fails to disclose that exhaust gas is treated in accordance with the change in exhaust gas flow rate from an exhaust gas generation facility.

In view of the above, an object of at least one embodiment of the present invention is to provide a carbon dioxide recovery system, a thermal power generation facility, and a carbon dioxide recovery method whereby it is possible to suppress the reduction in energy efficiency of the entire plant while responding to the change in exhaust gas flow rate.

Solution to the Problems (1) According at least one embodiment of the present invention, a carbon dioxide recovery system for collecting carbon dioxide from an exhaust gas generated in a facility including a combustion device comprises: a first exhaust gas passage through which the exhaust gas containing carbon dioxide flows; a fuel cell including an anode, a cathode disposed on the first exhaust gas passage so that the exhaust gas from the first exhaust gas passage is supplied to the cathode, and an electrolyte transferring, from the cathode to the anode, a carbonate ion derived from carbon dioxide contained in the exhaust gas from the first exhaust gas passage; and a second exhaust gas passage diverging from the first exhaust gas passage upstream of the cathode so as to bypass the cathode, in which a part of the exhaust gas is introduced to the second exhaust gas passage.

As described above, although a fuel cell enables generation of electric power while recovering carbon dioxide and thus can contribute to an improvement in energy efficiency of the entire plant, the fuel cell is difficult to respond to the change in exhaust gas flow rate.

In this regard, in the above configuration (1), the cathode of the fuel cell is disposed on the first exhaust gas passage, and a part of exhaust gas is introduced to the second exhaust gas passage diverging from the first exhaust gas passage so as to bypass the fuel cell (cathode). Thereby, it is possible to supply a part of exhaust gas from the facility including the combustion device to the fuel cell at a flow rate within a range acceptable by the fuel cell, and it is possible to introduce the rest of exhaust gas into the second exhaust gas passage for some use or treatment. Thus, it is possible to recover carbon dioxide while suppressing the reduction in energy efficiency of the entire plant, while responding to the change in exhaust gas flow rate in accordance with load fluctuation of the exhaust gas generation facility.

(2) In some embodiments, in the above configuration (1), a treatment flow rate of the exhaust gas during rated operation of the fuel cell is smaller than a total flow rate of the exhaust gas during rated operation of the facility.

If fuel cells that can treat the total amount of exhaust gas at rated load of the facility including the combustion device are provided, stable operation of the fuel cells cannot be maintained during partial load operation of the facility. Thus, it becomes necessary to stop the operation of a part of the fuel cell (hot standby). In this case, problems are raised in terms of lost profits with the reduction in power generation due to operation stop of a part of the fuel cell or installation cost of the fuel cell that is not operated.

In this regard, the above configuration (2) uses the fuel cell having rated output power lower than the capacity necessary for treating the total flow rate of exhaust gas at rated load of the facility, which makes it possible to easily respond to the reduction in exhaust gas flow rate while maintaining stable operation of the fuel cell, even during partial load operation of the facility.

(3) In some embodiments, in the above configuration (1) or (2), the following relationship is satisfied: $F^*_{min} F_{FC\_RATED} \leq F^*max$, where $F_{FC\_RATED}$ is a treatment flow rate of the exhaust gas during rated operation of the fuel cell, F*min is a total flow rate of the exhaust gas during operation at 30% load of the facility including the combustion device, and F*max is a total flow rate of the exhaust gas during operation at 80% load of the facility.

A typical example of the facility including a combustion device is a thermal power generation device. The load of the thermal power generation device can change, for instance, within a load range of 40% to 100% in response to the demand from a utility grid. In this case, as in the above configuration (3), if the exhaust gas treatment flow rate $F_{FC\_RATED}$ during rated operation of the fuel cell is set to satisfy the above relational expression, it is possible to easily respond to the reduction in exhaust gas flow rate while maintaining stable operation of the fuel cell, even during partial load operation of the facility including the combustion device.

(4) In some embodiments, in any one of the above configurations (1) to (3), the carbon dioxide recovery system further comprises a flow rate adjustment part for adjusting a first flow rate of the exhaust gas supplied to the cathode via the first exhaust gas passage.

With the above configuration (4), the amount (first flow rate) of exhaust gas supplied to the cathode of the fuel cell is adjusted by the flow rate adjustment part. Thus, the first flow rate can be appropriately adjusted by the flow rate adjustment part even when the total flow rate of exhaust gas changes, which makes it possible to maintain an appropriate operating state (e.g., temperature) of the fuel cell. Further, in a case where the current between the anode and the cathode needs to be decreased with the reduction in voltage due to degradation of the fuel cell, it is possible to maintain the fuel cell in an appropriate temperature range by decreasing the exhaust gas supply amount (first flow rate) to the cathode.

(5) In some embodiments, in the above configuration (4), the carbon dioxide recovery system further comprises a control part for controlling the flow rate adjustment part, and the control part is configured to control the flow rate adjustment part so that the first flow rate is kept constant at a rated flow rate of the fuel cell in at least a partial load range of the facility including the combustion device, regardless of magnitude of load of the facility.

If the total flow rate of exhaust gas changes with load fluctuation of the facility including the combustion device, the exhaust gas supply amount (first flow rate) to the cathode of the fuel cell also changes accordingly, which can cause the first flow rate to deviate from the target flow rate range in which the fuel cell can operate stably.

In this regard, with the above configuration (5), it is possible to keep the first flow rate constant at the rated flow rate during operation of the facility in at least a partial load range, regardless of the magnitude of the load of the facility. Thus, even if the load of the facility changes, it is possible to maintain stable operation of the fuel cell.

(6) In some embodiments, in the above configuration (4) or (5), the flow rate adjustment part includes a damper disposed on the first exhaust gas passage or the second exhaust gas passage, and the first exhaust gas passage and the second exhaust gas passage are disposed independently of each other at least upstream of an installation position of the damper.

In the above configuration (6), the first exhaust gas passage for supplying exhaust gas to the cathode of the fuel cell and the second exhaust gas passage bypassing the fuel cell (cathode) are disposed independently of each other upstream of an installation position of the damper. Thus, through adjustment of the opening degree of the damper, it is possible to appropriately distribute exhaust gas into the first exhaust gas passage and the second exhaust gas passage.

(7) In some embodiments, in any one of the above configurations (1) to (6), the facility is a gas turbine, and the cathode of the fuel cell is disposed downstream of the gas turbine and upstream of a first waste heat recovery boiler for recovering exhaust heat of the gas turbine, the second exhaust gas passage bypasses the cathode and is connected to a second waste heat recovery boiler for recovering exhaust heat of the gas turbine, and a part of the exhaust gas of the gas turbine is introduced to the second waste heat recovery boiler via the second exhaust gas passage at least during rated operation of the gas turbine.

With the above configuration (7), exhaust gas of the gas turbine with a relatively-high temperature (e.g., 600 to 650° C.) before passing through the first waste heat recovery boiler is introduced to the fuel cell, and thereby it is possible to operate the fuel cell stably at the appropriate temperature. Further, since a part of exhaust gas of the gas turbine is directly introduced to the second waste heat recovery boiler by bypassing the cathode via the second exhaust gas passage, it is easy to maintain stable operation of the fuel cell even if the exhaust gas flow rate changes with load fluctuation.

(8) In some embodiments, in the above configuration (7), the carbon dioxide recovery system further comprises a chemical absorption tower disposed on the second exhaust gas passage downstream of the second waste heat recovery boiler and having an absorption liquid for absorbing carbon dioxide contained in the exhaust gas from the second waste heat recovery boiler. The first exhaust gas passage and the second exhaust gas passage are disposed independently of each other so as to prevent the exhaust gas flowing through the first exhaust gas passage from mixing with the exhaust gas flowing from the second waste heat recovery boiler to the chemical absorption tower through the second exhaust gas passage, on a downstream side of the first waste heat recovery boiler.

With the above configuration (8), exhaust gas having passed through the second waste heat recovery boiler with a relatively-low temperature is introduced to the chemical absorption tower, which improves the recovery efficiency of carbon dioxide in the chemical absorption tower. Further, since the first exhaust gas passage and the second exhaust gas passage are disposed independently of each other, it is possible to prevent $CO_2$-poor exhaust gas in the first exhaust gas passage, having passed through the cathode, from mixing with $CO_2$-rich exhaust gas in the second exhaust gas passage to be introduced to the chemical absorption tower. Thus, it is possible to improve the efficiency of separating carbon dioxide in the chemical absorption tower.

(9) In some embodiments, in the above configuration (7) or (8), a first heat exchanger disposed on a most upstream side in the first waste heat recovery boiler obtains a heating medium having higher temperature than that a second heat exchanger disposed on a most upstream side in the second waste heat recovery boiler obtains by heat exchange.

Exhaust gas having passed through the cathode of the fuel cell generally becomes warmer than exhaust gas discharged from the gas turbine, due to heat of reaction in the fuel cell. Accordingly, the inlet temperature is higher in the first waste heat recovery boiler, into which exhaust gas having passed through the cathode of the fuel cell flows than in the second waste heat recovery boiler, into which exhaust gas bypassing the cathode flows. Thus, as in the above configuration (9), if the system is configured so that the first heat exchanger disposed on the most upstream side in the first waste heat recovery boiler obtains a heating medium having higher temperature than that the second heat exchanger disposed on the most upstream side in the second waste heat recovery boiler obtains, it is possible to make use of exhaust heat and improve the energy efficiency of the entire plant.

(10) In some embodiments, in any one of the above configurations (7) to (9), the carbon dioxide recovery system further comprises a flow rate adjustment part for adjusting a first flow rate of the exhaust gas supplied to the cathode via the first exhaust gas passage. The first waste heat recovery boiler and the second waste heat recovery boiler include: a common duct; and a partition wall disposed in the common duct so that at least an upstream region of the common duct is divided into a first portion at least partially forming the first exhaust gas passage and a second portion at least partially forming the second exhaust gas passage. The flow rate adjustment part includes a damper disposed on the first portion or the second portion of the common duct.

With the above configuration (10), with a simple configuration in which the damper is provided in the duct of the waste heat recovery boiler, it is possible to appropriately adjust the first flow rate to appropriately distribute the exhaust gas flow rate to the first portion of the duct at least partially forming the first exhaust gas passage and the second portion at least partially forming the second exhaust gas passage.

(11) In some embodiments, in any one of the above configurations (7) to (10), the carbon dioxide recovery system further comprises: a chemical absorption tower disposed on the second exhaust gas passage and having an absorption liquid for absorbing carbon dioxide contained in the exhaust gas flowing through the second exhaust gas passage; and a regeneration tower configured to heat the absorption liquid by steam generated by thermal energy recovered from the exhaust gas at the first waste heat recovery boiler or the second waste heat recovery boiler to regenerate the absorption liquid.

With the above configuration (11), exhaust gas having passed through the second waste heat recovery boiler with a relatively-low temperature is introduced to the chemical absorption tower, which improves the recovery efficiency of carbon dioxide in the chemical absorption tower. Further, since steam generated by thermal energy recovered from exhaust gas at the waste heat recovery boiler is used for regeneration of the absorption liquid, it is possible to improve the energy efficiency of the entire plant.

(12) In some embodiments, in any one of the above configurations (7) to (11), the carbon dioxide recovery system further comprises: a compressor for compressing at least carbon dioxide recovered at the anode by the fuel cell; and a steam turbine for driving the compressor. The steam turbine is configured to be driven by steam generated by thermal energy recovered from the exhaust gas at the first waste heat recovery boiler or the second waste heat recovery boiler.

With the above configuration (12), since steam generated by thermal energy recovered from exhaust gas at the waste heat recovery boiler is used as power source of the steam turbine for driving the compressor compressing carbon dioxide recovered by the fuel cell, it is possible to improve the energy efficiency of the entire plant.

(13) In some embodiments, in any one of the above configurations (1) to (6), the carbon dioxide recovery system further comprises a chemical absorption tower disposed on the second exhaust gas passage and having an absorption liquid for absorbing carbon dioxide contained in the exhaust gas supplied from the second exhaust gas passage.

For recovering $CO_2$ with the chemical absorption tower, for instance, the absorption liquid comes into contact with exhaust gas in the chemical absorption tower, and $CO_2$ contained in the exhaust gas is absorbed into the absorption liquid. An amine absorption liquid absorbing $CO_2$ is regenerated by steam stripping at the absorption liquid regeneration tower. At this time, $CO_2$ is separated from the absorption liquid. $CO_2$ thus separated from the absorption liquid is recovered as gas.

Such $CO_2$ recovery technique using the chemical absorption tower can respond to the change in exhaust gas flow rate through adjustment of the circulation amount of the absorption liquid, for instance. On the other hand, this technique requires large energy to regenerate $CO_2$ from the absorption liquid and thus reduces the energy efficiency of the entire plant. By contrast, the fuel cell can generate electric power while recovering carbon dioxide and thus suppress the reduction in energy efficiency of the entire plant, although it is difficult to respond to the change in exhaust gas flow rate.

In this regard, with the above configuration (13), the cathode of the fuel cell is disposed on the first exhaust gas passage, and the chemical absorption tower is disposed on the second exhaust gas passage diverging from the first exhaust gas passage, so that the fuel cell and the chemical absorption tower are arranged in parallel. Thus, exhaust gas is distributed to the chemical absorption tower and the fuel cell to operate both components. By this means, it is possible to suppress the reduction in energy efficiency of the entire plant while responding to the change in exhaust gas flow rate.

(14) In some embodiments, in the above configuration (13), the absorption liquid contains amine.

With the above configuration (14), the use of the absorption liquid containing amine having high chemical reactivity with carbon dioxide enables carbon dioxide to be effectively recovered even if carbon dioxide in exhaust gas has a low partial pressure.

(15) In some embodiments, in any one of the above configurations (1) to (14), the carbon dioxide recovery system further comprises a heat exchanger for heat exchange between the exhaust gas on an inlet side of the cathode in the first exhaust gas passage and the exhaust gas on an outlet side of the cathode in the first exhaust gas passage.

With the above configuration (15), even if exhaust gas from the thermal power generation device or the like has a relatively-low temperature, it is possible to supply the exhaust gas to the cathode after heated by heat exchange with exhaust gas on the cathode outlet side having a high temperature due to reaction heat caused in the fuel cell. Thus, it is possible to make use of thermal energy generated at the fuel cell to keep the appropriate temperature of the fuel cell for stable operation.

(16) In some embodiments, in any one of the above configurations (1) to (15), the carbon dioxide recovery system further comprises a desulfurization device disposed on the first exhaust gas passage upstream of a branch point between the first exhaust gas passage and the second exhaust gas passage, the desulfurization device being configured to remove sulfur contents contained in the exhaust gas.

With the above configuration (16), since the desulfurization device (e.g., high-level desulfurization gas cooling tower) is disposed on the first exhaust gas passage upstream of the branch point, the fuel cell and the chemical absorption tower can share the desulfurization device for pre-treatment. Thus, it is possible to suppress the reduction in performance of the fuel cell and the chemical absorption tower due to sulfur contents contained in exhaust gas while reducing the installation cost of the desulfurization device.

(17) In some embodiments, in any one of the above configurations (1) to (16), the carbon dioxide recovery system further comprises a dust removal device disposed on the first exhaust gas passage downstream of a branch point between the first exhaust gas passage and the second exhaust gas passage and upstream of the cathode, the dust removal device being configured to remove soot and dust in the exhaust gas to be supplied to the cathode.

With the above configuration (17), since the dust removal device is disposed downstream of the branch point and upstream of the cathode of the fuel cell, it is possible to supply exhaust gas from which soot and dust are removed to the cathode, and thus it is possible to suppress the reduction in performance of the fuel cell due to soot and dust in exhaust gas.

(18) According to at least one embodiment of the present invention, a steam turbine facility comprises: a thermal power generation device which is a facility including a combustion device; and the carbon dioxide recovery system according to any one of the above (1) to (17) configured to recover carbon dioxide contained in an exhaust gas from the thermal power generation device.

With the above configuration (18), the cathode of the fuel cell is disposed on the first exhaust gas passage, and a part of exhaust gas is introduced to the second exhaust gas passage diverging from the first exhaust gas passage so as to bypass the fuel cell (cathode). Thereby, it is possible to supply a part of exhaust gas from the facility including the combustion device to the fuel cell at a flow rate within a range acceptable by the fuel cell, and it is possible to introduce the rest of exhaust gas into the second exhaust gas passage for some use or treatment. Thus, it is possible to recover carbon dioxide while suppressing the reduction in energy efficiency of the entire plant, while responding to the change in exhaust gas flow rate in accordance with load fluctuation of the thermal power generation device.

(19) According to at least one embodiment of the present invention, a carbon dioxide recovery method for recovering carbon dioxide from an exhaust gas generated in a facility including a combustion device comprises the steps of: supplying the exhaust gas containing carbon dioxide to a cathode of a fuel cell; transferring a carbonate ion derived from carbon dioxide contained in the exhaust gas from the cathode to an anode of the fuel cell through an electrolyte of the fuel cell; and guiding a part of the exhaust gas of the facility so as to bypass the cathode.

With the above method (19), since a part of exhaust gas from the facility including the combustion device bypasses the fuel cell (cathode), it is possible to supply a part of exhaust gas from the facility including the combustion device to the fuel cell at a flow rate within a range acceptable by the fuel cell, and it is possible to use or treat the rest of exhaust gas separately. Thus, it is possible to recover carbon dioxide while suppressing the reduction in energy efficiency of the entire plant, while responding to the change in exhaust gas flow rate in accordance with load fluctuation of the exhaust gas generation facility.

(20) In some embodiments, in the above method (19), a treatment flow rate of the exhaust gas during rated operation of the fuel cell is smaller than a total flow rate of the exhaust gas during rated operation of the facility.

With the above method (20), using the fuel cell having rated output power lower than the capacity necessary for treating the total flow rate of exhaust gas at rated load of the facility, it is possible to easily respond to the reduction in exhaust gas flow rate while maintaining stable operation of the fuel cell, even during partial load operation of the facility.

(21) In some embodiments, in the above method (19) or (20), the following relationship is satisfied: $F^*_{min} \leq F_{FC\_RATED} \leq F^*_{max}$, where $F_{FC\_RATED}$ is a treatment flow rate of the exhaust gas during rated operation of the fuel cell, $F^*_{min}$ is a total flow rate of the exhaust gas during operation at 30% load of a thermal power generation device which is the facility, and $F^*_{max}$ is a total flow rate of the exhaust gas during operation at 80% load of the thermal power generation device.

The load of the thermal power generation device, which is an example of the facility including the combustion device, can change, for instance, within a load range of 40% to 100% in response to the demand from a utility grid. In this case, as in the above configuration (21), if the exhaust gas treatment flow rate $F_{FC\_RATED}$ during rated operation of the fuel cell is set to satisfy the above relational expression, it is possible to easily respond to the reduction in exhaust gas flow rate while maintaining stable operation of the fuel cell, even during partial load operation of the facility including the combustion device.

(22) In some embodiments, in any one of the above methods (19) to (21), the method further comprises keeping a first flow rate of the exhaust gas supplied to the cathode constant at a rated flow rate of the fuel cell in at least a partial load range of the facility, regardless of magnitude of load of the facility.

If the total flow rate of exhaust gas changes with load fluctuation of the facility including the combustion device, the exhaust gas supply amount (first flow rate) to the cathode of the fuel cell also changes accordingly, which can cause the first flow rate to deviate from the target flow rate range in which the fuel cell can operate stably.

In this regard, with the above method (22), it is possible to keep the first flow rate constant at the rated flow rate during operation of the facility in at least a partial load range, regardless of the magnitude of the load of the facility. Thus, even if the load of the facility changes, it is possible to maintain stable operation of the fuel cell.

(23) In some embodiments, in any one of the above methods (19) to (22), the facility is a gas turbine, and the method further comprises: introducing a first exhaust gas discharged from the gas turbine and having passed through the cathode of the fuel cell to a first waste heat recovery boiler to recover exhaust heat at the first waste heat recovery; and at least during rated operation of the gas turbine, introducing a second exhaust gas discharged from the gas turbine and bypassing the cathode to a second waste heat recovery boiler to recover exhaust heat at the second waste heat recovery boiler.

With the above method (23), exhaust gas of the gas turbine with a relatively-high temperature (e.g., 600 to 650° C.) before passing through the first waste heat recovery boiler is introduced to the fuel cell, and thereby it is possible to operate the fuel cell stably at the appropriate temperature. Further, since a part of exhaust gas of the gas turbine is directly introduced to the second waste heat recovery boiler by bypassing the cathode, it is easy to maintain stable operation of the fuel cell even if the exhaust gas flow rate changes with load fluctuation.

(24) In some embodiments, in the above method (23), the method further comprises introducing the second exhaust gas from the second waste heat recovery boiler to a chemical absorption tower so that carbon dioxide contained in the second exhaust gas is absorbed to an absorption liquid in the chemical absorption tower, and the first exhaust gas is introduced through a first exhaust gas passage while the second exhaust gas is introduced through a second exhaust gas passage disposed independently of the first exhaust gas passage to prevent the second exhaust gas introduced to the chemical absorption tower from mixing with the first exhaust gas.

With the above method (24), exhaust gas having passed through the second waste heat recovery boiler with a relatively-low temperature is introduced to the chemical absorption tower, which improves the recovery efficiency of carbon dioxide in the chemical absorption tower. Further, since the first exhaust gas passage and the second exhaust gas passage are disposed independently of each other, it is possible to prevent $CO_2$-poor exhaust gas in the first exhaust gas passage, having passed through the cathode, from mixing with $CO_2$-rich exhaust gas in the second exhaust gas passage to be introduced to the chemical absorption tower. Thus, it is possible to improve the efficiency of separating carbon dioxide in the chemical absorption tower.

(25) In some embodiments, in any one of the above methods (19) to (22), the method further comprises: supplying a part of the exhaust gas containing carbon dioxide to the cathode of the fuel cell; introducing a remaining part of the exhaust gas to a chemical absorption tower; and having carbon dioxide in the remaining part of the exhaust gas absorbed in an absorption liquid in the chemical absorption tower.

With the above method (25), a part of exhaust gas is supplied to the cathode of the fuel cell, and the rest of exhaust gas is introduced to the chemical absorption tower. Thus, the exhaust gas is treated by the fuel cell and the chemical absorption tower in parallel. Thus, it is possible to suppress the reduction in energy efficiency of the entire plant, while responding to the change in exhaust gas flow rate.

(26) In some embodiments, in the above method (25), the absorption liquid contains amine.

With the above method (26), the use of the absorption liquid containing amine having high chemical reactivity with carbon dioxide enables carbon dioxide to be effectively recovered even if carbon dioxide in exhaust gas has a low partial pressure.

(27) In some embodiments, in any one of the above methods (19) to (26), the method further comprises performing heat exchange between the exhaust gas on an inlet side of the cathode and the exhaust gas on an outlet side of the cathode.

With the above method (27), even if exhaust gas from the thermal power generation device or the like has a relatively-low temperature, it is possible to supply the exhaust gas to the cathode after heated by heat exchange with exhaust gas on the cathode outlet side having a high temperature due to reaction heat caused in the fuel cell. Thus, it is possible to make use of thermal energy generated at the fuel cell to keep the appropriate temperature of the fuel cell for stable operation.

(28) In some embodiments, in any one of the above methods (19) to (27), the method further comprises: dividing the exhaust gas into a part of the exhaust and a remaining part of the exhaust gas; and removing sulfur contents contained in the exhaust gas before dividing.

With the above method (28), since sulfur contents contained in exhaust gas are removed before dividing, it is possible to correctively remove sulfur contents contained exhaust gas before dividing, instead of removing sulfur contents in a part of the exhaust gas supplied to the fuel cell and the rest of exhaust gas supplied to the chemical absorption tower separately after dividing. Thus, it is possible to suppress the reduction in performance of the fuel cell and the chemical absorption tower due to sulfur contents contained in exhaust gas while reducing the cost of desulfurization.

(29) In some embodiments, in any one of the above methods (19) to (28), the method further comprises removing soot and dust contained in the part of the exhaust gas supplied to the cathode upstream of the cathode.

With the above configuration (29), since dust and soot contained in a part of exhaust gas supplied to the fuel cell are removed upstream of the cathode of the fuel cell, it is possible to supply exhaust gas from which soot and dust are removed to the cathode. Thus, it is possible to suppress the reduction in performance of the fuel cell due to soot and dust in exhaust gas.

Advantageous Effects

According to at least one embodiment of the present invention, there is provided a carbon dioxide recovery system, a thermal power generation facility, and a carbon dioxide recovery method whereby it is possible to suppress the reduction in energy efficiency of the entire plant while responding to the change in exhaust gas flow rate.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

First, an overview of a carbon dioxide recovery system according to some embodiments will be described. The carbon dioxide recovery system according to the present invention can be applied to, besides a thermal power generation facility including a gas turbine described below, various facilities that produce exhaust gas containing carbon dioxide, including a combustion device (e.g., boiler, gas turbine, or engine).

Figure 1:
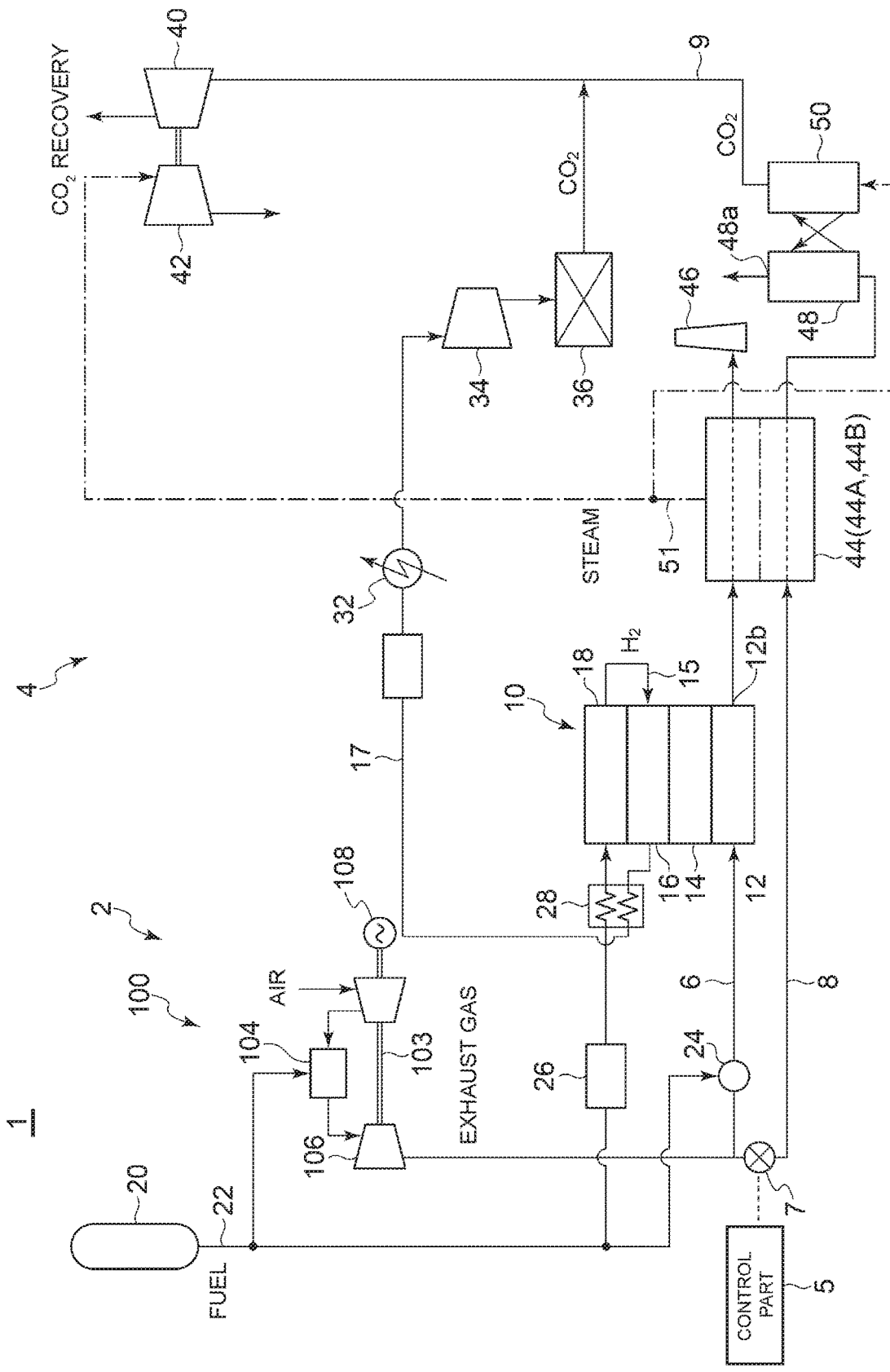
FIG. 1 is a schematic configuration diagram of a thermal power generation facility according to an embodiment.

FIGS. 1, 6, 10 to 12, 16 to 19, and 20 to 25 are each a schematic configuration diagram of a thermal power generation facility according to an embodiment. As shown in FIG. 1, the thermal power generation facility 1 includes a thermal power generation device 2 (facility) and a carbon dioxide recovery system 4. The carbon dioxide recovery system 4 is configured to recover carbon dioxide ($CO_2$) from exhaust gas discharged from the thermal power generation device 2.

The thermal power generation facilities 1 in FIGS. 6, 10 to 12, 16 to 19, and 20 to 25 have the same configuration.

The thermal power generation device 2 may include a gas turbine 100 as the combustion device.

Although not illustrated in FIGS. 6, 10 to 12, 16 to 19, and 20 to 25, the thermal power generation device 2 in the embodiments shown in these drawings may include the gas turbine 100.

In the exemplary embodiment shown in FIG. 1, the gas turbine 100 includes a compressor 102 for compressing air, a combustor 104 for burning a fuel (e.g., natural gas) to produce a combustion gas, and a turbine 106 configured to be rotary driven by the combustion gas.

The fuel (e.g., natural gas) is supplied from a fuel storage part 20 to the combustor 104 via a fuel supply passage 22. Further, the air compressed by the compressor 102 is fed to the combustor 104. The compressed air serves as an oxidant when the fuel is burned in the combustor 104.

To the turbine 106, a generator 108 is connected via a rotational shaft 103, so that the generator 108 is driven by rotational energy of the turbine 106 to generate electric power. The combustion gas used in the turbine 106 is discharged from the turbine 106 as exhaust gas.

The gas turbine 100 shown in the drawings other than FIG. 1 has the same configuration basically.

In other embodiment, the thermal power generation device 2 may be for example a composite power generation device such as a coal-fired power generation device including a boiler as the combustion device, a gas turbine combined cycle (GTCC), or an integrated coal gasification combined cycle (IGCC).

The carbon dioxide recovery system 4 may be configured to recover $CO_2$ contained in exhaust gas including a combustion produced gas in the thermal power generation device 2. For instance, in a case where the thermal power generation device 2 includes a gas turbine or a boiler including a combustor, the carbon dioxide recovery system 4 may be configured to recover $CO_2$ contained in exhaust gas of the gas turbine or the boiler. Alternatively, in a case where the thermal power generation device 2 includes a waste heat recovery boiler (HRSG: Heat Recovery Steam Generator) for recovering heat of exhaust gas supplied from the gas turbine or the like, the carbon dioxide recovery system 4 may be configured to recover $CO_2$ contained in exhaust gas supplied from the waste heat recovery boiler.

Some embodiments of the present invention will now be described.

First Aspect of Present Invention

In the exemplary embodiment shown in FIG. 1, the carbon dioxide recovery system 4 is configured to recover carbon dioxide from exhaust gas produced in the thermal power generation device 2. Specifically, the carbon dioxide recovery system 4 shown in FIG. 1 is configured to recover carbon dioxide from exhaust gas including a combustion gas produced by combustion of fuel in the gas turbine 100 and discharged from the gas turbine 100 in the thermal power generation device 2.

The carbon dioxide recovery system 4 shown in FIG. 1 includes a first exhaust gas passage 6 through which exhaust gas containing carbon dioxide (exhaust gas from the gas turbine 100) flows, a second exhaust gas passage 8 diverging from the first exhaust gas passage 6, and a fuel cell 10 including a cathode 12 disposed on the first exhaust gas passage 6.

The second exhaust gas passage diverges from the first exhaust gas passage 6 on the upstream side of the cathode 12 so as to bypass the cathode 12 of the fuel cell 10. This allows exhaust gas from the thermal power generation device 2, on one hand, to be supplied from the branch point via the first exhaust gas passage 6 to the cathode 12 of the fuel cell 10, and on the other hand, to be introduced from the branch point to the second exhaust gas passage 8.

The way to divide exhaust gas from the branch point into the first exhaust gas passage 6 and the second exhaust gas passage 8 will be described in detail later. In some embodiments, at least during rated operation of the thermal power generation device 2, a part of exhaust gas from the thermal power generation device 2 is introduced into the second exhaust gas passage 8.

Thus, with a part of exhaust gas from the thermal power generation device 2 bypassing the fuel cell 10 (cathode 12) and being introduced into the second exhaust gas passage 8, it is possible to supply a part of exhaust gas from the thermal power generation device 2 to the cathode 12 of the fuel cell 10 at a flow rate within a range acceptable by the fuel cell 10, and it is possible to introduce the rest of exhaust gas into the second exhaust gas passage 8 for some use or treatment. Thus, it is possible to recover carbon dioxide while suppressing the reduction in energy efficiency of the entire plant, while responding to the change in exhaust gas flow rate in accordance with load fluctuation of the thermal power generation device 2.

The fuel cell 10 includes an anode (fuel electrode) 16, a cathode (air electrode) 12, and an electrolyte 14. The cathode 12 is disposed on the first exhaust gas passage 6, so that exhaust gas is supplied to the cathode 12 from the first exhaust gas passage 6, as described above. The electrolyte 14 transfers carbonate ions ($CO_3^{2-}$) derived from $CO_2$ contained in exhaust gas coming from the first exhaust gas passage 6, from the cathode 12 to the anode 16.

The fuel cell 10 may be a molten carbonate fuel cell (MCFC) using carbonate as the electrolyte 14. The carbonate used as the electrolyte 14 may be for instance lithium carbonate, sodium carbonate, or potassium carbonate or may be mixture of these salts.

In the cathode 12 of the fuel cell 10, $CO_2$ and oxygen ($O_2$) contained in exhaust gas from the first exhaust gas passage 6 react with electrons to produce carbonate ions ($CO_3^{2-}$). The carbonate ions produced at the cathode 12 move through the electrolyte 14 toward the anode 16.

On the other hand, to the anode 16 of the fuel cell 10, fuel gas containing hydrogen ($H_2$) is supplied from an anode inlet passage 15. In the anode 16, hydrogen ($H_2$) from the anode inlet passage 15 reacts with the carbonate ions ($CO_3^{2-}$) coming through the electrolyte 14 to produce water ($H_2O$), $CO_2$, and electrons.

In this way, $CO_2$ supplied to the cathode 12 from the first exhaust gas passage 6 moves through the electrolyte 14 from the cathode 12 to the anode 16 in the form of carbonate ions and becomes $CO_2$ by the reaction at the anode 16.

$CO_2$ produced at the anode 16 flows out to an anode outlet passage 17 as a mixed gas together with $H_2O$ and unreacted components of the fuel gas. $CO_2$ contained in the mixed gas is separated from the mixed gas by a separator 36 disposed on the anode outlet passage 17 and then recovered. $CO_2$ separated by the separator 36 (i.e., $CO_2$ recovered at the anode 16 by the fuel cell 10) may be compressed by a compressor 40.

The separator 36 may be configured to separate the mixed gas by membrane separation process or cryogenic separation process. Further, a compressor 34 may be disposed upstream of the separator 36, on the anode outlet passage 17, to increase the pressure of the mixed gas to a pressure suitable for a separation method adopted in the separator 36.

The anode inlet passage 15 is connected to a fuel storage part 20 storing a fuel (e.g., natural gas) via a fuel supply passage 22. The fuel in the fuel storage part 20 is reformed to hydrogen ($H_2$) and supplied to the anode 16 through the anode inlet passage 15.

For instance, in the exemplary embodiment shown in FIG. 1, the fuel is reformed to produce hydrogen ($H_2$) by an auxiliary reformer 26 disposed on the fuel supply passage 22 and a reformation part 18 disposed on the fuel cell 10. Then, hydrogen produced by reforming of fuel is supplied to the anode 16 through the anode inlet passage 15.

As shown in FIG. 1, the above-described separator 36 disposed on the anode outlet passage 17 may be configured to separate hydrogen from the mixed gas emitted from the anode 16. Hydrogen separated by the separator 36 may be supplied to the anode 16 as fuel to be used in the reaction in the fuel cell 10, via the anode inlet passage 15 and a path (not shown) communicating with the anode inlet passage 15.

Further, as shown in FIG. 1, the anode outlet passage 17 may be provided with a CO transformer 30 for CO shift reaction and a cooler 32 for cooling the mixed gas to separate $H_2O$, on the upstream side of the separator 36 and the compressor 34.

Incidentally, the reforming reaction of fuel is an endothermic reaction and thus usually needs heat from the outside. In view of this, as shown in FIG. 1, a heat exchanger 28 may be disposed upstream of the reformation part 18 to heat the fuel supplied from the fuel supply passage 22 to the reformation part 18. By supplying the fuel heated with the heat exchanger 28 to the reformation part 18, it is possible to efficiently reform the fuel.

In the embodiment shown in FIG. 1, the heat exchanger 28 is configured to heat the fuel supplied from the fuel supply passage 22 to the reformation part 18 through heat exchange with a gas flowing out of the anode 16.

A molten carbonate fuel cell works at a high temperature of about 600° C. to 700° C., and a gas flowing out of the anode 16 has nearly the same high temperature. Thus, with the above-described heat exchanger 28, it is possible to make use of reaction heat caused in the fuel cell 10 to reform the fuel.

In the first exhaust gas passage 6, exhaust gas from which $CO_2$ has been consumed in the cathode 12 flows out of a cathode outlet 12b. The exhaust gas flowing out of the cathode outlet 12b may be discharged from a chimney 46 connected to the first exhaust gas passage 6.

As shown in FIG. 1, the first exhaust gas passage 6 may be provided with a combustor 24 upstream of the cathode 12. In this case, by combusting fuel at the combustor 24, it is possible to heat exhaust gas on the cathode outlet side of the first exhaust gas passage 6 by combustion heat.

Generally, the operating temperature of the fuel cell 10 is about 600° C. to 700° C. Thus, to keep the fuel cell 10 in an appropriate operating state, it is desirable to have the gas supplied to the fuel cell 10 at high temperature to some extent. Thus, heating exhaust gas on the cathode inlet side by the combustor 24 disposed upstream of the cathode 12 facilitates appropriate operation of the fuel cell 10.

In the exemplary embodiment shown in FIG. 1, a first waste heat recovery boiler 44A is disposed downstream of the cathode 12 so as to receive exhaust gas from the cathode 12. The first waste heat recovery boiler 44A is configured to recover heat of exhaust gas from the cathode 12 (i.e., exhaust heat of the gas turbine 100). For instance, the first waste heat recovery boiler 44A may be configured to generate steam by heat exchange between exhaust gas from the cathode 12 and feedwater. Thereby, it is possible to make use of exhaust heat of the gas turbine 100 to generate steam.

In this case, the chimney 46 may be connected to the first exhaust gas passage 6 on the downstream side of the first waste heat recovery boiler 44A so that exhaust gas from the first waste heat recovery boiler 44A is discharged from the chimney 46.

In the exemplary embodiment shown in FIG. 1, the second exhaust gas passage 8 diverging from the first exhaust gas passage bypasses the cathode 12 and is connected to a second waste heat recovery boiler 44B. The second waste heat recovery boiler 44B is configured to recover heat of exhaust gas from the gas turbine 100 which bypasses the cathode 12 and flows through the second exhaust gas passage 8 (i.e., exhaust heat of the gas turbine 100). For instance, the second waste heat recovery boiler 44B may be configured to generate steam by heat exchange between exhaust gas from the second exhaust gas passage 8 and feedwater. Thereby, it is possible to make use of exhaust heat of the gas turbine 100 to generate steam.

The first waste heat recovery boiler 44A to which exhaust gas is supplied via the cathode 12 and the second waste heat recovery boiler 44B to which exhaust gas bypassing the cathode 12 is supplied may be separate waste heat recovery boilers, or the waste heat recovery boiler 44 in a single housing may function as both the first waste heat recovery boiler 44A and the second waste heat recovery boiler 44B, as shown in FIG. 1.

In the exemplary embodiment shown in FIG. 1, a chemical absorption tower 48 is disposed, on the second exhaust gas passage 8, downstream of the second waste heat recovery boiler 44B. The chemical absorption tower 48 is configured so that an absorption liquid absorbs $CO_2$ contained in exhaust gas flowing from the second waste heat recovery boiler 44B.

In the chemical absorption tower 48 according to an embodiment, the absorption liquid comes into contact with exhaust gas coming from the second waste heat recovery boiler 44B, and thereby the absorption liquid absorbs $CO_2$ contained in exhaust gas. Consequently, $CO_2$ is removed from exhaust gas. The exhaust gas from which $CO_2$ is removed is discharged from an outlet 48a of the chemical absorption tower 48 as post-treated exhaust gas.

The absorption liquid absorbing $CO_2$ is transferred from the chemical absorption tower 48 to a regeneration tower 50 and is regenerated at the regeneration tower 50. In the regeneration tower 50, the absorption liquid absorbing $CO_2$ is heated to remove $CO_2$ from the absorption liquid. A gas containing $CO_2$ removed from the absorption liquid is discharged from the regeneration tower 50 to a discharge line 9 and, for instance after moisture is removed by a moisture separator (not shown), $CO_2$ is recovered as gas. $CO_2$ from the discharge line 9 (i.e., $CO_2$ recovered by the chemical absorption tower 48) may be compressed by the compressor 40.

On the other hand, the absorption liquid separated from $CO_2$ and regenerated by the regeneration tower 50 is returned to the chemical absorption tower 48 and used again to absorb $CO_2$ contained in exhaust gas supplied from the second waste heat recovery boiler 44B.

The absorption liquid used in the chemical absorption tower 48 may contain amine. The absorption liquid containing amine has high reactivity with carbon dioxide. Accordingly, the use of the absorption liquid containing amine enables carbon dioxide to be effectively recovered even if carbon dioxide in exhaust gas has a low partial pressure.

The absorption liquid containing amine may be an aqueous solution of alkanolamine (e.g., monoethanolamine).

In the chemical absorption tower 48, the temperature at which $CO_2$ is efficiently absorbed varies with the type of the absorption liquid, and it can be lower than the temperature of exhaust gas discharged from the fuel cell 10 or the gas turbine 100. In this regard, in the embodiment shown in FIG. 1, exhaust gas having passed through the second waste heat recovery boiler 44B with a relatively-low temperature is introduced to the chemical absorption tower 48, which improves the recovery efficiency of carbon dioxide in the chemical absorption tower 48.

In the exemplary embodiment shown in FIG. 1, the first exhaust gas passage 6 and the second exhaust gas passage are disposed independently downstream of the first waste heat recovery boiler 44A and the second waste heat recovery boiler 44B. Thus, on the downstream side of the first waste heat recovery boiler 44A, exhaust gas flowing through the first exhaust gas passage 6 is not mixed with exhaust gas flowing through the second exhaust gas passage 8 from the second waste heat recovery boiler 44B to the chemical absorption tower 48.

In this case, $CO_2$-poor exhaust gas in the first exhaust gas passage 6, having passed through the cathode, is prevented from mixing with $CO_2$-rich exhaust gas in the second exhaust gas passage to be introduced to the chemical absorption tower 48, on the downstream side of the first waste heat recovery boiler 44A. Thus, it is possible to improve the efficiency of separating carbon dioxide in the chemical absorption tower 48.

Steam generated by thermal energy recovered at the first waste heat recovery boiler 44A or the second waste heat recovery boiler 44B can be used for various purposes.

In some embodiments, the absorption liquid absorbing $CO_2$ at the chemical absorption tower 48 may be heated and regenerated with steam generated at the first waste heat recovery boiler 44A or the second waste heat recovery boiler 44B.

For instance, as shown in FIG. 1, steam generated at the waste heat recovery boiler 44 (first waste heat recovery boiler 44A or second waste heat recovery boiler 44B) may be supplied to the regeneration tower 50 via a steam supply channel 51, and the absorption liquid may be heated by the steam at the regeneration tower 50.

In some embodiments, the compressor 40 for compressing recovered $CO_2$ ($CO_2$ recovered at the anode 16 by the fuel cell 10 or $CO_2$ recovered by the chemical absorption tower 48) may be configured to be driven by the steam turbine 42, as shown in FIG. 1. Further, the compressor 40 may be driven by steam generated at the first waste heat recovery boiler 44A or the second waste heat recovery boiler 44B.

For instance, as shown in FIG. 1, steam generated at the waste heat recovery boiler 44 (first waste heat recovery boiler 44A or second waste heat recovery boiler 44B) may be supplied to the steam turbine 42 via the steam supply channel 51, and the steam turbine 42 may be driven by the steam thus supplied.

In this way, steam generated by thermal energy recovered from exhaust gas at the waste heat recovery boiler 44 (first waste heat recovery boiler 44A or second waste heat recovery boiler 44B) may be used for regeneration of the absorption liquid used in the chemical absorption tower 48 or may be used as power source of the steam turbine 42 for driving the compressor 40. Thereby, it is possible to improve the energy efficiency of the entire plant.

In some embodiments, the carbon dioxide recovery system 4 further includes a flow rate adjustment part 7 for adjusting a first flow rate of exhaust gas supplied to the cathode 12 via the first exhaust gas passage 6.

In this case, even when the total flow rate of exhaust gas changes as, for instance, the load of the thermal power generation device 2 (gas turbine 100) changes, it is possible to maintain an appropriate operating state (e.g., temperature) of the fuel cell by appropriately adjusting the first flow rate with the flow rate adjustment part 7. Further, in a case where the current between the anode and the cathode needs to be decreased with the reduction in voltage due to degradation of the fuel cell 10, it is possible to maintain the fuel cell 10 in an appropriate temperature range by decreasing the exhaust gas supply amount (first flow rate) to the cathode 12.

The flow rate adjustment part 7 may be disposed on the first exhaust gas passage 6, or may be disposed on the second exhaust gas passage 8.

For instance, in the embodiment shown in FIG. 1, the flow rate adjustment part 7 is disposed, on the second exhaust gas passage 8, downstream of the branch point where the second exhaust gas passage 8 diverges from the first exhaust gas passage 6 and upstream of the second waste heat recovery boiler 44B.

Alternatively, in some embodiments, the flow rate adjustment part 7 may be disposed, on the second exhaust gas passage, downstream of the second waste heat recovery boiler 44B and upstream of the chemical absorption tower 48, or may be disposed, on the first exhaust gas passage 6, downstream of the branch point and upstream of the cathode 12, or downstream of the cathode 12 and upstream of the chimney 46, for instance. Alternatively, the flow rate adjustment part 7 may be disposed inside an instrument (e.g., first waste heat recovery boiler 44A or second waste heat recovery boiler 44B) disposed on the first exhaust gas passage 6 or the second exhaust gas passage 8 (see FIGS. 4 and 5 described later).

The flow rate adjustment part 7 may include a damper, for instance. By using the damper as the flow rate adjustment part 7, it is possible to adjust the flow rate (first flow rate) of exhaust gas supplied to the cathode 12 of the fuel cell 10 via the first exhaust gas passage 6, with a simple structure.

Further, the first exhaust gas passage 6 and the second exhaust gas passage 8 are disposed upstream of at least the installation position of the damper (flow rate adjustment part 7) independently of each other. In this case, through adjustment of the opening degree of the damper, it is possible to appropriately distribute exhaust gas into the first exhaust gas passage 6 and the second exhaust gas passage 8.

Alternatively, the flow rate adjustment part 7 may include a blower device (blower or fan). The blower device may be disposed on the first exhaust gas passage 6, upstream of the chimney 46, or may be disposed on the second exhaust gas passage 8, upstream of the chemical absorption tower 48, or blower devices may be disposed on both portions.

The flow rate adjustment part 7 may be a single damper or blower device, or at least one damper and/or at least one blower device may be used in combination.

In some embodiments, the carbon dioxide recovery system 4 may include a control part 5 for controlling the flow rate adjustment part 7.

Hereinafter, the flow rate distribution of exhaust gas in the carbon dioxide recovery system 4 will be described in more detail. The flow rate distribution of exhaust gas described below may be achieved by controlling the flow rate adjustment part 7 with the control part 5.

As described above, in some embodiments, the carbon dioxide recovery system 4 is configured so that, at least during rated operation of the thermal power generation device 2, a part of exhaust gas from the thermal power generation device 2 is introduced to the second exhaust gas passage 8. For instance, in the exemplary embodiment shown in FIG. 1, at least during rated operation of the gas turbine 100 (thermal power generation device 2), a part of exhaust gas of the gas turbine 100 is introduced to the second waste heat recovery boiler 44B via the second exhaust gas passage 8 without passing through the cathode 12.

Thus, with a part of exhaust gas from the thermal power generation device 2 bypassing the fuel cell 10 (cathode 12) and being introduced into the second exhaust gas passage 8, it is possible to supply a part of exhaust gas from the thermal power generation device 2 to the cathode 12 of the fuel cell 10 at a flow rate within a range acceptable by the fuel cell 10, and it is possible to introduce the rest of exhaust gas into the second exhaust gas passage 8 for some use or treatment.

In particular, in the embodiment shown in FIG. 1, exhaust gas of the gas turbine 100 with a relatively-high temperature (e.g., 600 to 650° C.) before passing through the first waste heat recovery boiler 44A is introduced to the fuel cell 10 to operate the fuel cell 10 stably at the appropriate temperature. Further, since a part of exhaust gas of the gas turbine 100 is directly introduced to the second waste heat recovery boiler 44B by bypassing the cathode 12 via the second exhaust gas passage 8, it is easy to maintain stable operation of the fuel cell 10 even if the exhaust gas flow rate changes with load fluctuation.

Thus, it is possible to recover carbon dioxide while suppressing the reduction in energy efficiency of the entire plant, while responding to the change in exhaust gas flow rate in accordance with load fluctuation of the thermal power generation device 2 (gas turbine 100).

Figure 2:
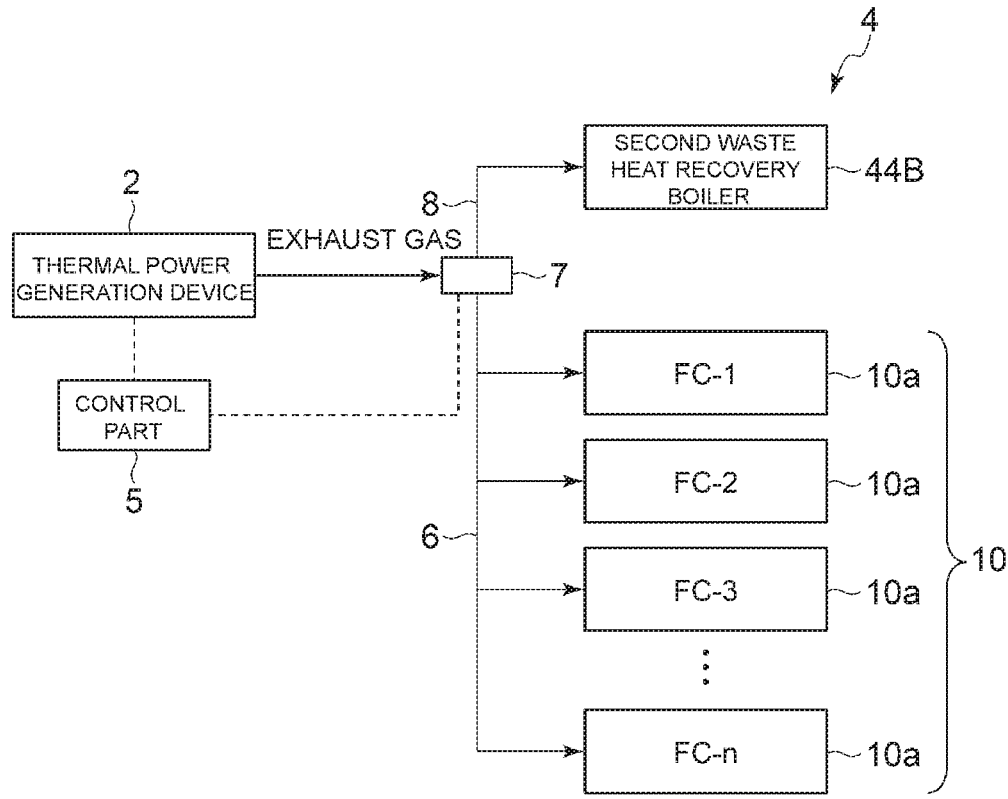
FIG. 2 is a conceptual diagram of an example of a flow rate control in the carbon dioxide recovery system shown in FIG. 1.

FIG. 2 is a conceptual diagram of an example of a flow rate control in the carbon dioxide recovery system 4 shown in FIG. 1, where exhaust gas from the thermal power generation device 2 is distributed to the first exhaust gas passage 6 provided with the cathode 12 of the fuel cell 10 and the second exhaust gas passage 8 diverging from the first exhaust gas passage 6 so as to bypass the cathode 12. As shown in FIG. 2, exhaust gas from the thermal power generation device 2 including the combustion device (gas turbine 100 shown in FIG. 1) is divided at the branch point into exhaust gas supplied to the cathode 12 (see FIG. 1) of the fuel cell 10 via the first exhaust gas passage 6 and exhaust gas supplied to the second waste heat recovery boiler 44B via the second exhaust gas passage 8.

As described above, the flow rate (first flow rate) of exhaust gas supplied to the cathode 12 via the first exhaust gas passage 6 may be adjusted by the flow rate adjustment part 7. Assuming that a second flow rate is the flow rate of exhaust gas bypassing the cathode 12 and distributed to the second exhaust gas passage 8 (in the example shown in FIGS. 1 and 2, the flow rate of exhaust gas supplied to the second waste heat recovery boiler 44B), the sum of the first flow rate and the second flow rate is the total flow rate of exhaust gas from the thermal power generation device 2.

As shown in FIG. 2, in the carbon dioxide recovery system 4, the fuel cell 10 may include a plurality of fuel cell units 10a arranged in series or in parallel. The fuel cell unit 10a is a unit which has an individual housing and independently functions as a fuel cell. The number of the fuel cell units 10a may be determined based on the flow rate of exhaust gas to be treated at the fuel cell 10 or the capacity of the fuel cell unit 10a.

In the example shown in FIG. 2, the fuel cell 10 includes n-number of fuel cell units 10a represented by "FC-1" to "FC-n" which are arranged in parallel. Further, exhaust gas is supplied to the cathode 12 of the fuel cell 10 composed of the fuel cell units 10a (i.e., respective cathodes of the fuel cell units 10a) at the first flow rate as a whole.

Figure 3:
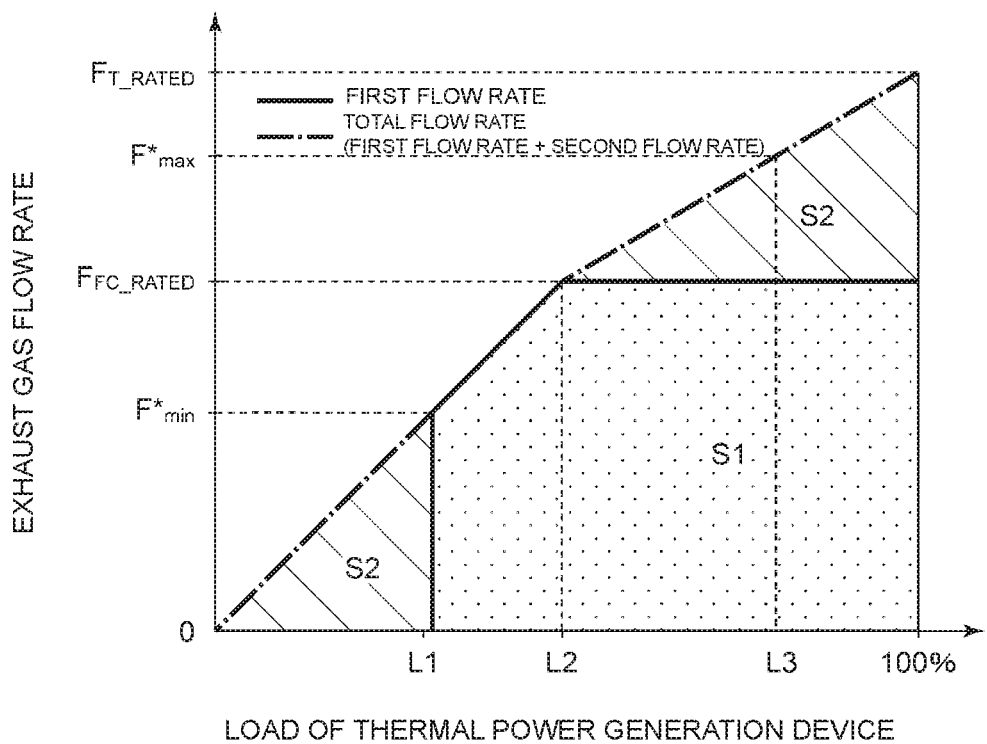
FIG. 3 is a graph showing an exemplary relationship between the load of a thermal power generation device and a first flow rate of exhaust gas.

FIG. 3 is a graph showing an exemplary relationship between the load of the thermal power generation device 2 (gas turbine 100) and the first flow rate of exhaust gas supplied to the cathode 12 via the first exhaust gas passage 6.

The horizontal axis of the graph of FIG. 3 represents the load (horizontal axis) of the thermal power generation device 2 (gas turbine 100). The load 100% means the rated load of the thermal power generation device 2 (gas turbine 100). The vertical axis of the graph of FIG. 3 represents the exhaust gas flow rate, which shows the first flow rate of exhaust gas supplied to the cathode 12 of the fuel cell 10 via the first exhaust gas passage 6 and the total flow rate of exhaust gas from the thermal power generation device 2 (the sum of the first flow rate and the second flow rate distributed to the second exhaust gas passage 8).

$F_{T\_RATED}$ represents the total amount of exhaust gas flow (total flow rate) from the thermal power generation device 2 during rated operation (load: 100%) of the gas turbine 100, and $F_{FC\_RATED}$ represents the flow rate of treated exhaust gas during rated operation of the fuel cell 10. Further, in the graph of FIG. 4, region S1 represents a portion occupied by the first flow rate of the total flow rate of exhaust gas, and region S2 represents a portion occupied by the second flow rate of the total flow rate of exhaust gas.

In some embodiments, in the carbon dioxide recovery system 4, the treatment flow rate $F_{FC\_RATED}$ of exhaust gas from the thermal power generation device 2 during rated operation of the fuel cell 10 is smaller than the total flow rate $F_{T\_RATED}$ of exhaust gas during rated operation of the fuel cell 10. That is, the rated output power of the fuel cell 10 (the total capacity of the fuel cell units 10a) is smaller than a capacity of the fuel cell required for treating the total flow rate $F_{T\_RATED}$ of exhaust gas at rated load of the thermal power generation device 2 (for instance, the number of the fuel cell units 10a is small).

If the fuel cell 10 (fuel cell units 10a) is capable of treating the total amount $F_{T\_RATED}$ of exhaust gas at rated load of the thermal power generation device 2, the flow rate of exhaust gas from the thermal power generation device 2 decreases during partial load operation of the thermal power generation device 2, compared to during rated load operation. In this case, a sufficient thermal energy for stable operation of the fuel cell 10 cannot be obtained from exhaust gas, and it becomes difficult to maintain stable operation of all the fuel cell units 10a of the fuel cell 10. Thus, during partial load operation of the thermal power generation device 2, it is necessary to stop the operation of a part of the fuel cell units 10a (hot standby) to maintain stable operation the fuel cell 10.

In this case, problems are raised in terms of lost profits with the reduction in power generation due to operation stop of a part of the fuel cell units 10a or installation cost of the fuel cell units 10a that are not operated.

In this regard, as described above, by using the fuel cell 10 (fuel cell units 10a) having rated output power lower than the capacity necessary for treating the total flow rate $F_{T\_RATED}$ of exhaust gas at rated load of the thermal power generation device 2 (gas turbine 100), only a part of the total flow rate $F_{T\_RATED}$ of exhaust gas at rated load of the thermal power generation device 2 is supplied to the fuel cell 10 via the first exhaust gas passage 6. Thus, even during partial load operation of the thermal power generation device 2, it is possible to easily respond to the reduction in exhaust gas flow rate while keeping stable operation of the fuel cell 10 (or all of the fuel cell units 10a constituting the fuel cell 10).

In some embodiments, as shown in the graph of FIG. 3, the treatment flow rate $F_{FC\_RATED}$ of exhaust gas during rated operation of the fuel cell 10 is equal to or more than the total flow rate $F^*_{min}$ of exhaust gas during operation at load L1 of the thermal power generation device 2 (gas turbine 100), and equal to or less than the total flow rate $F^*_{max}$ of exhaust gas during operation at load L3 (L1<L3) of the thermal power generation device 2 (gas turbine 100). In an embodiment, the treatment flow rate $F_{FC\_RATED}$ of exhaust gas during rated operation of the fuel cell 10 may be equal to or more than the total flow rate F*min of exhaust gas during operation at 30% load (L1=30%) of the thermal power generation device 2 (gas turbine 100), and equal to or less than the total flow rate $F^*_{max}$ of exhaust gas during operation at 80% load (L3=80%) of the thermal power generation device 2 (gas turbine 100).

In the graph of FIG. 3, the total flow rate of exhaust gas during operation at load L2 (L1<L2<L3) of the thermal power generation device 2 is set as the treatment flow rate $F_{FC\_RATED}$ of exhaust gas during rated operation of the fuel cell 10. For instance, the load L2 of the thermal power generation device 2 may be 50%.

The load of the thermal power generation device 2 (gas turbine 100) can change, for instance, within a load range of 40% to 100% in response to the demand from a utility grid. In this case, when the treatment flow rate $F_{FC\_RATED}$ of exhaust gas during rated operation of the fuel cell 10 is set such that the treatment flow rate $F_{FC\_RATED}$ of exhaust gas during rated operation of the fuel cell 10 is F*min or more and $F^*_{max}$ or less, it is possible to easily respond to the reduction in exhaust gas flow rate while keeping stable operation of the fuel cell 10, even during partial load operation of the thermal power generation device 2.

Further, in some embodiments, the first flow rate may be adjusted so that the first flow rate is kept at the rated flow rate of the fuel cell 10, regardless of the magnitude of the load of the thermal power generation device 2, in at least a partial load range of the thermal power generation device 2 (gas turbine 100).

For instance, in the example shown in the graph of FIG. 3, in a load range of the thermal power generation device 2 of 50% to 100% (high-load region having a relatively-high load), the first flow rate is adjusted so that the first flow rate is kept at the rated flow rate $F_{FC\_RATED}$ of the fuel cell 10, regardless of the magnitude of the load.

In this case, in the above load range (high-load region), even if the load of the thermal power generation device 2 fluctuates and the total flow rate of exhaust gas from the thermal power generation device 2 changes with load fluctuation, exhaust gas is supplied to the fuel cell 10 constantly at the first flow rate (rated flow rate $F_{FC\_RATED}$), which enables stable operation of the fuel cell 10. Thus, it is possible to maintain stable operation of the fuel cell 10.

The constant value (in the example of FIG. 3, the rated flow rate $F_{FC\_RATED}$) of the first flow rate in the high-load region may be changed in accordance with the state change of the fuel cell 10 with the passage of time.

For instance, in a case where the fuel cell 10 degrades and the current between the anode and the cathode needs to be decreased with the reduction in voltage due to degradation of the fuel cell 10, the constant value of the first flow rate may be set so that the amount (first flow rate) of exhaust gas supplied to the fuel cell 10 in the high-load region is kept smaller than the rated flow rate ($F_{FC\_RATED}$).

As described above, the constant value of the first flow rate in the high-load region may be set to be changed from the rated flow rate ($F_{FC\_RATED}$), considering the state change, such as degradation of the fuel cell 10.

Even in a case where the first flow rate of exhaust gas supplied to the fuel cell 10 is equal to or less than the rated flow rate, the fuel cell 10 can operate stably if a certain amount of exhaust gas can be supplied. In view of this, in at least a partial load range where the load of the thermal power generation device 2 is less than a threshold and the total flow rate of exhaust gas is equal to or less than the rated flow rate ($F_{FC\_RATED}$) of the fuel cell 10, the control part 5 may perform a control so that exhaust gas is supplied to the fuel cell 10 at the first flow rate that is the total flow rate of exhaust gas.

For instance, if stable operation of the fuel cell 10 can be maintained by the first flow rate that is equal to or more than the total flow rate of exhaust gas when the load of the thermal power generation device 2 is L1 (F*min in FIG. 3), the total flow rate of exhaust gas from the thermal power generation device 2 may be supplied to the fuel cell 10 as the first flow rate when the load of the thermal power generation device 2 is in a load range of L1 or more and less than L2, as in the example shown in FIG. 3.

Thereby, it is possible to operate the fuel cell 10 in a wider load range than the thermal power generation device 2, and it is possible to recover carbon dioxide with an improved power generation efficiency of the entire plant.

Next, the waste heat recovery boiler 44 according to some embodiments will be described in more detail.

Figure 4:
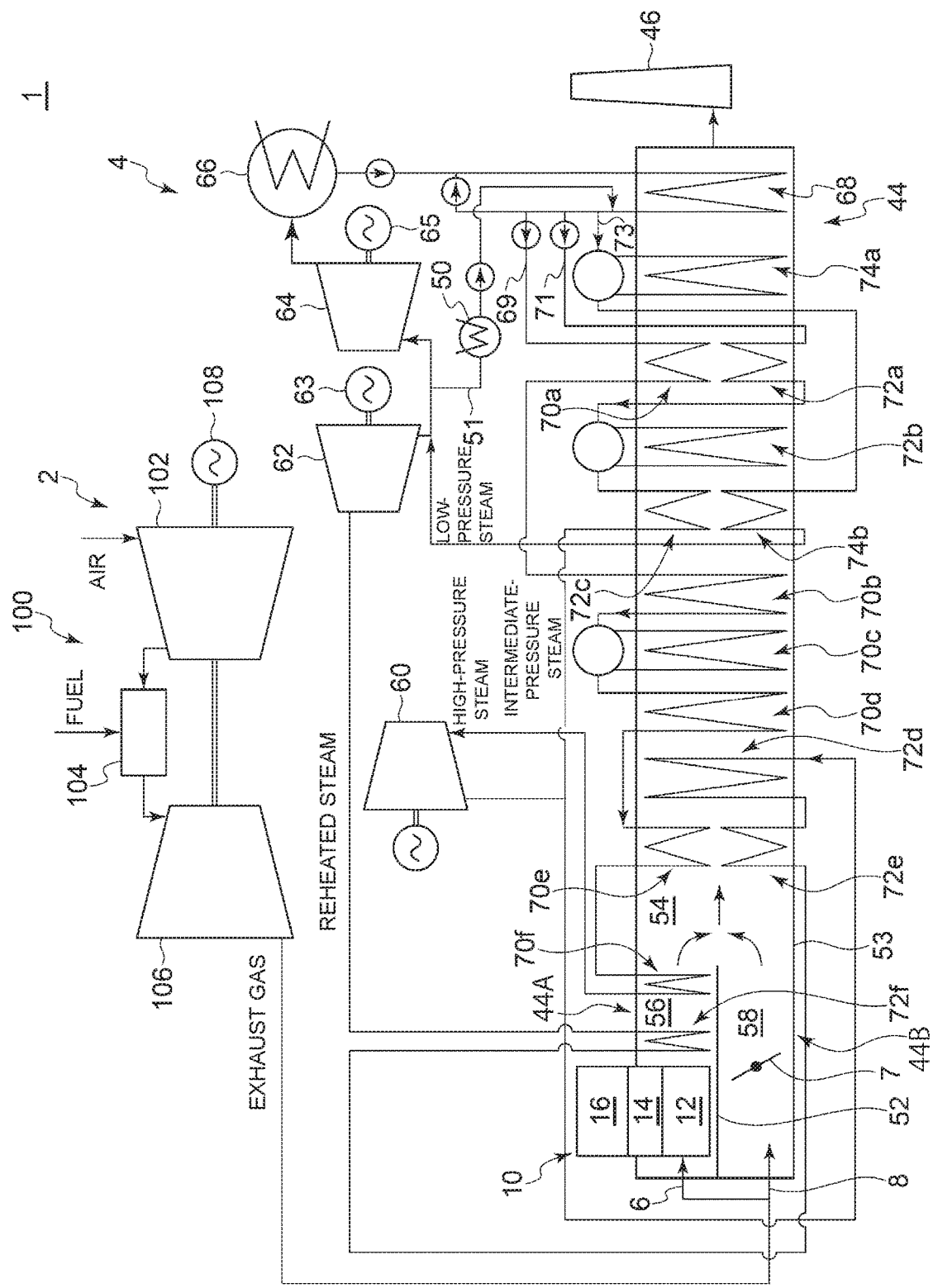
FIG. 4 is a configuration diagram of an exemplary carbon dioxide recovery system according to an embodiment.

FIG. 4 is a configuration diagram of an example of the carbon dioxide recovery system 4 according to an embodiment, and particularly describes an exemplary configuration of the waste heat recovery boiler 44 (first waste heat recovery boiler 44A and second waste heat recovery boiler 44B).

The thermal power generation device 2 including the gas turbine 100 shown in FIG. 4 has the same configuration as the thermal power generation device 2 shown in FIG. 1.

In the exemplary embodiment shown in FIG. 4, exhaust gas from the gas turbine 100 of the thermal power generation device 2 is introduced to the waste heat recovery boiler 44 via the first exhaust gas passage 6 and the second exhaust gas passage 8 diverging from the first exhaust gas passage 6.

The waste heat recovery boiler 44 includes the first waste heat recovery boiler 44A for recovering heat from exhaust gas introduced from the first exhaust gas passage 6 and the second waste heat recovery boiler 44B for recovering heat from exhaust gas introduced from the second exhaust gas passage 8.

The waste heat recovery boiler 44 has a duct 54 through which exhaust gas of the gas turbine 100 passes. Specifically, the first waste heat recovery boiler 44A and the second waste heat recovery boiler 44B have a common duct 54. The first waste heat recovery boiler 44A and the second waste heat recovery boiler 44B each communicate with the duct 54. The duct 54 is formed by a duct wall 55.

An upstream region of the duct 54 is divided into a first portion 56 and a second portion 58 by a partition wall 52. The first portion 56 of the duct 54 partially forms the first exhaust gas passage 6, and the second portion 58 of the duct 54 partially forms the second exhaust gas passage 8.

In the embodiment shown in FIG. 4, the cathode 12 of the fuel cell 10 is disposed on the first portion of the duct 54, and exhaust gas from the first exhaust gas passage 6 is supplied to the cathode 12. Further, exhaust gas discharged from the outlet of the cathode 12 flows into the first portion of the duct 54 downstream of the cathode 12.

Then, exhaust gas flowing from the first portion via the cathode 12 of the fuel cell 10 and exhaust gas flowing from the second portion without passing through the cathode 12 join downstream of the partition wall 52.

Specifically, the first portion 56 of the duct 54 which receives exhaust gas from the first exhaust gas passage 6 forms the first waste heat recovery boiler 44A, and the second portion 58 which receives exhaust gas from the second exhaust gas passage 8 forms the second waste heat recovery boiler 44B. Further, a downstream region of the duct 54 not divided by the partition wall 52 (a region downstream of the first portion 56 and the second portion 58) receives exhaust gas from the first exhaust gas passage 6 and exhaust gas from the second exhaust gas passage 8, and thus this region forms the first waste heat recovery boiler 44A and the second waste heat recovery boiler 44B.

The waste heat recovery boiler 44 has various heat exchangers (68, 70a to 70f, 72a to 72f, 74a and 74b), and heat-transfer tubes forming these heat exchangers are disposed to pass inside the duct 54. Steam circulates in the heat-transfer tubes, and heat exchange occurs between the steam circulating in the heat-transfer tubes and exhaust gas (heating medium) flowing through the duct 54.

The waste heat recovery boiler 44 shown in FIG. 4 includes a steam circulation channel including a high-pressure steam channel 69, an intermediate-pressure steam channel 71, and a low-pressure steam channel 73 and heat exchangers (68, 70a to 70f, 72a to 72f, 74a and 74b) disposed on each steam channel. The heat exchangers may be economizers, evaporators, super-heaters, or re-heaters, for instance.

The high-pressure steam channel 69, the intermediate-pressure steam channel 71, and the low-pressure steam channel 73 are respectively provided with a high-pressure turbine 60, an intermediate-pressure turbine 62, and a low-pressure turbine 64 each of which is configured to be driven by steam from the corresponding steam channel. To each steam turbine 60, 62, 64, a generator 61, 63, 65 is connected, so that the generator 61, 63, 65 is rotary driven by the steam turbine to generate electric power.

As shown in FIG. 4, steam used in the high-pressure turbine 60 and the intermediate-pressure turbine 62 respectively join with the intermediate-pressure steam channel 71 and the low-pressure steam channel 73, and are heated again with the heat exchangers. The steam then flows into the intermediate-pressure turbine 62 and the low-pressure turbine 64 respectively to drive the turbines.

Steam flowing out of the outlet of the low-pressure turbine 64 is condensed by a condenser 66, then becomes steam again through the heat exchanger 68, and is transferred to the high-pressure steam channel 69, the intermediate-pressure steam channel 71, or the low-pressure steam channel 73.

In the embodiment shown in FIG. 4, a first heat exchanger (heat exchanger 72f in FIG. 4) disposed on the most upstream side in the first waste heat recovery boiler 44A obtains a heating medium having higher temperature than that a second heat exchanger (heat exchanger 72e in FIG. 4) disposed on the most upstream side in the second waste heat recovery boiler 44B obtains by heat exchange.

Specifically, exhaust gas downstream of the cathode 12 in the first portion 56 becomes warmer than exhaust gas discharged from the gas turbine 100, due to heat of reaction in the fuel cell 10. Accordingly, the inlet temperature is higher in the first waste heat recovery boiler 44A (downstream of the first portion 56 and the partition wall 52 of the duct 54) into which exhaust gas having passed through the cathode 12 of the fuel cell 10 flows than in the second waste heat recovery boiler (downstream of the second portion 58 and the partition wall 52 of the duct 54) into which exhaust gas bypassing the cathode 12 flows.

Thus, as shown in FIG. 4, if the system is configured so that the first heat exchanger (heat exchanger 72f in FIG. 4) disposed on the most upstream side in the first waste heat recovery boiler 44A obtains a heating medium having higher temperature than that the second heat exchanger (heat exchanger 72e in FIG. 4) disposed on the most upstream side in the second waste heat recovery boiler 44B obtains, it is possible to make use of exhaust heat from the gas turbine 100 and improve the energy efficiency of the entire plant.

The damper serving as the flow rate adjustment part 7 for adjusting the first flow rate of exhaust gas supplied to the cathode 12 via the first exhaust gas passage 6 may be disposed on the first portion 56 (first exhaust gas passage 6) or the second portion 58 (second exhaust gas passage 8) inside the duct 54.

In the embodiment shown in FIG. 4, the damper as the flow rate adjustment part 7 is disposed on the second portion 58. The temperature of the second portion 58 through which exhaust gas flows not via the cathode 12 of the fuel cell 10 is lower than the temperature of the first portion 56 through which exhaust gas flows via the cathode 12. Thus, by placing the damper on the second portion 58 as shown in FIG. 4, it is possible to adjust the first flow rate appropriately while suppressing the reduction in lifetime of the damper.

If the exhaust gas temperature at the damper installation position is excessively low, components such as acid and water in exhaust gas are condensed at the duct, and the condensed components can corrode the damper. Thus, by placing the damper into a position at not-excessively-low temperature (for instance, a position where the temperature is higher than the dew point of components (e.g. water) contained in exhaust gas), it is possible to suppress corrosion of the damper.

In a case where the chemical absorption tower 48 (not shown in FIG. 4, see FIG. 1) is disposed downstream of the second waste heat recovery boiler 44B, as described above, steam for heating and regenerating the absorption liquid may be supplied from the waste heat recovery boiler 44. For instance, as shown in FIG. 4, low-pressure steam may be supplied to the regeneration tower 50 via the steam supply channel 51 diverging from the low-pressure steam channel 73.

Figure 5:
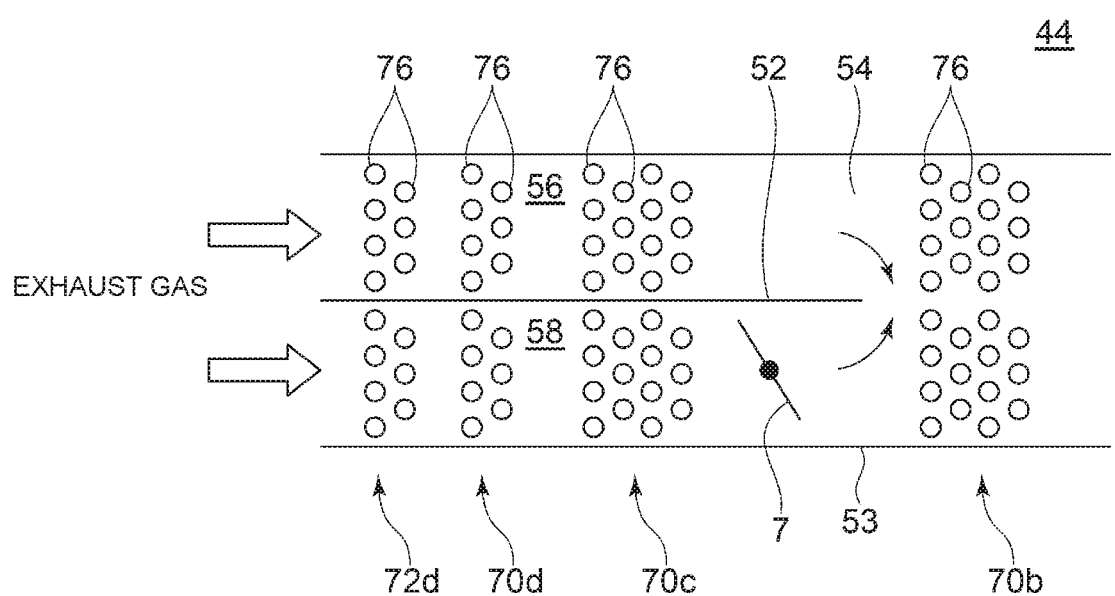
FIG. 5 is a schematic plan view of a portion of a duct of a waste heat recovery boiler according to an embodiment.

FIG. 5 is a schematic plan view of a portion of the duct 54 of the waste heat recovery boiler 44 according to another embodiment. FIG. 5 shows a peripheral portion around an upstream portion of the duct 54 of the waste heat recovery boiler 44. In the embodiment shown in FIG. 5, heat exchangers 72d, 70d, 70c, and 70b are arranged inside the duct 54 in this order from upstream. Each heat exchanger is formed by a heat-transfer tube 76. Among these heat exchangers, the heat exchangers 72d, 70d, and 70c extend over the first portion 56 and the second portion 58 across the partition wall 52.

In some embodiments, as shown in FIG. 5, the flow rate adjustment part 7 (damper) may be disposed between the heat exchangers (in FIG. 5, between the heat exchanger 70c and the heat exchanger 70b).

Thus, since the damper can be disposed between the heat exchangers, it is possible to flexibly select the installation position of the damper inside the duct 54.

Second Aspect of Present Invention

Figure 6:
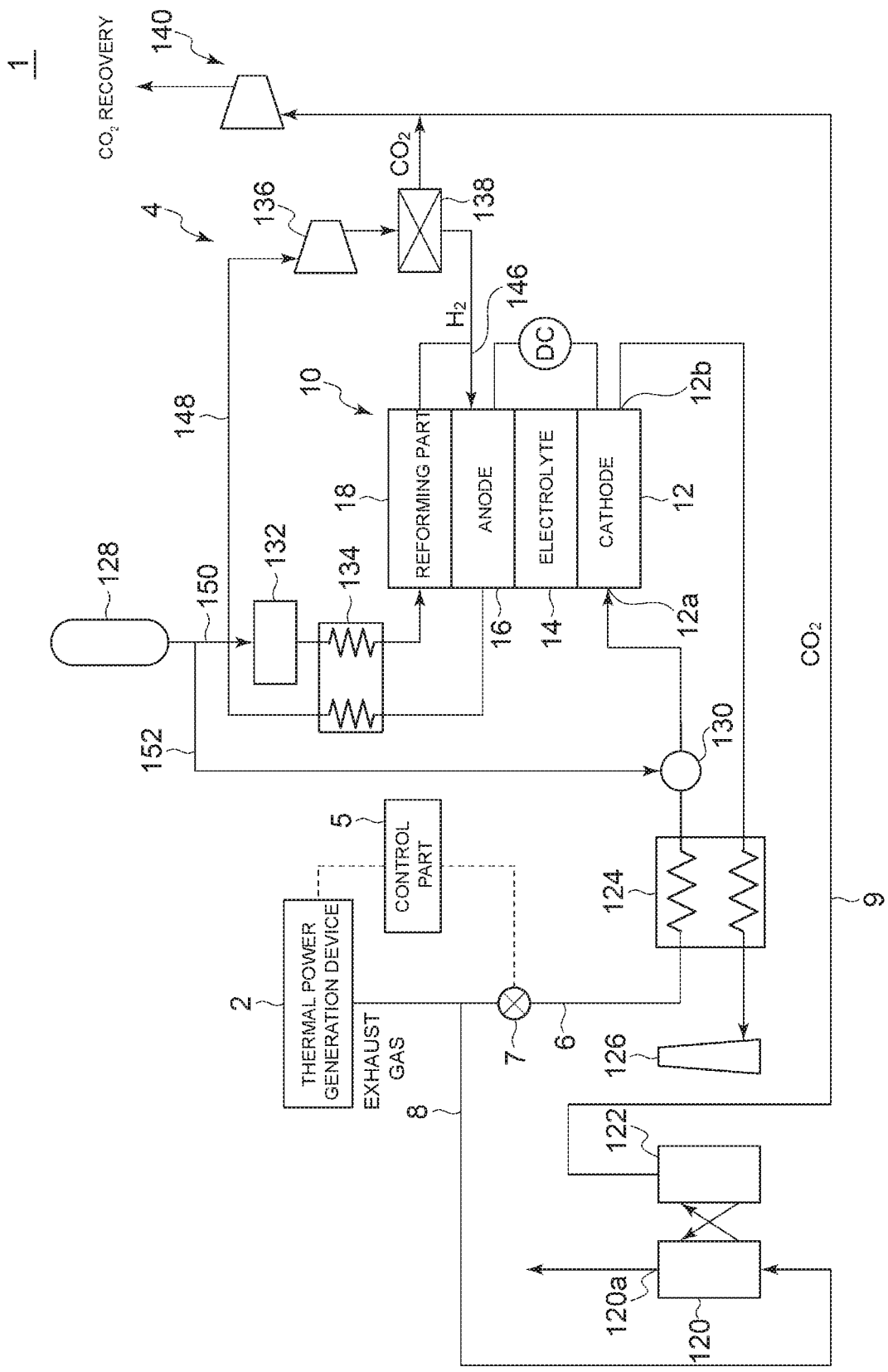
FIG. 6 is a schematic configuration diagram of a thermal power generation facility according to an embodiment.

The carbon dioxide recovery system 4 according to the exemplary embodiment shown in FIG. 6 includes a first exhaust gas passage 6 through which exhaust gas from the thermal power generation device 2 flows, a second exhaust gas passage diverging from the first exhaust gas passage 6, a fuel cell 10 including a cathode 12 disposed on the first exhaust gas passage 6, and a chemical absorption tower 120 disposed on the second exhaust gas passage 8.

The second exhaust gas passage 8 diverges from the first exhaust gas passage 6 on the upstream side of the cathode 12 of the fuel cell 10. Thus, exhaust gas from the thermal power generation device 2 is divided at the branch point to the first exhaust gas passage 6 and the second exhaust gas passage 8 and supplied to the cathode 12 of the fuel cell 10 and the chemical absorption tower 120, respectively.

The fuel cell 10 basically has the same configuration as the fuel cell 10 according to the first aspect of the present invention described above. However, in embodiments according to the second aspect, fuel gas containing hydrogen ($H_2$) is supplied from an anode inlet passage 146 to an anode 16 of the fuel cell 10.

$CO_2$ produced at the anode 16 flows out to an anode outlet passage 148 as a mixed gas together with $H_2O$ and unreacted components of the fuel gas. $CO_2$ contained in the mixed gas is separated from the mixed gas by a separator 138 disposed on the anode outlet passage 148 and then recovered. $CO_2$ separated by the separator 138 may be recovered after being compressed by a compressor 140.

The separator 138 may be configured to separate the mixed gas by membrane separation process or cryogenic separation process. Further, a compressor 136 may be disposed upstream of the separator 138, on the anode outlet passage 148, to increase the pressure of the mixed gas to a pressure suitable for a separation method adopted in the separator 138.

The anode inlet passage 146 is connected to a fuel storage part 128 storing a fuel (e.g., natural gas) via a fuel supply passage 150. The fuel in the fuel storage part 128 is reformed to hydrogen ($H_2$) and supplied to the anode 16 through the anode inlet passage 146.

For instance, in the exemplary embodiment shown in FIG. 6, the fuel is reformed to produce hydrogen ($H_2$) by an auxiliary reformer 132 disposed on the fuel supply passage 150 and a reformation part 18 disposed on the fuel cell 10. Then, hydrogen produced by reforming of fuel is supplied to the anode 16 through the anode inlet passage 146.

Additionally, as shown in FIG. 6, the above-described separator 138 disposed on the anode outlet passage 148 may be configured to separate hydrogen from the mixed gas emitted from the anode 16. Hydrogen separated by the separator 138 may be supplied to the anode 16 via the anode inlet passage 146.

In FIG. 6, the fuel supply passage 150 is provided with a heat exchanger 134 for heat exchange between fuel gas flowing through the fuel supply passage 150 and gas flowing through the anode outlet passage 148.

The reforming reaction of fuel is an endothermic reaction and thus usually needs heat from the outside. On the other hand, a molten carbonate fuel cell works at a high temperature of about 600° C. to 700° C., and a gas flowing out of the anode 16 has nearly the same high temperature. Thus, by heating the fuel flowing through the fuel supply passage 150 by heat of the gas flowing out of the anode 16 in the heat exchanger 134, it is possible to make use of reaction heat caused in the fuel cell to reform the fuel.

In the first exhaust gas passage 6, exhaust gas from which $CO_2$ has been consumed in the cathode 12 flows out of a cathode outlet 12b. The exhaust gas flowing out of the cathode outlet 12b may be discharged from a chimney 126 connected to the first exhaust gas passage 6.

In the exemplary embodiment shown in FIG. 6, the first exhaust gas passage 6 is provided with a heat exchanger 124 for heat exchange between exhaust gas on the side of the cathode inlet 12a and exhaust gas on the side of the cathode outlet 12b.

The temperature of exhaust gas from the thermal power generation device 2 (exhaust gas on the side of the cathode inlet side 12a) is usually lower than the operating temperature (about 600° C. to 700° C.) of the fuel cell 10. On the other hand, the temperature of exhaust gas flowing out of the cathode 12 (exhaust gas on the side of the cathode outlet 12b) is high due to reaction heat caused in the fuel cell. Thus, by heating exhaust gas on the side of the cathode inlet 12a having a relatively-low temperature through heat exchange with exhaust gas on the side of the cathode outlet 12b having a relatively-high temperature and then supplying the heated exhaust gas to the cathode 12, it is possible to make use of thermal energy generated at the fuel cell 10 to keep the appropriate temperature of the fuel cell 10 for stable operation.

As shown in FIG. 6, the first exhaust gas passage 6 may be provided with a combustor 130 upstream of the cathode 12. In this case, through combustion of fuel at the combustor 130, it is possible to heat exhaust gas on the cathode inlet 12a of the first exhaust gas passage 6 by combustion heat.

To the combustor 130, fuel may be supplied from a fuel storage part 128 via a fuel supply passage 152.

For instance, at the start-up of the fuel cell 10, reaction heat of the fuel cell 10 is not yet high, and thus the temperature of exhaust gas on the cathode outlet 12b side is not likely to increase. In this case, heat exchange by the heat exchanger 124 alone cannot be enough to increase the temperature of exhaust gas on the side of the cathode inlet 12a to the temperature necessary for reaction in the fuel cell 10. Thus, heating exhaust gas on side of the cathode inlet 12a by the combustor 130 facilitates appropriate operation of the fuel cell 10.

The chemical absorption tower 120 is configured so that an absorption liquid absorbs $CO_2$ contained in exhaust gas supplied from the second exhaust gas passage 8.

In the chemical absorption tower 120 according to an embodiment, the absorption liquid comes into contact with exhaust gas coming from the second exhaust gas passage 8, and thereby the absorption liquid absorbs $CO_2$ contained in exhaust gas. Consequently, $CO_2$ is removed from exhaust gas. The exhaust gas from which $CO_2$ is removed is discharged from an outlet 120a of the chemical absorption tower 120 as post-treated exhaust gas.

The absorption liquid absorbing $CO_2$ is transferred from the chemical absorption tower 120 to an absorption liquid regeneration tower 122 and is regenerated. In the absorption liquid regeneration tower 122, the absorption liquid absorbing $CO_2$ is heated to remove $CO_2$ from the absorption liquid. A gas containing $CO_2$ removed from the absorption liquid is discharged to a discharge line 9 and, after moisture is removed by a moisture separator, $CO_2$ is recovered as gas. $CO_2$ from the discharge line 9 may be recovered after being compressed by the compressor 140.

On the other hand, the absorption liquid separated from $CO_2$ and regenerated by the absorption liquid regeneration tower 122 is returned to the chemical absorption tower 120 and used again to absorb $CO_2$ contained in exhaust gas supplied from the second exhaust gas passage 8.

The absorption liquid used in the chemical absorption tower 120 may contain amine. The absorption liquid containing amine has high reactivity with carbon dioxide. Accordingly, the use of the absorption liquid containing amine enables carbon dioxide to be effectively recovered even if carbon dioxide in exhaust gas has a low partial pressure.

The absorption liquid containing amine may be an aqueous solution of alkanolamine (e.g., monoethanolamine).

In the chemical absorption tower 120, the temperature at which $CO_2$ is efficiently absorbed varies with the type of the absorption liquid, and it can be lower than the temperature of exhaust gas discharged from the thermal power generation device or the like.

In this case, a cooling device (not shown) may be provided on the first exhaust gas passage 6 or the second exhaust gas passage 8, upstream of the chemical absorption tower 120 to cool exhaust gas supplied to the chemical absorption tower 120. Thereby, it is possible to have $CO_2$ absorbed in the absorption liquid efficiently.

In the carbon dioxide recovery system 4 described above, the cathode 12 of the fuel cell 10 is disposed on the first exhaust gas passage 6, and the chemical absorption tower 120 is disposed on the second exhaust gas passage 8 diverging from the first exhaust gas passage 6, so that the fuel cell 10 and the chemical absorption tower 120 are arranged in parallel. Thus, exhaust gas is distributed to the chemical absorption tower 120 and the fuel cell 10 to operate both components. By this means, it is possible to suppress the reduction in energy efficiency of the entire plant while responding to the change in exhaust gas flow rate.

Figure 7:
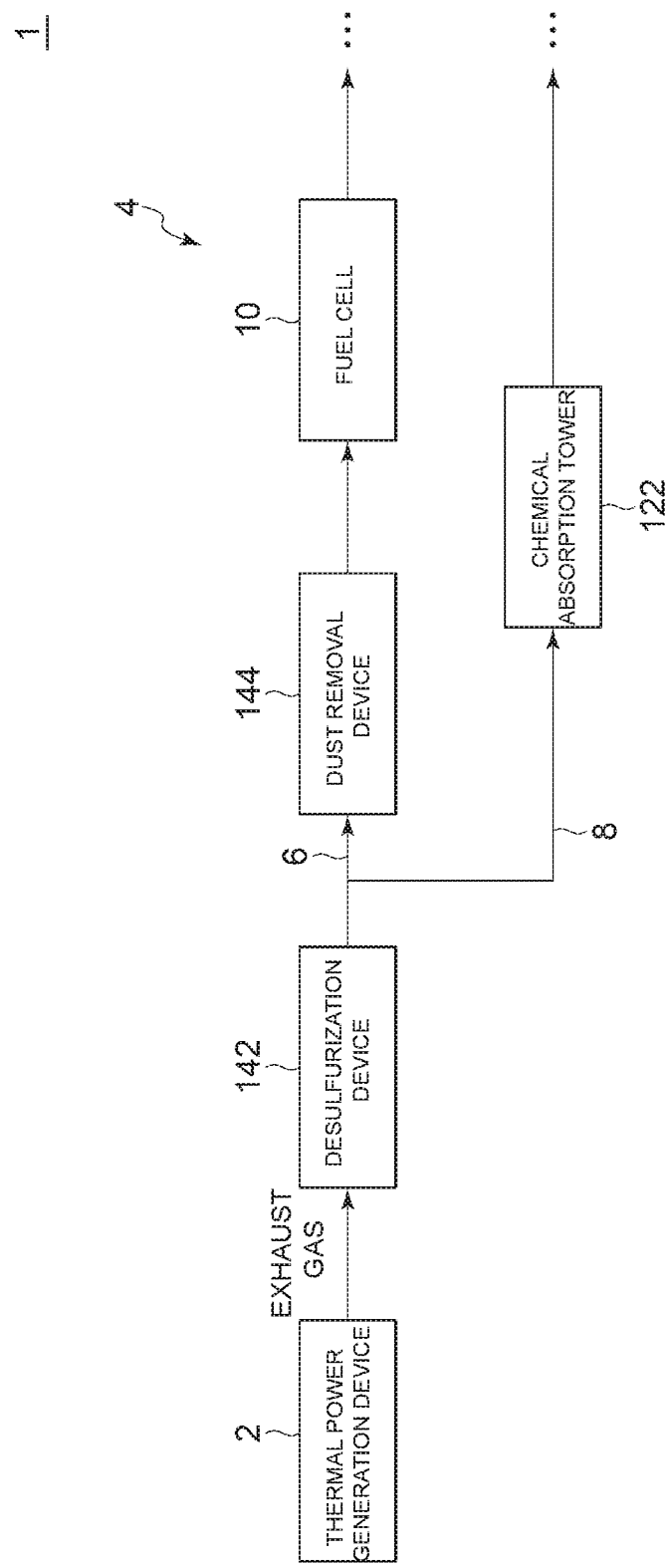
FIG. 7 is a configuration diagram of a portion of a carbon dioxide recovery system according to an embodiment.

FIG. 7 is a configuration diagram of a portion of the carbon dioxide recovery system 4 according to an embodiment.

In some embodiments, as shown in FIG. 7, a desulfurization device 142 is disposed on the first exhaust gas passage 6, upstream of the branch point between the first exhaust gas passage 6 and the second exhaust gas passage 8. The desulfurization device 142 is configured to remove sulfur contents contained in exhaust gas flowing through the first exhaust gas passage 6.

Exhaust gas discharged from the thermal power generation device or the like can contain sulfur contents such as sulfur oxide (e.g., $SO_2$).

If exhaust gas containing $SO_2$ is supplied to the chemical absorption tower 120, the absorption liquid can absorb $SO_2$ in exhaust gas at the chemical absorption tower 120. In this case, $SO_2$ is not released but accumulated in the absorption liquid at the absorption liquid regeneration tower 122 (see FIG. 6), which can decrease the $CO_2$ absorption performance of the absorption liquid.

Further, in the fuel cell 10, exhaust gas is directly supplied to the cathode 12 (see FIG. 6). Thus, if exhaust gas from the first exhaust gas passage 6 contain impurities such as sulfur contents, the impurities are introduced into the cathode 12, which can decrease the power generation performance of the fuel cell 10.

In this regard, if the desulfurization device 142 is disposed on the first exhaust gas passage 6 upstream of the branch point, the fuel cell 10 and the chemical absorption tower 120 can share the desulfurization device for pre-treatment. This means that it is possible to correctively remove sulfur contents contained in exhaust gas supplied to the fuel cell 10 and sulfur contents contained in exhaust gas supplied to the chemical absorption tower 120, on the upstream side of the branch point.

As a result, it is possible to suppress the reduction in performance of the fuel cell 10 and the chemical absorption tower 120 due to sulfur contents contained in exhaust gas while reducing the installation cost of the desulfurization device, compared to a case where separate desulfurization devices are provided to the fuel cell 10 and the chemical absorption tower 120.

The desulfurization device 142 may be a high-level desulfurization device configured to bring exhaust gas into contact with a basic absorption liquid (e.g., absorption liquid containing a basic sodium compound), so that the absorption liquid absorbs $SO_2$ in the exhaust gas, for instance.

In some embodiments, as shown in FIG. 7, a dust removal device 144 is disposed downstream of the branch point between the first exhaust gas passage 6 and the second exhaust gas passage 8 and upstream of the cathode 12 (fuel cell 10) for removing soot and dust in exhaust gas supplied to the cathode 12.

With the dust removal device 144 disposed downstream of the branch point and upstream of the cathode 12 of the fuel cell 10, it is possible to supply exhaust gas from which soot and dust are removed to the cathode 12, and thus it is possible to suppress the reduction in performance of the fuel cell 10 due to soot and dust in exhaust gas.

The dust removal device 144 may be disposed upstream of the branch point between the first exhaust gas passage 6 and the second exhaust gas passage 8. In this case, exhaust gas from which soot and dust are removed by the dust removal device 144 are supplied to both the cathode 12 of the fuel cell 10 and the chemical absorption tower 120.

However, soot and dust contained in exhaust gas affect the performance deterioration more significantly in the fuel cell 10, to which exhaust gas is directly supplied, than in the chemical absorption tower 120, in which $CO_2$ is absorbed to the absorption liquid.

In this regard, as shown in FIG. 7, if the dust removal device 144 is disposed downstream of the branch point and upstream of the cathode 12 (fuel cell 10), the flow rate of exhaust gas to be treated is reduced compared to a case where the dust removal device 144 is disposed upstream of the branch point. Thus, it is possible to downsize the dust removal device 144 or it is possible to reduce the power for driving the dust removal device 144.

In some embodiments, the carbon dioxide recovery system 4 (see FIG. 6) further includes a flow rate adjustment part 7 for adjusting a first flow rate of exhaust gas supplied to the cathode 12 via the first exhaust gas passage 6.

With the flow rate adjustment part 7, an appropriate flow rate (first flow rate) of exhaust gas can be supplied to the cathode 12 to operate the fuel cell 10. Thus, it is possible to maintain an appropriate operating state (e.g., temperature) of the fuel cell 10. Further, in a case where the current between the anode and the cathode needs to be decreased with the reduction in voltage due to degradation of the fuel cell 10, it is possible to maintain the fuel cell 10 in an appropriate temperature range by decreasing the exhaust gas supply amount (first flow rate) to the cathode 12.

The flow rate adjustment part 7 may be disposed on the first exhaust gas passage 6, or may be disposed on the second exhaust gas passage 8.

For instance, the flow rate adjustment part 7 may be disposed between the branch point and the cathode inlet 12*a* as shown in FIG. 6, or may be disposed between the cathode outlet 12*b* and the chimney 126, on the first exhaust gas passage 6. Alternatively, the flow rate adjustment part 7 may be disposed between the branch point and the inlet of the chemical absorption tower 120, on the second exhaust gas passage 8.

The flow rate adjustment part 7 may be composed of a damper. By using the damper as the flow rate adjustment part 7, it is possible to adjust the flow rate (first flow rate) of exhaust gas supplied to the cathode 12 of the fuel cell 10 via the first exhaust gas passage 6, with a simple structure.

In some embodiments, the carbon dioxide recovery system 4 (see FIG. 6) may include a control part 5 for controlling the flow rate adjustment part 7.

Hereinafter, the concept to adjust the flow rate of exhaust gas by the control part 5 will be described in more detail.

Figure 8:
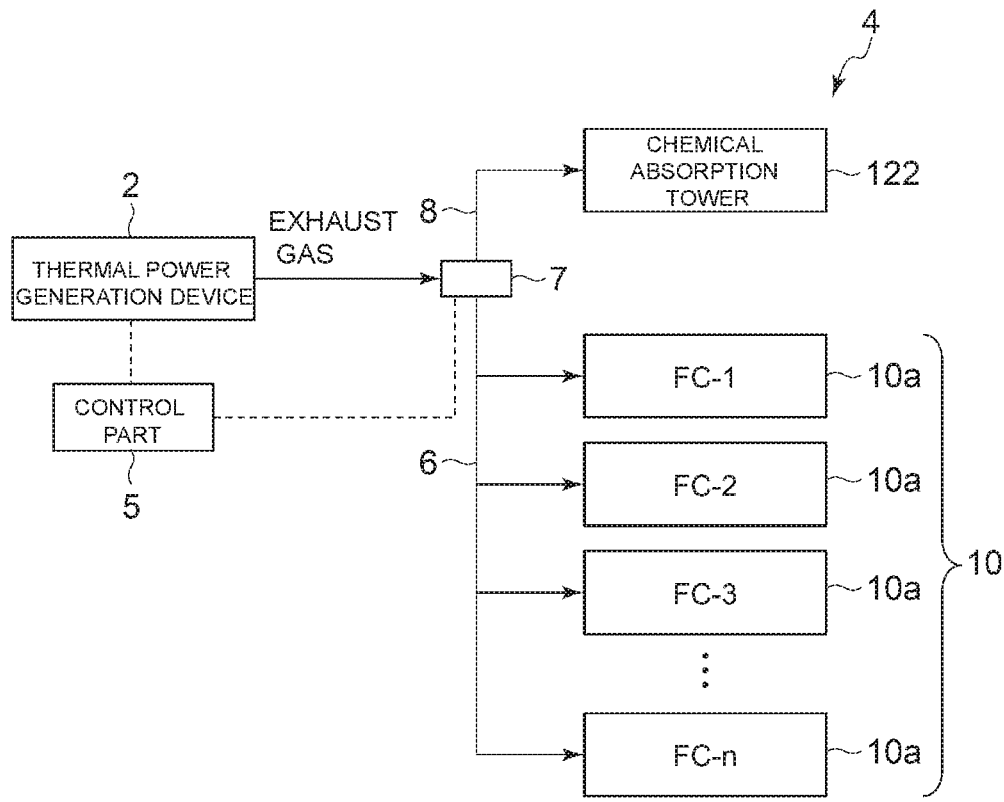
FIG. 8 is a conceptual diagram of an example of a flow rate control of exhaust gas from a thermal power generation device.

FIG. 8 is a conceptual diagram of an example of a flow rate control when exhaust gas from the thermal power generation device 2 is distributed to the fuel cell 10 and the chemical absorption tower 120. As shown in FIG. 8, exhaust gas from the thermal power generation device 2 (exhaust gas generation facility) is divided at the branch point into exhaust gas supplied to the cathode 12 (see FIG. 6) of the fuel cell 10 via the first exhaust gas passage 6 and exhaust gas supplied to the chemical absorption tower 120 via the second exhaust gas passage 8.

As described above, the flow rate (first flow rate) of exhaust gas supplied to the cathode 12 via the first exhaust gas passage 6 is adjusted by the flow rate adjustment part 7. Assuming that a third flow rate is the flow rate of exhaust gas supplied to the chemical absorption tower 120 via the second exhaust gas passage 8, the sum of the first flow rate and the third flow rate is the total flow rate of exhaust gas from the thermal power generation device 2.

In the carbon dioxide recovery system 4, the fuel cell 10 may include a plurality of fuel cell units 10*a* arranged in series or in parallel. The fuel cell unit 10*a* is a unit which has an individual housing and independently functions as a fuel cell. The number of the fuel cell units 10*a* may be determined based on the flow rate of exhaust gas to be treated at the fuel cell 10 or the capacity of the fuel cell unit 10*a*.

In the example shown in FIG. 8, the fuel cell 10 includes n-number of fuel cell units 10*a* represented by "FC-1" to "FC-n" which are arranged in parallel. Further, exhaust gas is supplied to the cathode 12 of the fuel cell 10 composed of the fuel cell units 10*a* (i.e., respective cathodes of the fuel cell units 10*a*) at the first flow rate as a whole.

Figure 9:
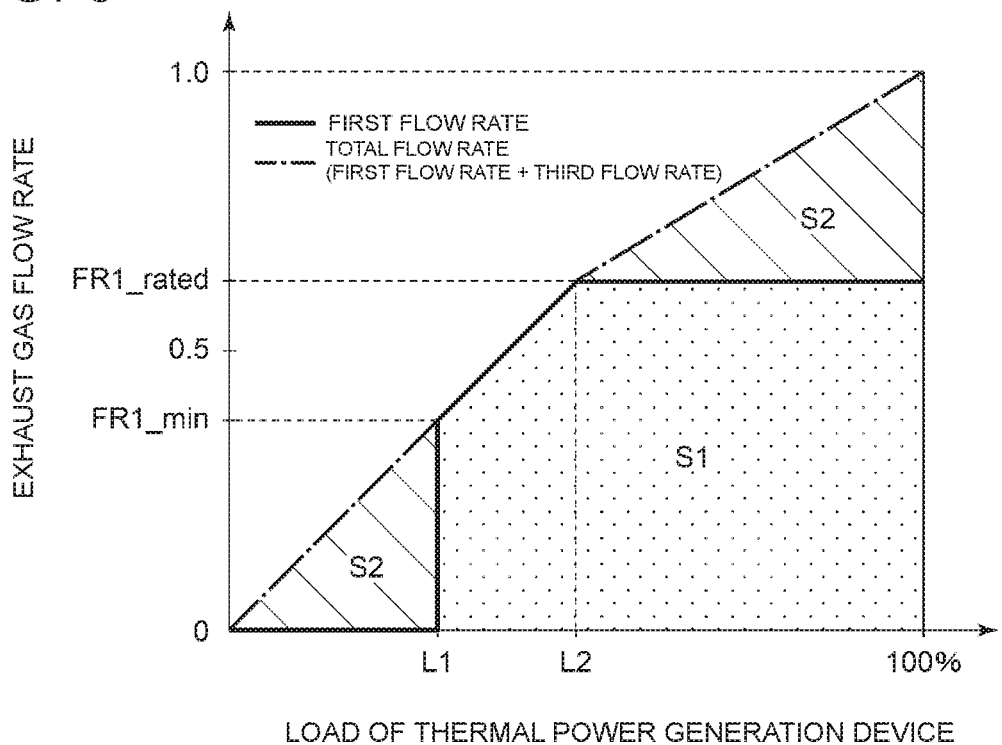
FIG. 9 is a graph showing an exemplary relationship between the load of a thermal power generation device and a first flow rate adjusted by a control part.

Here, FIG. 9 is a graph showing an exemplary relationship between the load of the exhaust gas generation facility (thermal power generation device 2) and the first flow rate adjusted by the control part 5.

The horizontal axis of the graph of FIG. 9 represents the load (horizontal axis) of the thermal power generation device 2. The load 100% means the rated load of the thermal power generation device 2. The vertical axis of the graph of FIG. 9 represents the exhaust gas flow rate, which shows the first flow rate of exhaust gas supplied to the cathode 12 of the fuel cell 10 and the total flow rate of exhaust gas from the thermal power generation device 2 (the sum of the first flow rate and the third flow rate supplied to the chemical absorption tower 120), expressed by relative values compared to the total flow rate of exhaust gas during rated operation (operation at rated load) of the thermal power generation device 2, defined as 1. In the graph of FIG. 9, region S1 represents a portion occupied by the first flow rate of the total flow rate of exhaust gas, and region S2 represents a portion occupied by the third flow rate of the total flow rate of exhaust gas.

In some embodiments, the control part 5 is configured to control the flow rate adjustment part 7 (for instance, to adjust the opening degree of the damper) so that the first flow rate supplied to the cathode 12 of the fuel cell 10 is kept constant, regardless of the magnitude of the exhaust gas generation facility, in at least a partial load range of the exhaust gas generation facility (in the exemplary embodiment shown in FIG. 6, thermal power generation device 2) which is the exhaust gas generation source.

In an embodiment, the control part 5 may be configured to control the flow rate adjustment part 7 so that the first flow rate is constant at a rated flow rate corresponding to the rated load of the fuel cell 10 at least when the load of the exhaust gas generation facility is within a load range that is equal to or larger than a threshold larger than zero and lower than the rated load of the exhaust gas generation facility (thermal power generation device 2) and that is equal to or lower than the rated load of the exhaust gas generation facility, regardless of the magnitude of this load.

For instance, as shown in the graph of FIG. 9, when the load of the thermal power generation device 2 is within a load range of threshold L2 or more and 100% (rated load) or less, the control part 5 may control the flow rate adjustment part 7 so that the first flow rate is kept at the rated flow rate FR1 RATED corresponding to the rated load of the fuel cell 10, regardless of the magnitude of the load of the thermal power generation device 2.

The load of the exhaust gas generation facility typified by the thermal power generation device (e.g., thermal power generation device 2) is not necessarily constant, and the load can change in response to the demand from a utility grid, for instance (see the graph of FIG. 9, for instance). In this case, the exhaust gas generation amount (the above-described total flow rate) from the exhaust gas generation facility changes, and the exhaust gas supply amount (first flow rate) to the cathode 12 of the fuel cell 10 also changes accordingly, which can cause the first flow rate to deviate from the target flow rate at which the fuel cell 10 can operate stably.

In this regard, by appropriately controlling the flow rate adjustment part 7 with the control part 5, it is possible to keep the first flow rate constant during operation of the exhaust gas generation facility (thermal power generation device 2) in at least a partial load range, regardless of the magnitude of the load of the exhaust gas generation facility (thermal power generation device 2). Thus, even if the load of the exhaust gas generation facility (thermal power generation device 2) changes, it is possible to maintain stable operation of the fuel cell 10.

For instance, as in the example shown in FIG. 9, by operating the fuel cell 10 at rated load in at least a high-load region (threshold L2 or more and rated load (100%) or less) of the exhaust gas generation facility (thermal power generation device 2), it is possible to suppress the reduction in energy efficiency of the entire plant while maintaining stable operation of the fuel cell 10.

The constant value (in the example of FIG. 9, the rated flow rate FR1 RATED) of the first flow rate in the high-load region may be changed in accordance with the state change of the fuel cell 10 with the passage of time.

For instance, in a case where the fuel cell 10 degrades and the current between the anode and the cathode needs to be decreased with the reduction in voltage due to degradation of the fuel cell 10, the constant value of the first flow rate may be set so that the amount (first flow rate) of exhaust gas supplied to the fuel cell 10 in the high-load region is kept smaller than the rated flow rate (FR1 RATED).

As described above, the constant value of the first flow rate in the high-load region may be set to be changed from the rated flow rate (FR1 RATED), considering the state change, such as degradation of the fuel cell 10.

In a case where the first flow rate is adjusted in accordance with the graph shown in FIG. 9, the difference between the total flow rate and the first flow rate is supplied to the chemical absorption tower 120 as the third flow rate in the high-load region (load range of threshold L2 or more and 100% or less). Specifically, in this load range, the first flow rate supplied to the fuel cell 10 is constant while the third flow rate supplied to the chemical absorption tower 120 changes depending on increase or decrease of the load. Thus, in the high-load region, even if the load of the thermal power generation device 2 fluctuates, the operation of the fuel cell 10 at rated load can continue while the third flow rate to the chemical absorption tower 120 changes with fluctuation of the load.

Thus, for instance, compared to a case where a part of the fuel cell 10 (a part of the fuel cell units 10*a*) is temporarily suspended and reactivated in accordance with fluctuation of the load of the thermal power generation device 2 (exhaust gas generation facility), it is possible to improve the operating rate of the fuel cell 10, and it is possible to suppress the increase in power generation cost of the entire plant.

Even in a case where the first flow rate of exhaust gas supplied to the fuel cell 10 is equal to or less than the rated flow rate, the fuel cell 10 can operate stably if a certain amount of exhaust gas can be supplied. In view of this, in at least a partial load range where the load of the thermal power generation device 2 is less than a threshold and the total flow rate of exhaust gas is equal to or less than the rated flow rate of the fuel cell 10, the control part 5 may perform a control so that exhaust gas is supplied to the fuel cell 10 at the first flow rate that is equal to the total flow rate of exhaust gas.

For instance, if stable operation of the fuel cell 10 can be maintained by the first flow rate that is equal to or more than the total flow rate of exhaust gas when the load of the thermal power generation device 2 is L1 (FR1 min in FIG. 9), the total flow rate of exhaust gas from the thermal power generation device 2 may be supplied to the fuel cell 10 as the first flow rate when the load of the thermal power generation device 2 is in a load range of L1 or more and less than L2 (the above-described threshold), as shown in FIG. 9.

Thereby, it is possible to generate power with the fuel cell 10 in a wider load range than the exhaust gas generation device (thermal power generation device 2), and it is possible to recover carbon dioxide with an improved power generation efficiency of the entire plant.

Further, when the load of the exhaust gas generation facility is small (e.g., in a load range less than L1 in FIG. 9) for instance at starting-up of the thermal power generation device 2, there is a possibility that the fuel cell 10 cannot be stably operated even if the total flow rate of exhaust gas from the exhaust gas generation facility is supplied to the fuel cell 10 due to, for instance, inability to ensure thermal energy (reaction heat) for maintaining the temperature required for stable operation of the fuel cell 10. In this case, the total amount (total flow rate) of exhaust gas from the exhaust gas generation facility may be supplied to the chemical absorption tower 120 as the third flow rate. Thereby, it is possible to appropriately recover carbon dioxide in accordance with the load range of the exhaust gas generation facility (thermal power generation device 2).

Next, with reference to FIG. 6, a method of installing the carbon dioxide recovery system 4 according to some embodiments will be described.

The method of installing the carbon dioxide recovery system 4 according to some embodiments includes the steps of: providing a first exhaust gas passage 6 through which exhaust gas from the thermal power generation device 2 flows, providing a fuel cell 10 so that a cathode 12 of the fuel cell 10 is disposed on the first exhaust gas passage 6; providing a second exhaust gas passage 8 diverging from the first exhaust gas passage 6 upstream of the cathode 12; and providing a chemical absorption tower 120 having an absorption liquid for absorbing carbon dioxide on the second exhaust gas passage 8.

According to the above-described method of installing the carbon dioxide recovery system 4, the first exhaust gas passage 6, the second exhaust gas passage 8, the fuel cell 10, and the chemical absorption tower 120 are additionally provided to the existing thermal power generation device 2 to construct the carbon dioxide recovery system 4 described above. Thus, exhaust gas from the thermal power generation device 2 is distributed to the chemical absorption tower 120 and the fuel cell 10 to operate both components. By this means, it is possible to suppress the reduction in energy efficiency of the entire plant while responding to the change in exhaust gas flow rate.

In an embodiment, the method of installing the carbon dioxide recovery system 4 may further include the step of providing, on the first exhaust gas passage 6, the heat exchanger 124 for heat exchange between exhaust gas on the side of the cathode inlet 12*a* in the first exhaust gas passage 6 and exhaust gas on the side of the cathode outlet 12*b* in the first exhaust gas passage 6.

By providing the heat exchanger 124, even if exhaust gas from the thermal power generation device or the like has a relatively-low temperature, it is possible to supply the exhaust gas to the cathode 12 after heated by heat exchange with exhaust gas on the side of the cathode outlet 12b having a high temperature due to reaction heat caused in the fuel cell 10. Thus, it is possible to make use of thermal energy generated at the fuel cell 10 to keep the appropriate temperature of the fuel cell 10 for stable operation.

For instance, the thermal power generation device 2 including a waste heat recovery boiler generally discharges exhaust gas having a relatively-low temperature cooled by heat exchange with steam (water). In this case, providing the fuel cell 10, the chemical absorption tower 120, and the heat exchanger 124 to the carbon dioxide recovery system 4 in combination enables thermal energy generated at the fuel cell 10 to be used for heating the exhaust gas having a relatively-low temperature, so that the fuel cell 10 is stably operated at the appropriate temperature, and further enables carbon dioxide in the exhaust gas to be recovered with less reduction in energy efficiency of the entire plant while responding to the change in exhaust gas flow rate.

Although the above-described method of installing the carbon dioxide recovery system 4 is applied to the thermal power generation device 2, the same installation method can be used to install the carbon dioxide recovery system 4 to various exhaust gas generation facilities including exhaust gas generation devices other than the thermal power generation device 2.

Third Aspect of Present Invention

Figure 10:
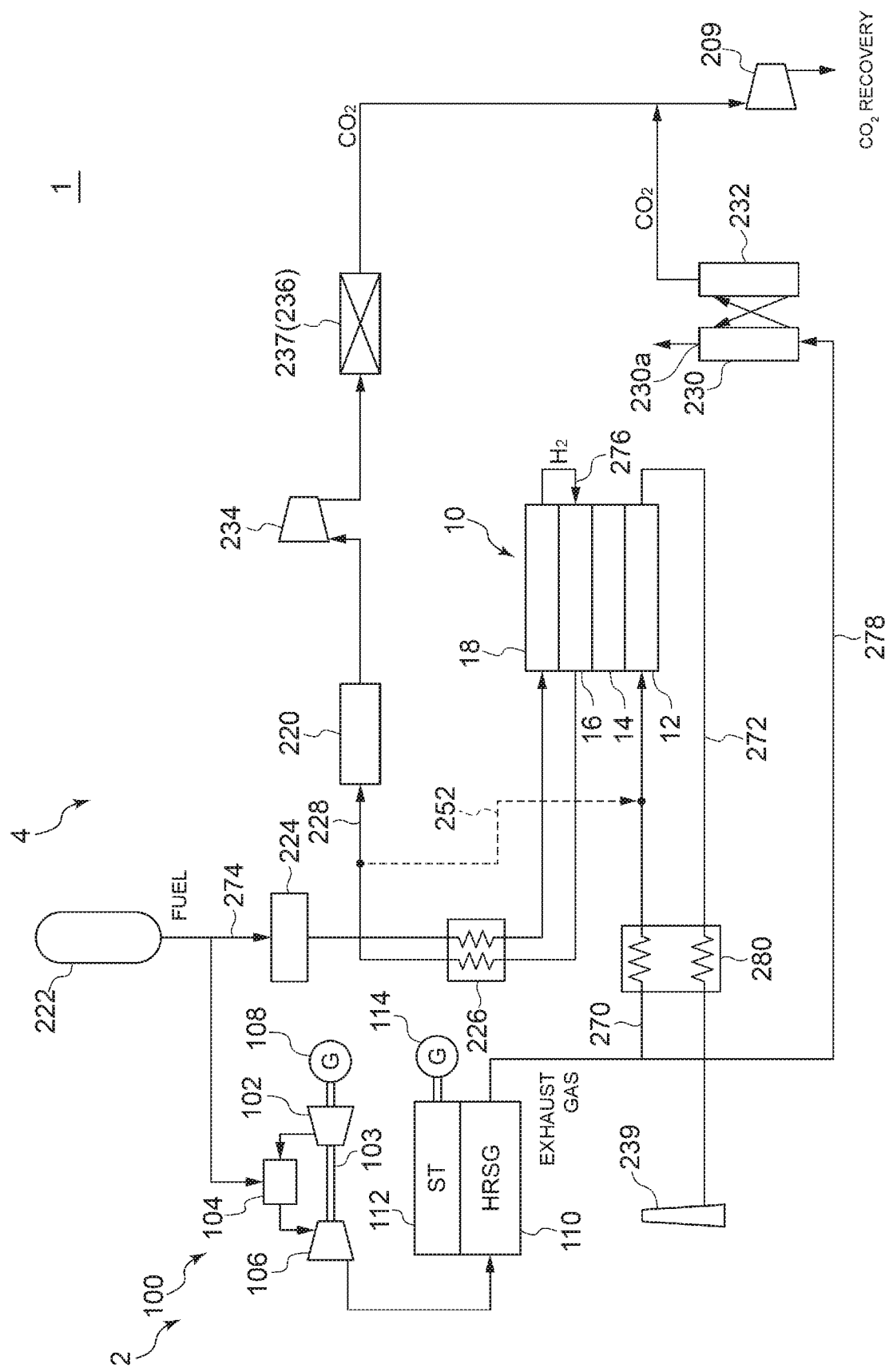
FIG. 10 is a schematic configuration diagram of a thermal power generation facility according to an embodiment.
Figure 11:
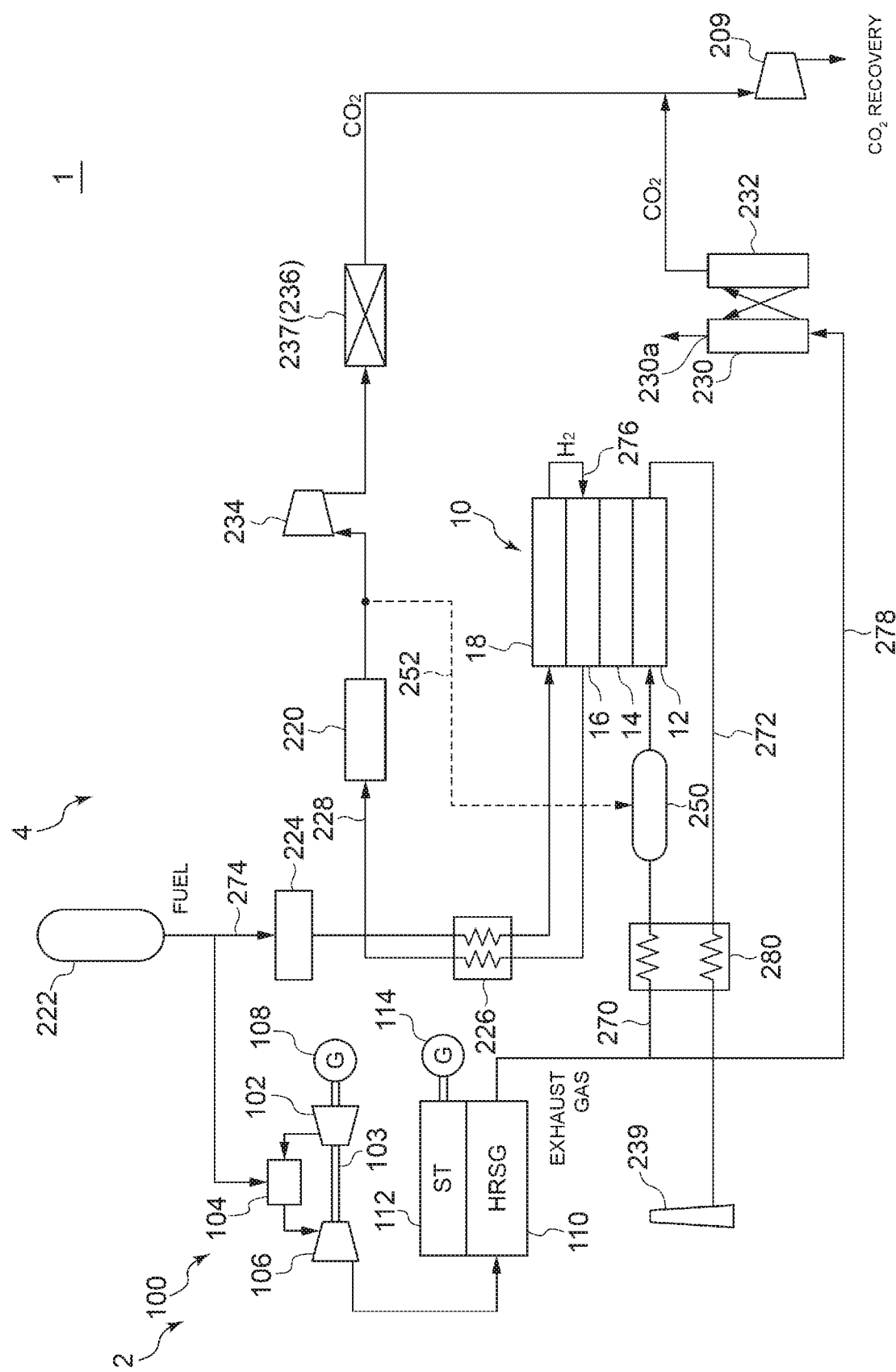
FIG. 11 is a schematic configuration diagram of a thermal power generation facility according to an embodiment.
Figure 12:
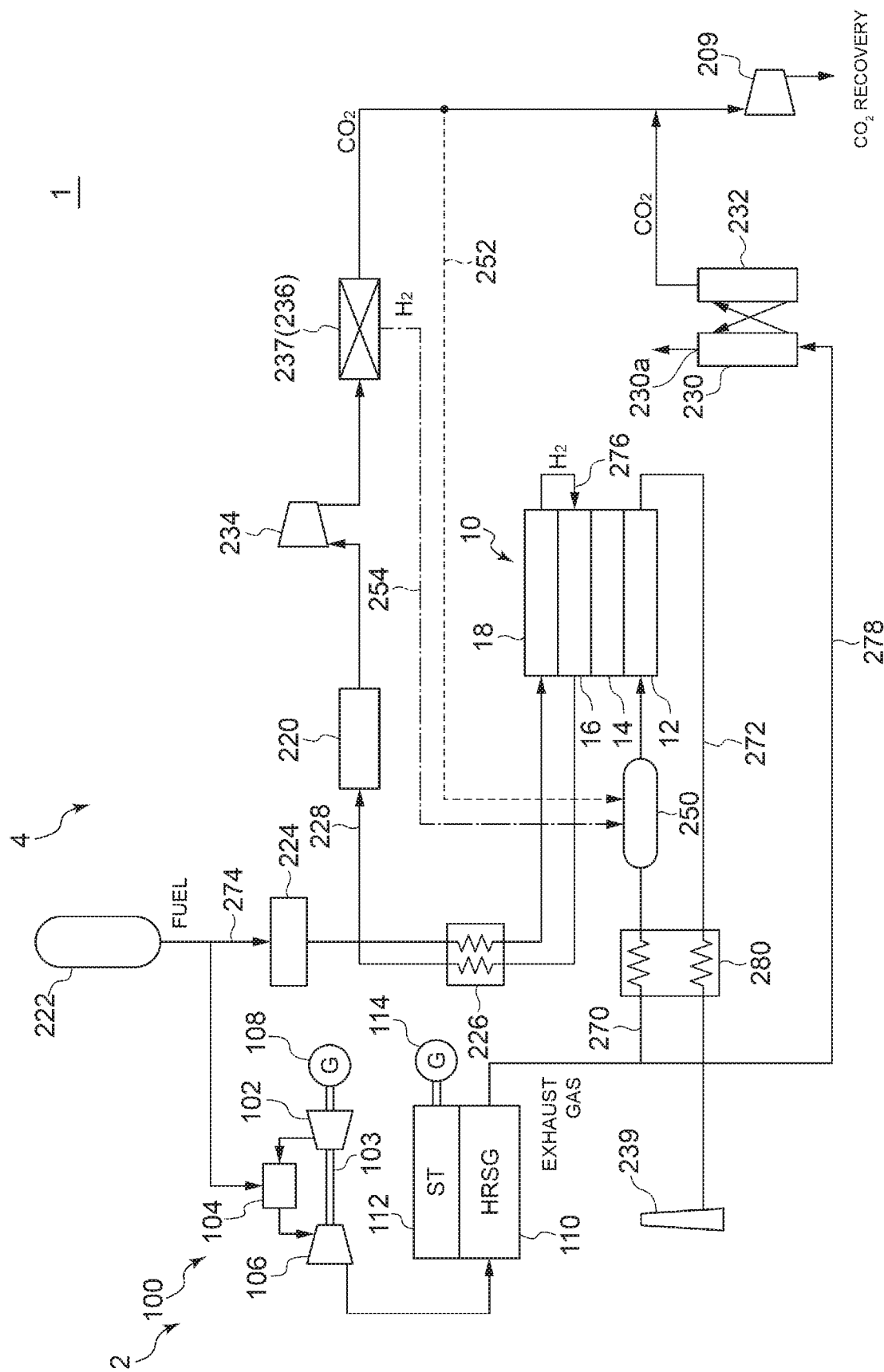
FIG. 12 is a schematic configuration diagram of a thermal power generation facility according to an embodiment.

In the exemplary embodiments shown in FIGS. 10 to 12, the thermal power generation device 2 is a gas turbine combined power generation device including a gas turbine 100 and a waste heat recovery boiler 110 for recovering heat of exhaust gas supplied from the gas turbine 100. In the above embodiments, the carbon dioxide recovery system 4 is configured to recover $CO_2$ contained in exhaust gas supplied from the waste heat recovery boiler 110. In the exemplary embodiments shown in FIGS. 13 to 15, the thermal power generation device 2 is a thermal power generation device including a gas turbine 100. In the above embodiments, the carbon dioxide recovery system 4 is configured to recover $CO_2$ contained in exhaust gas supplied from the gas turbine 100.

The gas turbine 100 shown in FIGS. 10 to 15 includes a compressor 102 for compressing air, a combustor 104 for burning a fuel (e.g., natural gas) to produce a combustion gas, and a turbine 106 configured to be rotary driven by the combustion gas.

The fuel (e.g., natural gas) is supplied from a fuel storage part 222 to the combustor 104. Further, the air compressed by the compressor 102 is fed to the combustor 104. The compressed air serves as an oxidant when the fuel is burned in the combustor 104.

To the turbine 106, a generator 108 is connected via a rotational shaft 103, so that the generator 108 is driven by rotational energy of the turbine 106 to generate electric power. The combustion gas used in the turbine 106 is discharged from the turbine 106 as exhaust gas.

The waste heat recovery boiler 110 shown in FIGS. 10 to 12 includes a duct (not shown) to which exhaust gas from the gas turbine 100 is introduced and a heat exchanger (not shown) disposed on the duct. The heat exchanger is configured to generate steam by heat exchange with exhaust gas flowing through the duct. The steam generated at the waste heat recovery boiler 110 is introduced to a steam turbine 112 and rotary drive the steam turbine 112. To the steam turbine 112, a generator 114 is connected, so that the generator 114 is rotary driven by the steam turbine 112 to generate electric power.

Exhaust gas flowing through the duct of the waste heat recovery boiler 110 and passing through the heat exchanger is discharged from the waste heat recovery boiler via the duct outlet.

Hereinafter, the carbon dioxide recovery system 4 according to some embodiments will be described.

The carbon dioxide recovery system 4 according to the exemplary embodiments shown in FIGS. 10 to 15 includes a cathode inlet passage 270 through which exhaust gas from the thermal power generation device 2 or the waste heat recovery boiler 110 flows and a bypass passage 278 diverging from the cathode inlet passage 270. Exhaust gas from the thermal power generation device 2 or the waste heat recovery boiler 110 is divided at the branch point to the cathode inlet passage 270 and the bypass passage 278 and supplied to a cathode 12 of a fuel cell 10 and a chemical absorption tower 230 described later, respectively.

That is, the cathode inlet passage 270 and the bypass passage 278 in the third aspect correspond to the first exhaust gas passage 6 and the second exhaust gas passage 8 in the first aspect, respectively.

As shown in FIGS. 10 to 15, the carbon dioxide recovery system 4 includes a fuel cell 10 including a cathode 12 to which exhaust gas is supplied from the thermal power generation device 2, a $CO_2$-rich gas line (anode outlet passage) 228 connected to the outlet of an anode 16 of the fuel cell 10, and a recycle line 252 having one end connected to the $CO_2$-rich gas line 228. The $CO_2$-rich gas line 228 is configured to introduce $CO_2$-rich gas derived from the outlet gas of the anode 16. Further, the recycle line 252 is configured to return a part of $CO_2$-rich gas flowing through the $CO_2$-rich gas line 228 to the inlet side of the cathode 12.

Carbon dioxide contained in exhaust gas from the thermal power generation device 2 is recovered via the fuel cell 10 and the $CO_2$-rich gas line 228, as described below.

Herein, the $CO_2$-rich gas derived from the anode outlet gas may be the anode outlet gas as is or may be a gas obtained by subjecting the anode outlet gas to predetermined treatment (e.g., CO shift reaction with a CO shift reactor 220 or membrane separation with a gas separation unit 236 described below). The $CO_2$-rich gas means a gas having a higher $CO_2$ concentration than exhaust gas to be treated.

The fuel cell 10 basically has the same configuration as the fuel cell 10 according to the first aspect of the present invention described above. However, in embodiments according to the third aspect, exhaust gas containing $CO_2$ from the thermal power generation device 2 is supplied to the cathode 12 of the fuel cell 10 via the cathode inlet passage 270, and fuel gas containing hydrogen ($H_2$) is supplied from an anode inlet passage 276 to the anode 16.

The anode 16 is connected to a fuel storage part 222 storing a fuel (e.g., natural gas) via the anode inlet passage 276 and a fuel supply passage 274. The fuel in the fuel storage part 222 is reformed to hydrogen ($H_2$) and supplied to the anode 16 via the anode inlet passage 276.

For instance, in the exemplary embodiments shown in FIGS. 10 to 15, the fuel is reformed to produce hydrogen ($H_2$) by an auxiliary reformer 224 disposed on the fuel supply passage 274 and a reformation part 18 disposed on the fuel cell 10. Then, hydrogen produced by reforming of fuel is supplied to the anode 16 via the anode inlet passage 276.

$CO_2$ produced at the anode 16 flows out to the $CO_2$-rich gas line (anode outlet passage) 228 as a mixed gas (outlet gas of the anode 16) together with $H_2O$ and unreacted components (e.g., CO and $H_2$) of the fuel gas. The anode outlet gas flowing into the $CO_2$-rich gas line 228 is a $CO_2$-rich gas having a higher $CO_2$ concentration than exhaust gas to be treated.

$CO_2$ contained in $CO_2$-rich gas discharged from the anode 16 is recovered via the $CO_2$-rich gas line 228. The recovered $CO_2$ (i.e., $CO_2$ recovered at the anode 16 by the fuel cell 10) may be compressed by a compressor 209.

In some fuel cells (for instance, molten carbonate fuel cell described above), $CO_2$ concentration of the cathode inlet gas suitable for operating the fuel cell efficiently or stably is about 10% or more, for instance. By contrast, $CO_2$ concentration of exhaust gas from the gas turbine is about 3 to 4%, for instance, although depending on the composition of the fuel. Even if exhaust gas from the gas turbine is recirculated to the compressor of the gas turbine, $CO_2$ concentration of the exhaust gas from the gas turbine does not increase too much, and thus it is difficult to increase $CO_2$ concentration so as to suit the cathode inlet gas of the fuel cell.

In this regard, the above-described carbon dioxide recovery system 4 can increase $CO_2$ concentration at the inlet of the cathode 12 by recycling a part of $CO_2$-rich gas derived from the outlet gas of the anode 16 with a relatively-low amount of the recycle gas. Thus, it is possible to achieve $CO_2$ concentration suitable for operation of the fuel cell 10. Further, by increasing $CO_2$ concentration at the inlet of the cathode 12, it is possible to increase the electromotive force of the fuel cell 10 and improve the power generation efficiency of the fuel cell 10.

Additionally, with the above-described carbon dioxide recovery system 4, it is possible to increase $CO_2$ concentration of the cathode inlet with a relatively-low amount of the recycle gas. Thus, it is possible to reduce the amount of gas to be recycled, compared to a case where a part of exhaust gas of the gas turbine or a gas having passed through the cathode outlet is recirculated to the inlet of the compressor of the gas turbine to increase $CO_2$ concentration of the cathode inlet as described in Patent Document 1, for instance. Thus, it is possible to reduce the power required for recycling $CO_2$-rich gas.

As described in Patent Document 1 for instance, in a case where exhaust gas of the gas turbine combustor is recycled, SOx contents in the gas is condensed in the recycle line, and sulfate precipitates are generated, which can increase the cost related to corrosion of the heat exchanger or the like. In this regard, in the above-described carbon dioxide recovery system 4, exhaust gas with reduced sulfur contents is supplied to the cathode 12 of the fuel cell 10, whereby it is possible to keep SOx concentration low in the recycle line even if the gas derived from the outlet of the anode 16 is recycled at the inlet of the cathode 12. Thus, it is possible to prevent corrosion of heat-transfer tubes and ducts due to sulfur contents in the recycle gas.

Further, for instance, in a case where a part of exhaust gas of the gas turbine or a gas having passed through the cathode outlet is recirculated to the inlet of the compressor of the gas turbine to increase $CO_2$ concentration of the cathode inlet as described in Patent Document 1, particularly in a case where the load of the gas turbine is low, it is necessary to, for instance, limit the fuel input to keep the temperature of the combustor, which can lead to a situation in which $CO_2$ concentration cannot be increased. In this regard, in the above-described carbon dioxide recovery system 4, since the anode outlet gas is recycled to increase $CO_2$ concentration of the cathode inlet, it is possible to easily adjust $CO_2$ concentration of the cathode inlet, regardless of the operating state of components such as the gas turbine 100 and the waste heat recovery boiler 110.

Incidentally, the reforming reaction of fuel is an endothermic reaction and thus usually needs heat from the outside. In view of this, as shown in FIGS. 10 to 15, a heat exchanger 226 may be disposed upstream of the reformation part 18 to heat the fuel supplied to the reformation part 18 via the fuel supply passage 274. By supplying the fuel heated with the heat exchanger 226 to the reformation part 18, it is possible to efficiently reform the fuel.

In the embodiment shown in FIGS. 10 to 15, the heat exchanger 226 is configured to heat the fuel supplied from the fuel supply passage 274 to the reformation part 18 through heat exchange with the outlet gas ($CO_2$-rich gas) of the anode 16.

A molten carbonate fuel cell works at a high temperature of about 600° C. to 700° C., and a gas flowing out of the anode 16 has nearly the same high temperature. Thus, with the above-described heat exchanger 226, it is possible to make use of reaction heat caused in the fuel cell 10 to reform the fuel.

Further, generally, the operating temperature of the fuel cell 10 is about 600° C. to 700° C. Thus, to keep the fuel cell 10 in an appropriate operating state, it is desirable to have exhaust gas supplied to the fuel cell 10 at high temperature to some extent. Moreover, the temperature of exhaust gas from the thermal power generation device 2 can be lower than the operating temperature of the fuel cell 10 in some cases.

Thus, in some embodiments, exhaust gas (inlet gas of the cathode 12) supplied to the cathode 12 may be heated with a heat exchanger 280 (see FIGS. 10 to 12) or a combustor (for instance, combustor 250 described below; see FIGS. 11 to 14) disposed upstream of the cathode 12.

The heat exchanger 280 shown in FIGS. 10 to 12 is configured to heat exhaust gas flowing into the cathode 12 by heat exchange with a gas (outlet gas of the cathode 12) discharged from the cathode 12 to the cathode outlet passage 272. The outlet gas of the cathode 12 having passed through the heat exchanger 280 may be discharged to the outside through a chimney 239.

Thus, with the heat exchanger 280 for heat exchange between the inlet gas of the cathode 12 and the outlet gas of the cathode 12, it is possible to make use of thermal energy generated at the fuel cell 10 to keep the appropriate temperature of the fuel cell 10 for stable operation.

In some embodiments, as shown in FIGS. 10 to 15, the $CO_2$-rich gas line 228 is provided with a CO shift reactor 220 for converting CO contained in $CO_2$-rich gas. The CO shift reactor 220 is configured to convert CO contained in $CO_2$-rich gas into $CO_2$ by reaction with water ($H_2O$), for instance.

By converting CO with the CO shift reactor 220, it is possible to make $CO_2$ concentration of the $CO_2$-rich gas line 228 downstream of the CO shift reactor 220 higher than upstream of the CO shift reactor 220. Thereby, it is possible to recover carbon dioxide at higher purity.

In some embodiments, the $CO_2$-rich gas line 228 is provided with a gas separation unit 236 for separating gas components in $CO_2$-rich gas.

The gas separation unit 236 may be configured to separate $CO_2$ from $CO_2$-rich gas supplied to the gas separation unit 236. By separating $CO_2$ from $CO_2$-rich gas with the gas separation unit 236, it is possible to make $CO_2$ concentration of the $CO_2$-rich gas line 228 downstream of the gas separation unit 236 higher than upstream of the gas separation unit 236. Thereby, it is possible to recover carbon dioxide at higher purity.

In the exemplary embodiments shown in FIGS. 10 to 15, the gas separation unit 236 include a separation membrane 237 configured to separate $CO_2$ from $CO_2$-rich gas.

In some embodiments, the gas separation unit 236 may be configured to separate $CO_2$ from $CO_2$-rich gas by cryogenic separation process.

Further, as shown in FIGS. 10 to 15, a compressor 234 may be disposed upstream of the gas separation unit 236, on the $CO_2$-rich gas line 228, to increase the pressure of $CO_2$-rich gas to a pressure suitable for a separation method adopted in the gas separation unit 236.

In the carbon dioxide recovery system 4, to recover $CO_2$ contained in exhaust gas discharged from the thermal power generation device 2, in addition to the fuel cell 10 and the $CO_2$ recovery means via the $CO_2$-rich gas line 228 described above, other $CO_2$ recovery means may be used in combination.

For instance, in the exemplary embodiments shown in FIGS. 10 to 15, $CO_2$ is recovered from exhaust gas by using a chemical absorption tower 230 having an absorption liquid for absorbing $CO_2$ contained in exhaust gas and a regeneration tower 232 configured to separate $CO_2$ from the absorption liquid absorbing $CO_2$ at the chemical absorption tower 230.

Figure 13:
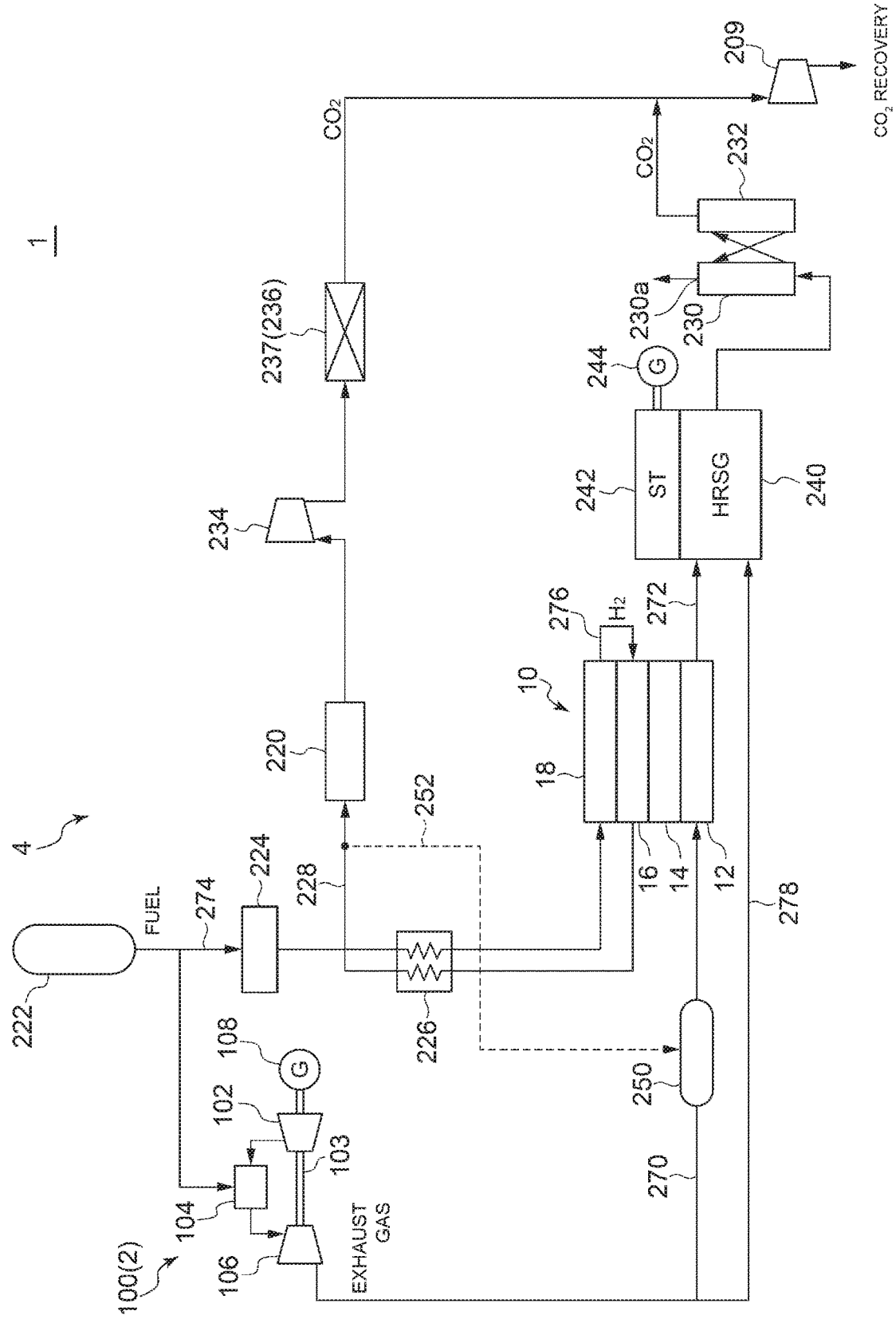
FIG. 13 is a schematic configuration diagram of a thermal power generation facility according to an embodiment.
Figure 14:
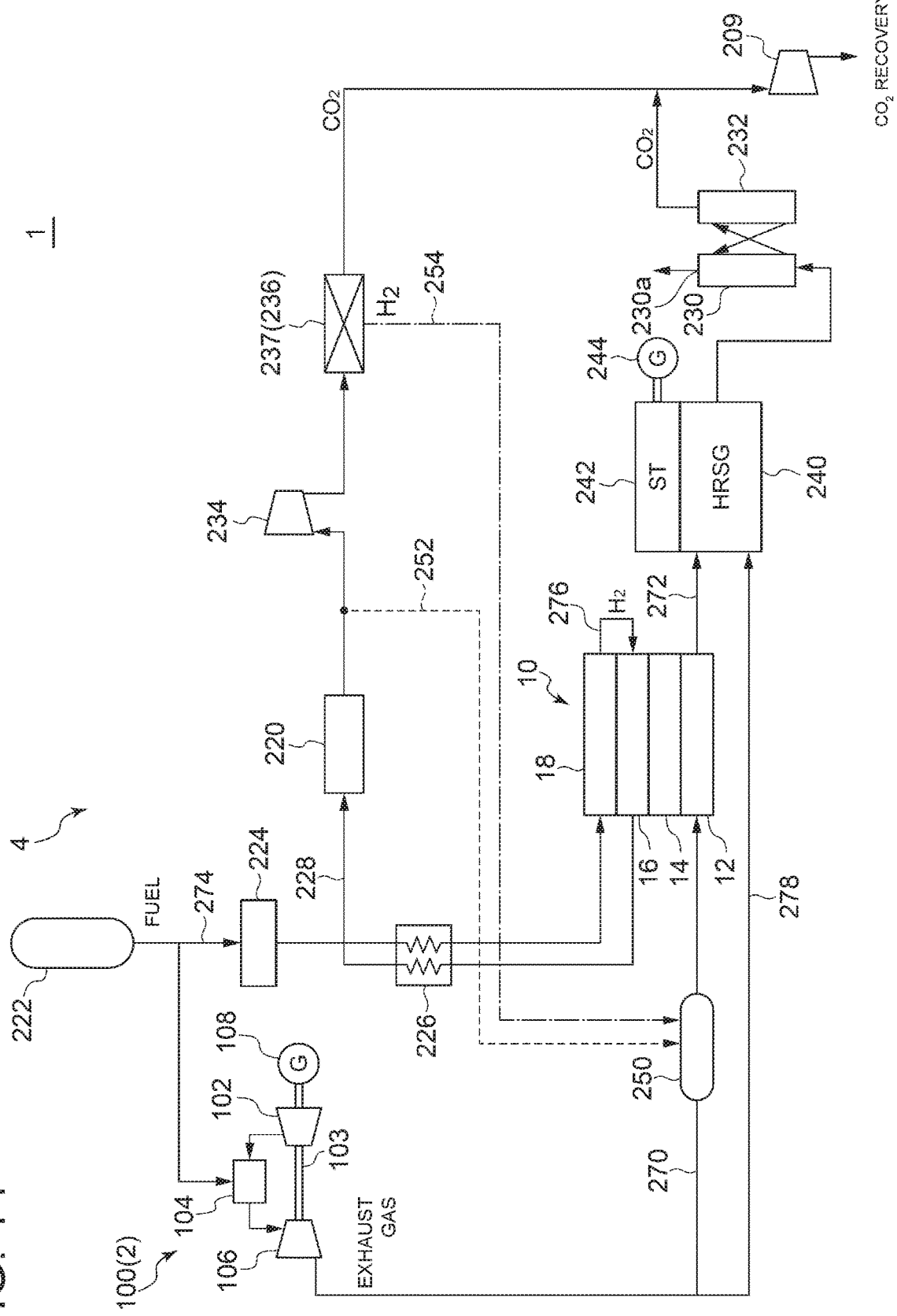
FIG. 14 is a schematic configuration diagram of a thermal power generation facility according to an embodiment.
Figure 15:
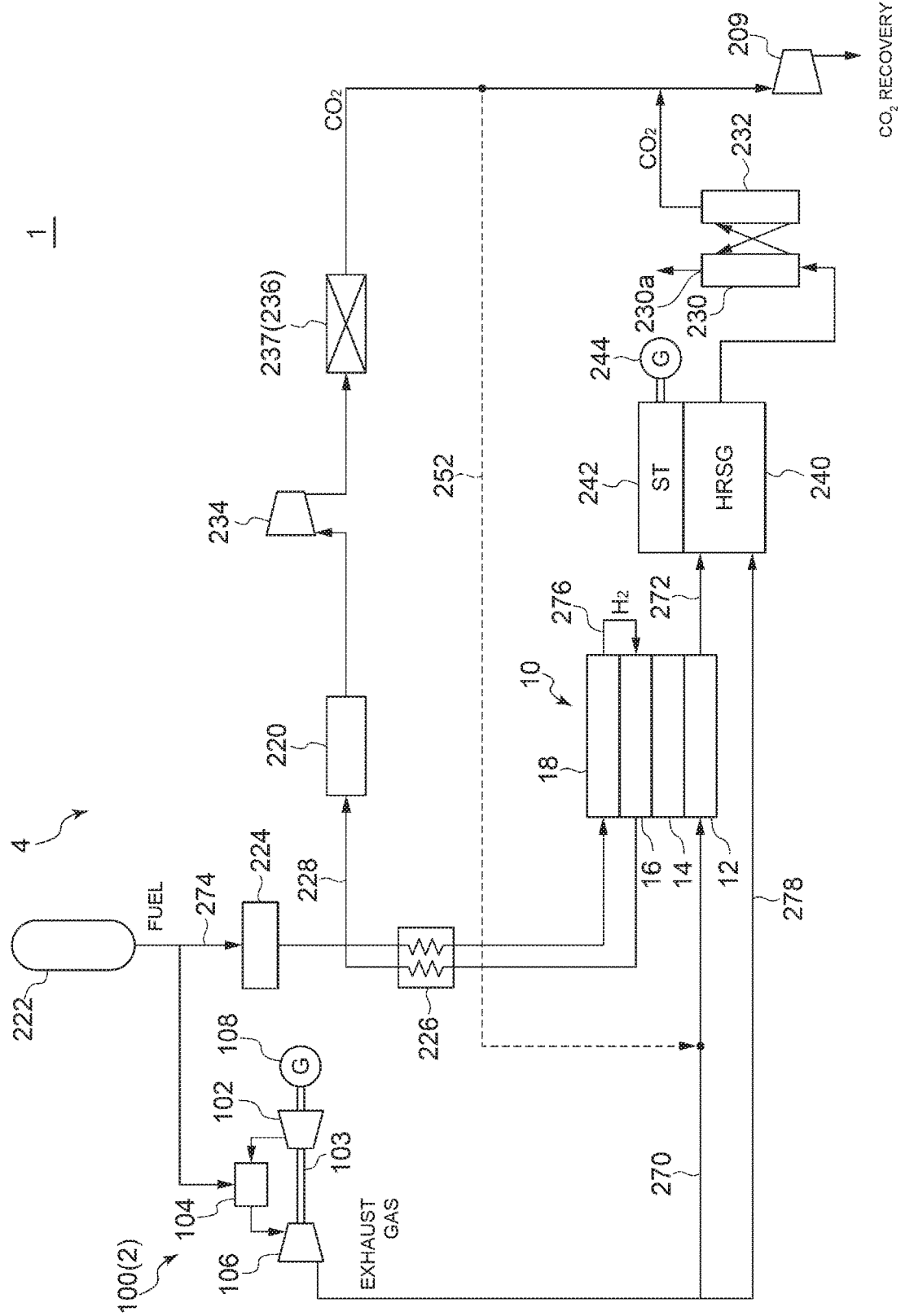
FIG. 15 is a schematic configuration diagram of a thermal power generation facility according to an embodiment.

In the embodiments shown in FIGS. 10 to 15, exhaust gas from the thermal power generation device 2 is introduced to the chemical absorption tower 230. The exhaust gas introduced to the chemical absorption tower 230 may include exhaust gas having passed through the cathode inlet passage 270 and the cathode 12 of the fuel cell 10 (see FIGS. 13 to 15), or may include exhaust gas having passed through the bypass passage 278 diverging from the cathode inlet passage 270 without passing through the cathode of the fuel cell 10 (see FIGS. 10 to 15). Further, the exhaust gas introduced to the chemical absorption tower 230 may include, for instance, exhaust gas from which the waste heat recovery boiler 240 recovers heat, as shown in FIGS. 13 to 15.

The waste heat recovery boiler 240 according to some embodiments may have the same configuration as the waste heat recovery boiler 110 which is a part of the thermal power generation device 2 described above. Specifically, in some embodiments, the waste heat recovery boiler 240 includes a duct (not shown) to which exhaust gas from the thermal power generation device 2 is introduced and a heat exchanger (not shown) disposed on the duct.

The heat exchanger is configured to generate steam by heat exchange with exhaust gas flowing through the duct. The steam generated at the waste heat recovery boiler 240 is introduced to a steam turbine 242 and rotary drive the steam turbine 242. To the steam turbine 242, a generator 244 is connected, so that the generator 244 is rotary driven by the steam turbine 242 to generate electric power.

In the embodiments shown in FIGS. 12 to 15, exhaust gas flowing through the duct of the waste heat recovery boiler 110 and passing through the heat exchanger is discharged from the waste heat recovery boiler via the duct outlet and introduced to the chemical absorption tower 230.

In the chemical absorption tower 230 according to an embodiment, the absorption liquid comes into contact with exhaust gas introduced to the chemical absorption tower 230, and thereby the absorption liquid absorbs $CO_2$ contained in exhaust gas. Consequently, $CO_2$ is removed from exhaust gas. The exhaust gas from which $CO_2$ is removed is discharged from an outlet 230a of the chemical absorption tower 230 as post-treated exhaust gas.

The absorption liquid absorbing $CO_2$ is transferred from the chemical absorption tower 230 to a regeneration tower 232 and is regenerated at the regeneration tower 232. In the regeneration tower 232, the absorption liquid absorbing $CO_2$ is heated by steam to separate and remove $CO_2$ from the absorption liquid (i.e., the absorption liquid is regenerated).

A gas containing $CO_2$ removed from the absorption liquid is discharged from the regeneration tower 232 and, for instance after moisture is removed by a moisture separator (not shown), $CO_2$ is recovered as gas. $CO_2$ discharged from the regeneration tower 232 (i.e., $CO_2$ recovered via the chemical absorption tower 230) may be compressed by the compressor 209.

On the other hand, the absorption liquid separated from $CO_2$ and regenerated by the regeneration tower 232 is returned to the chemical absorption tower 230 and used again to absorb $CO_2$ contained in exhaust gas supplied from the thermal power generation device 2.

The absorption liquid used in the chemical absorption tower 230 may contain amine. The absorption liquid containing amine has high reactivity with carbon dioxide. Accordingly, the use of the absorption liquid containing amine enables carbon dioxide to be effectively recovered even if carbon dioxide in exhaust gas has a low partial pressure.

The absorption liquid containing amine may be an aqueous solution of alkanolamine (e.g., monoethanolamine).

The carbon dioxide recovery system 4 according to some embodiments further has the following features.

In some embodiments, for instance as shown in FIGS. 11 to 14, a combustor 250 is disposed upstream of the cathode 12 on the cathode inlet passage 270.

To the combustor 250, $CO_2$-rich gas returned to the inlet side of the cathode 12 from the $CO_2$-rich gas line 228 via the recycle line 252 is introduced, and the $CO_2$-rich gas is combusted by the combustor 250.

The $CO_2$-rich gas combusted by the combustor 250 joins with exhaust gas flowing through the cathode inlet passage 270 and is supplied to the cathode 12.

Thus, by combusting un-combusted components (e.g. CO) including carbon contained in $CO_2$-rich gas returned to the inlet side of the cathode 12 by the combustor 250, it is possible to further increase $CO_2$ concentration of the cathode inlet.

The combustor 250 may include a burner for combusting $CO_2$-rich gas, for instance.

By using the burner as the combustor 250, it is possible to combust un-combusted components contained in $CO_2$-rich gas with a simple structure to further increase $CO_2$ concentration of the cathode inlet.

Alternatively, the combustor 250 may include a catalyst reactor including a reactor and an oxidation catalyst disposed in the reactor.

By using the catalyst reactor including an oxidation catalyst as the combustor 250, it is possible to combust un-combusted components contained in $CO_2$-rich gas to further increase $CO_2$ concentration of the cathode inlet.

In some embodiments, the above-described gas separation unit 236 disposed on the $CO_2$-rich gas line 228 may be configured to separate $H_2$ (hydrogen)-rich gas from $CO_2$-rich gas. The $H_2$-rich gas separated by the gas separation unit 236 means a gas having a higher $H_2$ concentration than $CO_2$-rich gas upstream of the gas separation unit 236.

For instance, the separation membrane 237 (gas separation unit 236) in the embodiments shown in FIGS. 10 to 15 may separate $CO_2$ from $CO_2$-rich gas by selectively permeating $CO_2$ in the supplied $CO_2$-rich gas. The remaining gas after separating $CO_2$ from the $CO_2$-rich gas may be isolated as $H_2$-rich gas containing a relatively large amount of $H_2$.

$H_2$-rich gas isolated from $CO_2$-rich gas by the gas separation unit 236 may be supplied to the combustor 250 disposed upstream of the cathode 12 via a $H_2$-rich gas line 254 as shown in FIGS. 12 and 14, for instance.

In this case, it is possible to make use of combustion heat of $H_2$ generated in the combustor 250 to effectively increase the temperature of the cathode inlet gas flowing into the cathode 12. Thus, it is possible to keep the appropriate temperature of the fuel cell 10 for stable operation.

In particular, exhaust gas from the waste heat recovery boiler 110 (see FIGS. 10 to 12) included in the thermal power generation device 2 is exhaust gas from which the waste heat recovery boiler 110 recovers heat and thus has a relatively-low temperature. Thus, for instance as shown in FIG. 12, using combustion heat at the combustor 250 disposed upstream of the cathode 12, it is possible to effectively increase the temperature of the cathode inlet gas flowing into the cathode 12.

Although not depicted, $H_2$-rich gas isolated from $CO_2$-rich gas by the gas separation unit 236 may be supplied to the anode 16 via the anode inlet passage 276 as a fuel used for reaction in the fuel cell 10, for instance.

In some embodiments, for instance as shown in FIGS. 10 and 13, one end (end closer to the $CO_2$-rich gas line 228) of the recycle line 252 is connected to the $CO_2$-rich gas line 228 downstream of the anode 16 of the fuel cell 10 and upstream of the CO shift reactor 220.

By this means, $CO_2$-rich gas upstream of the CO shift reactor 220 is returned to the inlet side of the cathode 12 via the recycle line 252 to reduce the amount of $CO_2$-rich gas to be treated by the CO shift reactor 220. Thereby, it is possible to increase $CO_2$ concentration at the cathode inlet while reducing the cost for CO shift reaction.

In some embodiments, for instance as shown in FIGS. 11 and 14, the CO shift reactor 220 is disposed upstream of the compressor 234 on the $CO_2$-rich gas line 228, and one end of the recycle line 252 is connected to the $CO_2$-rich gas line 228 downstream of the CO shift reactor 220 and upstream of the compressor 234.

In this case, since $CO_2$-rich gas having a higher $CO_2$ concentration than gas having passed through the CO shift reactor 220 is returned to the inlet side of the cathode 12 via the recycle line 252, it is possible to effectively increase $CO_2$ concentration of the cathode inlet.

In some embodiments, for instance as shown in FIGS. 12 and 15, the gas separation unit 236 includes the separation membrane 237 for separating carbon dioxide from $CO_2$-rich gas, and one end of the recycle line 252 is connected to the $CO_2$-rich gas line 228 downstream of the separation membrane 237.

In this case, $CO_2$-rich gas having a higher $CO_2$ concentration than gas having passed through the separation membrane 237 is returned to the inlet side of the cathode 12. Thus, it is possible to more effectively increase $CO_2$ concentration of the cathode inlet.

Fourth Aspect of Present Invention

Figure 16:
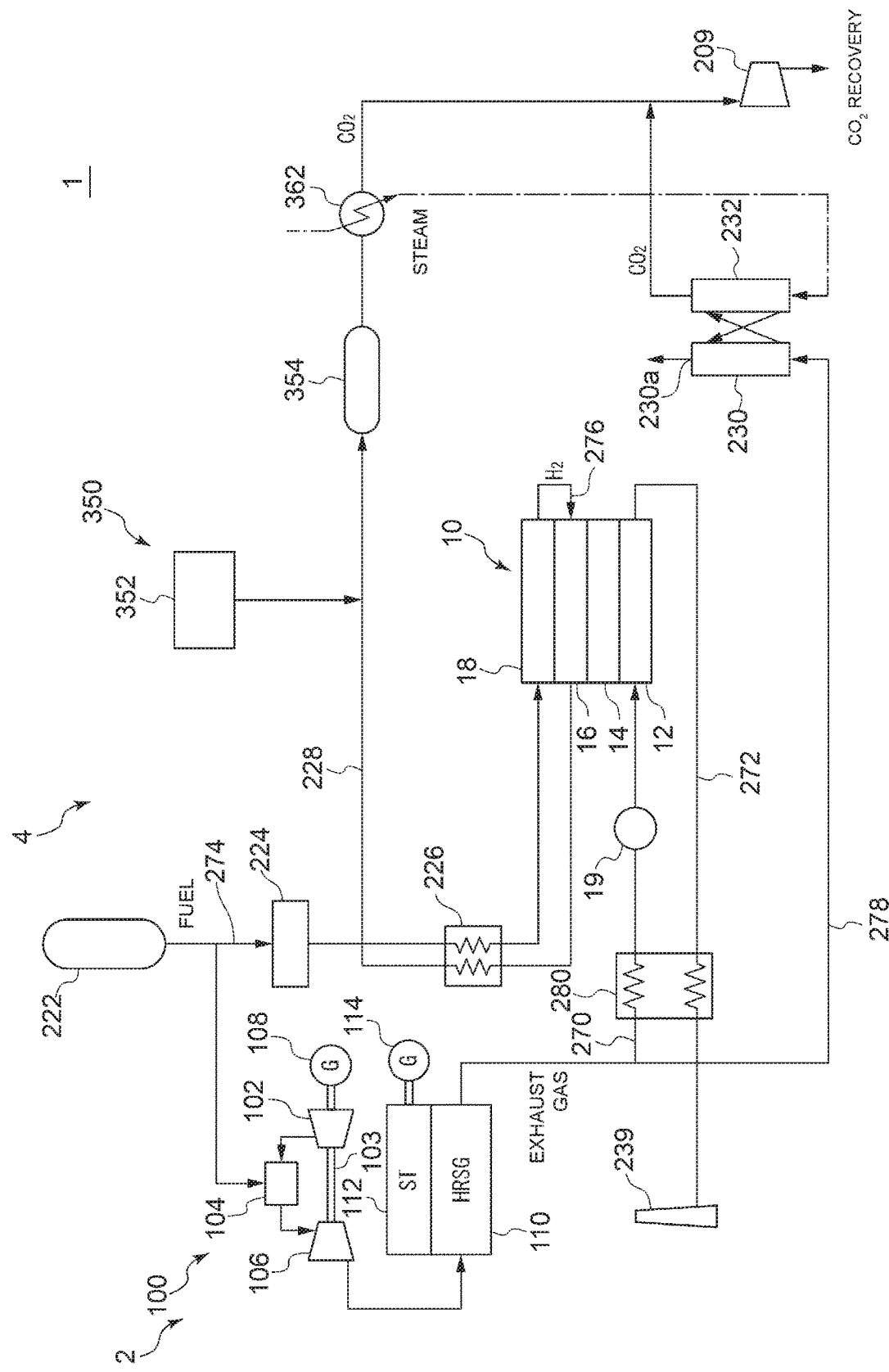
FIG. 16 is a schematic configuration diagram of a thermal power generation facility according to an embodiment.
Figure 17:
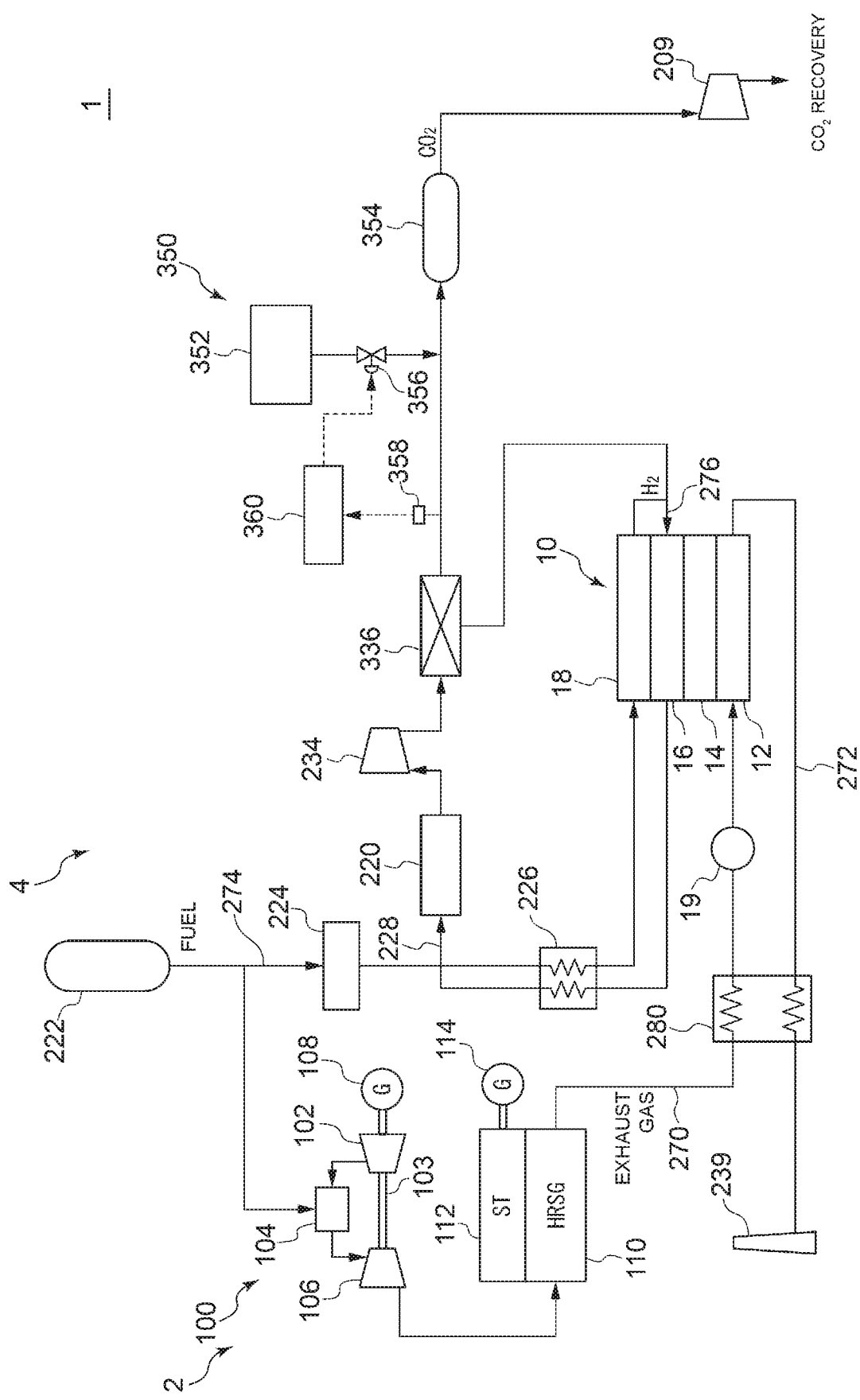
FIG. 17 is a schematic configuration diagram of a thermal power generation facility according to an embodiment.

In the exemplary embodiments shown in FIGS. 16 and 17, the thermal power generation device 2 is a gas turbine combined power generation device including a gas turbine 100 and a waste heat recovery boiler 110 for recovering heat of exhaust gas supplied from the gas turbine 100. In the above embodiments, the carbon dioxide recovery system 4 is configured to recover $CO_2$ contained in exhaust gas supplied from the waste heat recovery boiler 110.

Figure 18:
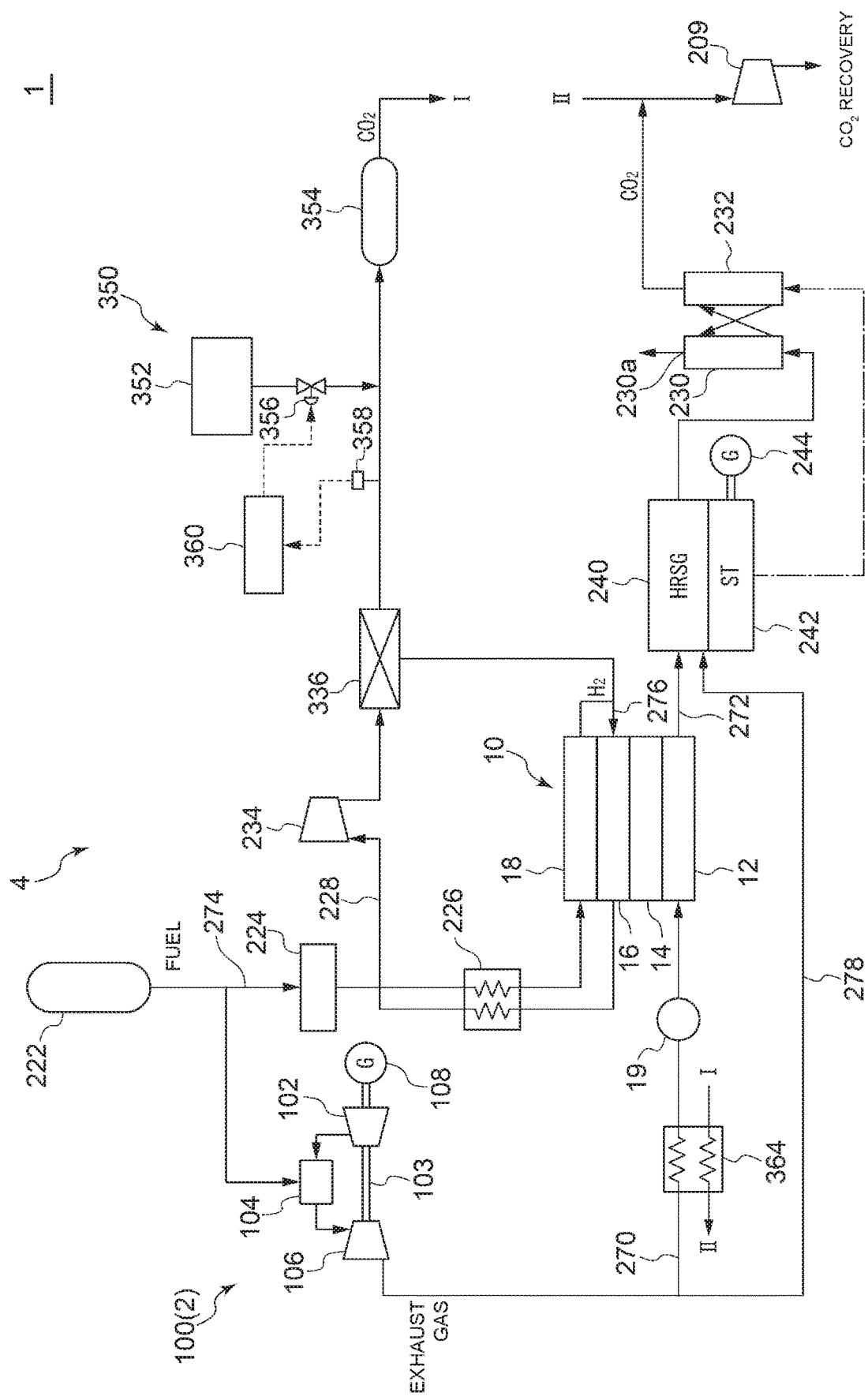
FIG. 18 is a schematic configuration diagram of a thermal power generation facility according to an embodiment.
Figure 19:
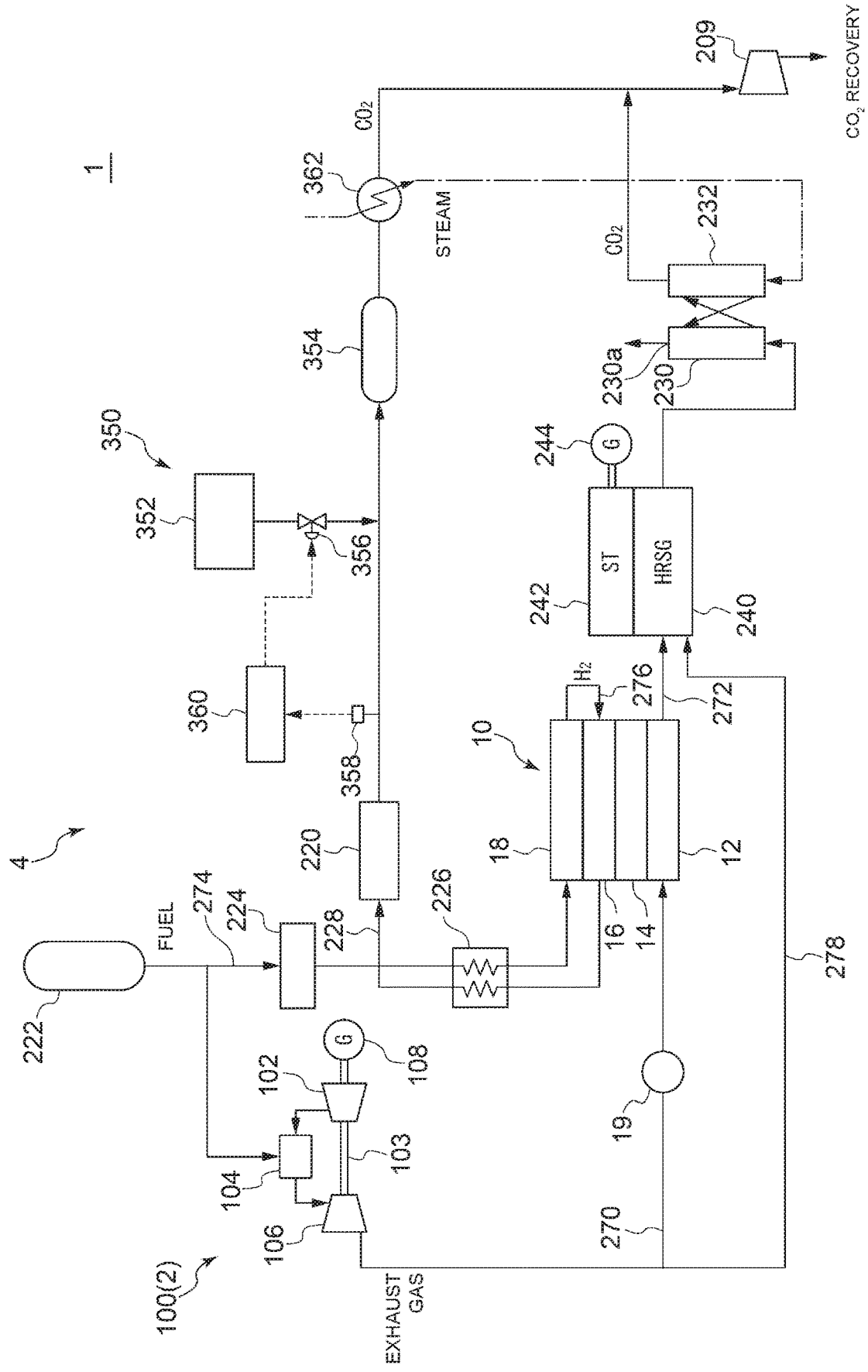
FIG. 19 is a schematic configuration diagram of a thermal power generation facility according to an embodiment.

In the exemplary embodiments shown in FIGS. 18 and 19, the thermal power generation device 2 is a thermal power generation device including a gas turbine 100. In the above embodiments, the carbon dioxide recovery system 4 is configured to recover $CO_2$ contained in exhaust gas supplied from the gas turbine 100.

The gas turbine 100 shown in FIGS. 16 to 19 includes a compressor 102 for compressing air, a combustor 104 for burning a fuel (e.g., natural gas) to produce a combustion gas, and a turbine 106 configured to be rotary driven by the combustion gas.

The fuel (e.g., natural gas) is supplied from a fuel storage part 222 to the combustor 104. Further, the air compressed by the compressor 102 is fed to the combustor 104. The compressed air serves as an oxidant when the fuel is burned in the combustor 104.

To the turbine 106, a generator 108 is connected via a rotational shaft 103, so that the generator 108 is driven by rotational energy of the turbine 106 to generate electric power. The combustion gas used in the turbine 106 is discharged from the turbine 106 as exhaust gas.

The waste heat recovery boiler 110 shown in FIGS. 16 and 17 includes a duct (not shown) to which exhaust gas from the gas turbine 100 is introduced and a heat exchanger (not shown) disposed on the duct. The heat exchanger is configured to generate steam by heat exchange with exhaust gas flowing through the duct. The steam generated at the waste heat recovery boiler 110 is introduced to a steam turbine 112 and rotary drive the steam turbine 112. To the steam turbine 112, a generator 114 is connected, so that the generator 114 is rotary driven by the steam turbine 112 to generate electric power.

Exhaust gas flowing through the duct of the waste heat recovery boiler 110 and passing through the heat exchanger is discharged from the waste heat recovery boiler via the duct outlet.

Hereinafter, the carbon dioxide recovery system 4 according to some embodiments will be described.

The carbon dioxide recovery system 4 according to the exemplary embodiments shown in FIGS. 16, 8, and 19 includes a cathode inlet passage 270 through which exhaust gas from the thermal power generation device 2 or the waste heat recovery boiler 110 flows and a bypass passage 278 diverging from the cathode inlet passage 270. Exhaust gas from the thermal power generation device 2 or the waste heat recovery boiler 110 is divided at the branch point to the cathode inlet passage 270 and the bypass passage 278 and supplied to a cathode 12 of a fuel cell 10 and a chemical absorption tower 230 described later, respectively.

That is, the cathode inlet passage 270 and the bypass passage 278 in the fourth aspect correspond to the first exhaust gas passage 6 and the second exhaust gas passage 8 in the first aspect, respectively.

As shown in FIGS. 16 to 19, the carbon dioxide recovery system 4 includes a fuel cell 10 including a cathode 12 to which exhaust gas is supplied from the thermal power generation device 2, and a $CO_2$-rich gas line (anode outlet passage) 228 connected to the outlet of an anode 16 of the fuel cell 10. The $CO_2$-rich gas line 228 is configured to introduce $CO_2$-rich gas derived from the outlet gas of the anode 16. Further, the carbon dioxide recovery system 4 includes an oxygen supply part for supplying oxygen to $CO_2$-rich gas flowing through the $CO_2$-rich gas line 228 and an oxidation reaction unit 354 disposed on the $CO_2$-rich gas line 228. Carbon dioxide contained in exhaust gas from the thermal power generation device 2 is recovered via the fuel cell 10 and the $CO_2$-rich gas line 228, as described below.

Herein, the $CO_2$-rich gas derived from the anode outlet gas may be the anode outlet gas as is or may be a gas obtained by subjecting the anode outlet gas to predetermined treatment (e.g., CO shift reaction with a CO shift reactor 220 or membrane separation with a separator 336 described below). The $CO_2$-rich gas means a gas having a higher $CO_2$ concentration than exhaust gas to be treated.

The fuel cell 10 basically has the same configuration as the fuel cell 10 according to the first aspect of the present invention described above. However, in embodiments according to the fourth aspect, exhaust gas containing $CO_2$ from the thermal power generation device 2 is supplied to the cathode 12 of the fuel cell 10 via the cathode inlet passage 270, and fuel gas containing hydrogen ($H_2$) is supplied from an anode inlet passage 276 to the anode 16.

The anode 16 is connected to a fuel storage part 222 storing a fuel (e.g., natural gas) via the anode inlet passage 276 and a fuel supply passage 274. The fuel in the fuel storage part 222 is reformed to hydrogen ($H_2$) and supplied to the anode 16 via the anode inlet passage 276.

For instance, in the exemplary embodiments shown in FIGS. 16 to 19, the fuel is reformed to produce hydrogen ($H_2$) by an auxiliary reformer 224 disposed on the fuel supply passage 274 and a reformation part 18 disposed on the fuel cell 10. Then, hydrogen produced by reforming of fuel is supplied to the anode 16 via the anode inlet passage 276.

$CO_2$ produced at the anode 16 flows out to the $CO_2$-rich gas line (anode outlet passage) 228 as a mixed gas (outlet gas of the anode 16) together with $H_2O$ and unreacted components (e.g., CO and $H_2$) of the fuel gas. The anode outlet gas flowing to the $CO_2$-rich gas line 228 is a $CO_2$-rich gas having a higher $CO_2$ concentration than exhaust gas to be treated.

$CO_2$-rich gas flowing through the $CO_2$-rich gas line 228 increases $CO_2$ concentration by oxidation reaction in the oxidation reaction unit 354. Then, moisture or the like is separated from the $CO_2$-rich gas by a separator (not shown) for instance, and $CO_2$ is recovered. The recovered $CO_2$ (i.e., $CO_2$ recovered at the anode 16 by the fuel cell 10) may be compressed by a compressor 209. Treatment of $CO_2$-rich gas in the $CO_2$-rich gas line 228 will be described later more specifically.

Incidentally, the reforming reaction of fuel is an endothermic reaction and thus usually needs heat from the outside. In view of this, as shown in FIGS. 16 to 4, a heat exchanger 226 may be disposed upstream of the reformation part 18 to heat the fuel supplied to the reformation part 18 via the fuel supply passage 274. By supplying the fuel heated with the heat exchanger 226 to the reformation part 18, it is possible to efficiently reform the fuel.

In the embodiment shown in FIGS. 16 to 19, the heat exchanger 226 is configured to heat the fuel supplied from the fuel supply passage 274 to the reformation part 18 through heat exchange with the outlet gas ($CO_2$-rich gas) of the anode 16.

A molten carbonate fuel cell works at a high temperature of about 600° C. to 700° C., and a gas flowing out of the anode 16 has nearly the same high temperature. Thus, with the above-described heat exchanger 226, it is possible to make use of reaction heat caused in the fuel cell 10 to reform the fuel.

Further, generally, the operating temperature of the fuel cell 10 is about 600° C. to 700° C. Thus, to keep the fuel cell 10 in an appropriate operating state, it is desirable to have exhaust gas supplied to the fuel cell 10 at high temperature to some extent. Moreover, the temperature of exhaust gas from the thermal power generation device 2 can be lower than the operating temperature of the fuel cell 10 in some cases.

Thus, in some embodiments, exhaust gas (inlet gas of the cathode 12) supplied to the cathode 12 may be heated with a combustor 19 or a heat exchanger (364, 280) disposed upstream of the cathode 12.

In some embodiments, as shown in FIGS. 16 to 19, a combustor 19 is disposed on the cathode inlet passage 270. The combustor 19 is configured to heat exhaust gas (inlet gas of the cathode 12) supplied to the cathode 12 by combustion heat caused by combustion of the fuel at the combustor 19. The fuel may be supplied from the fuel storage part 222 to the combustor 19, for instance.

Further, in some embodiments, as shown in FIGS. 16, 17 and 18, a heat exchanger (364 or 280) for pre-heating exhaust gas flowing into the cathode 12 is disposed on the cathode inlet passage 270.

The heat exchanger 280 shown in FIGS. 16 and 17 is configured to heat exhaust gas flowing into the cathode 12 by heat exchange with a gas (outlet gas of the cathode 12) discharged from the cathode 12 to the cathode outlet passage 272. The outlet gas of the cathode 12 having passed through the heat exchanger 280 may be discharged to the outside through a chimney 239.

Thus, with the heat exchanger 280 for heat exchange between the inlet gas of the cathode 12 and the outlet gas of the cathode 12, it is possible to make use of thermal energy generated at the fuel cell 10 to keep the appropriate temperature of the fuel cell 10 for stable operation.

The heat exchanger 364 shown in FIG. 18 is disposed downstream of the oxidation reaction unit 354 on the $CO_2$-rich gas line 228 and is configured to heat exhaust gas flowing into the cathode 12 by heat exchange with $CO_2$-rich gas having passed through the oxidation reaction unit 354.

Thus, with the heat exchanger 364 for heat exchange between the inlet gas of the cathode 12 and the $CO_2$-rich gas having passed through the oxidation reaction unit 354, it is possible to make use of thermal energy generated at the oxidation reaction unit 354 to keep the appropriate temperature of the fuel cell 10 for stable operation.

In the $CO_2$-rich gas line 228, the oxidation reaction unit 354 is disposed downstream of a position at which oxygen is supplied by the oxygen supply part 350. The oxidation reaction unit 354 is configured to perform reaction between at least one of $H_2$ or CO contained in $CO_2$-rich gas and oxygen.

By performing reaction between at least one of $H_2$ or CO contained in $CO_2$-rich gas and oxygen by the oxidation reaction unit 354 while oxygen is supplied to $CO_2$-rich gas by the oxygen supply part 350, it is possible to reduce the content of CO or $H_2$ which can cause corrosion, and thus it is possible to obtain carbon dioxide at high purity.

In some embodiments, the oxidation reaction unit 354 may include an oxidation catalyst reactor, or may include a combustor such as a burner.

In the oxidation reaction unit 354, water ($H_2O$) and/or $CO_2$ is produced by oxidation reaction of $H_2$ or CO contained in $CO_2$-rich gas. Thus, $CO_2$-rich gas having passed through the oxidation reaction unit 354 has lower $H_2$ concentration and/or lower CO concentration and higher $CO_2$ concentration than gas upstream of the oxidation reaction unit 354.

In the exemplary embodiments shown in FIGS. 16 to 19, the oxygen supply part 350 includes an oxygen production device 352 for producing $O_2$ supplied to the $CO_2$-rich gas line 228.

The oxygen production device 352 may be configured to produce oxygen by electrolysis of water. Alternatively, the oxygen production device 352 may be configured to produce oxygen by separating oxygen from air. Oxygen can be separated from air by, for instance, air separation unit (ASU) process using the difference in boiling point between components contained in air, pressure swing adsorption (PSA) process using an adsorbent such as zeolites, or membrane separation process.

In some embodiments, the oxygen supply part 350 is configured to inject pure oxygen into the $CO_2$-rich gas line 228. Pure oxygen means an oxygen-containing gas having an oxygen concentration of 95% or more, or 98% or more.

By supplying pure oxygen into the $CO_2$-rich gas line 228 from the oxygen supply part 350, it is possible to improve the purity of carbon dioxide obtained by the oxidation reaction unit 354.

In some embodiments, the oxygen supply part 350 is configured to limit the supply amount of oxygen to the $CO_2$-rich gas line 228 to be equal to or less than equivalent for complete oxidation of $H_2$ or CO contained in $CO_2$-rich gas.

If the amount of oxygen supplied to the $CO_2$-rich gas line is equal to or less than equivalent for complete oxidation, the total amount of oxygen is likely to be consumed by oxidation reaction in the oxidation reaction unit 354, and thus it is possible to reduce the oxygen content of $CO_2$-rich gas downstream of the oxidation reaction unit 354. Thus, it is possible to suppress corrosion of ducts or the like downstream of the oxidation reaction unit 354.

In some embodiments, the carbon dioxide recovery system 4 includes a controller (adjustment part) 360 for adjusting the amount of oxygen supplied to the $CO_2$-rich gas line, based on the concentration of $H_2$ or CO in $CO_2$-rich gas flowing through the $CO_2$-rich gas line 228 upstream of the oxygen supply position.

For instance, in the exemplary embodiments shown in FIGS. 17 to 19, the $CO_2$-rich gas line 228 is provided with a concentration sensor 358, disposed upstream of the oxygen supply position by the oxygen supply part 350, for detecting the concentration of $H_2$ or CO in $CO_2$-rich gas. Further, a flow rate adjustment value 356 for adjusting the amount of oxygen supplied from the oxygen production device 352 to the $CO_2$-rich gas line 228 is provided between the oxygen production device 352 and the $CO_2$-rich gas line 228. The controller 360 is configured to control the opening degree of the flow rate adjustment value 356, based on detection results of the concentration sensor 358.

Thus, the controller 360 appropriately adjusts the amount of oxygen supplied to $CO_2$-rich gas introduced into the oxidation reaction unit 354, which makes it possible to effectively reduce the content of $H_2$ or CO in $CO_2$-rich gas to obtain carbon dioxide at high purity.

In some embodiments, for instance as shown in FIGS. 17 and 18, the $CO_2$-rich gas line 228 is provided with a separator 336 upstream of a position at which oxygen is supplied by the oxygen supply part 350. The separator 336 is configured to separate impurity gases (e.g. $H_2$ or CO) other than $CO_2$ from $CO_2$-rich gas.

The separator 336 removes most impurity gases other than $CO_2$ in advance upstream of the oxygen supply position, whereby it is possible to reduce the oxygen amount required for oxidation reaction of $H_2$ or CO in the oxidation reaction unit 354. Thereby, it is possible to obtain carbon dioxide at high purity at low cost.

The separator 336 may include a separation membrane ($CO_2$ separation membrane) configured to separate $CO_2$ from the outlet gas ($CO_2$-rich gas) of the anode 16 containing $CO_2$ and components other than $CO_2$ (e.g. $H_2$ or CO) by selectively permeating $CO_2$. Alternatively, the separator 336 may be configured to separate $CO_2$ from the outlet gas of the anode 16 by cryogenic separation process.

Further, a compressor 234 may be disposed upstream of the separator 336, on the $CO_2$-rich gas line 228, to increase the pressure of the outlet gas ($CO_2$-rich gas) of the anode 16 to suit a separation method adopted in the separator 336.

In the separator 336, hydrogen may be separated from the outlet gas ($CO_2$-rich gas) of the anode 16. As shown in FIGS. 17 and 18, hydrogen separated by the separator 336 may be supplied to the anode 16 via the anode inlet passage 276 as a fuel used for reaction in the fuel cell 10.

In some embodiments, for instance as shown in FIGS. 17 and 19, the $CO_2$-rich gas line 228 is provided with a CO shift reactor 220, upstream of the position at which oxygen is supplied by the oxygen supply part 350, for converting CO contained in $CO_2$-rich gas. The CO shift reactor 220 may be configured to convert CO contained in the outlet gas ($CO_2$-rich gas) of the anode 16 into $CO_2$ by reaction with water ($H_2O$), for instance.

The CO shift reactor 220 converts CO upstream of the oxygen supply position, whereby it is possible to reduce the CO content of $CO_2$-rich gas and reduce the oxygen amount required for oxidation reaction of CO in the oxidation reaction unit 354. Thereby, it is possible to obtain carbon dioxide at high purity at low cost.

In some embodiments, on the $CO_2$-rich gas line 228, a heat exchanger (e.g., heat exchanger 362 shown in FIGS. 16 and 19 or heat exchanger 364 shown in FIG. 18 described above) for recovering exhaust heat of $CO_2$-rich gas having passed through the oxidation reaction unit 354 is provided downstream of the oxidation reaction unit 354.

By recovering exhaust heat of $CO_2$-rich gas having a temperature increased by oxidation reaction in the oxidation reaction unit 354 with the heat exchange (362, 364), it is possible to make use of the recovered heat to effectively recover $CO_2$ while suppressing the reduction in energy efficiency of the entire plant.

For instance, in the exemplary embodiment shown in FIG. 18, the heat exchanger 364 disposed downstream of the oxidation reaction unit 354 on the $CO_2$-rich gas line 228 is configured to pre-heat exhaust gas before flowing into the cathode by heat exchange with $CO_2$-rich gas, as described above.

Further, in some embodiments, as shown in FIGS. 16 and 19, the heat exchanger 362 disposed downstream of the oxidation reaction unit 354 on the $CO_2$-rich gas line 228 is configured to generate steam by heat exchange with $CO_2$-rich gas.

The steam thus generated can be used for various purposes; for instance, the steam may be supplied to a turbine connected to a compressor or a generator to drive the turbine, or may be supplied to an auxiliary reformer 224 for reforming of fuel. Alternatively, as shown in FIGS. 16 and 19, the steam generated by the heat exchanger 362 may be supplied to a regeneration tower 232 to regenerate an absorption liquid used in a chemical absorption tower 230 described below.

In the carbon dioxide recovery system 4, to recover $CO_2$ contained in exhaust gas supplied from the thermal power generation device 2, in addition to the fuel cell 10 and the $CO_2$ recovery means via the $CO_2$-rich gas line 228 described above, other $CO_2$ recovery means may be used in combination.

For instance, in the exemplary embodiments shown in FIGS. 16, 18, and 19, $CO_2$ is recovered from exhaust gas by using a chemical absorption tower 230 having an absorption liquid for absorbing $CO_2$ contained in exhaust gas and a regeneration tower 232 configured to separate $CO_2$ from the absorption liquid absorbing $CO_2$ at the chemical absorption tower 230.

In the embodiments shown in FIGS. 16, 18, and 19, exhaust gas from the thermal power generation device 2 is introduced to the chemical absorption tower 230. The exhaust gas introduced to the chemical absorption tower 230 may include exhaust gas having passed through the cathode inlet passage 270 and the cathode 12 of the fuel cell 10 (see FIGS. 18 and 19), or may include exhaust gas having passed through the bypass passage 278 diverging from the cathode inlet passage 270 without passing through the cathode of the fuel cell 10 (see FIGS. 16, 18, and 19). Further, the exhaust gas introduced to the chemical absorption tower 230 may include, for instance, exhaust gas from which the waste heat recovery boiler 240 recovers heat, as shown in FIGS. 18 and 19.

The waste heat recovery boiler 240 according to some embodiments may have the same configuration as the waste heat recovery boiler 110 which is a part of the thermal power generation device 2 described above. Specifically, in some embodiments, the waste heat recovery boiler 240 includes a duct (not shown) to which exhaust gas from the thermal power generation device 2 is introduced and a heat exchanger (not shown) disposed on the duct. The heat exchanger is configured to generate steam by heat exchange with exhaust gas flowing through the duct. The steam generated at the waste heat recovery boiler 240 is introduced to a steam turbine 242 and rotary drive the steam turbine 242. To the steam turbine 242, a generator 244 is connected, so that the generator 244 is rotary driven by the steam turbine 242 to generate electric power.

In the embodiments shown in FIGS. 18 and 19, exhaust gas flowing through the duct of the waste heat recovery boiler 110 and passing through the heat exchanger is discharged from the waste heat recovery boiler via the duct outlet and introduced to the chemical absorption tower 230.

In the chemical absorption tower 230 according to an embodiment, the absorption liquid comes into contact with exhaust gas introduced to the chemical absorption tower 230, and thereby the absorption liquid absorbs $CO_2$ contained in exhaust gas. Consequently, $CO_2$ is removed from exhaust gas. The exhaust gas from which $CO_2$ is removed is discharged from an outlet 230a of the chemical absorption tower 230 as post-treated exhaust gas.

The absorption liquid absorbing $CO_2$ is transferred from the chemical absorption tower 230 to a regeneration tower 232 and is regenerated at the regeneration tower 232. In the regeneration tower 232, the absorption liquid absorbing $CO_2$ is heated by steam to separate and remove $CO_2$ from the absorption liquid (i.e., the absorption liquid is regenerated).

In this context, as described above, in the embodiments shown in FIGS. 16 and 19, steam generated at the heat exchanger 362 disposed downstream of the oxidation reaction unit 354 on the $CO_2$-rich gas line 228 is supplied to the regeneration tower 232 as the steam for regenerating the absorption liquid. Further in the embodiment shown in FIG. 18, at least a part of steam generated at the waste heat recovery boiler 240 is supplied to the regeneration tower 232 as the steam for regenerating the absorption liquid.

A gas containing $CO_2$ removed from the absorption liquid is discharged from the regeneration tower 232 and, for instance after moisture is removed by a moisture separator (not shown), $CO_2$ is recovered as gas. $CO_2$ discharged from the regeneration tower 232 (i.e., $CO_2$ recovered via the chemical absorption tower 230) may be compressed by the compressor 209.

On the other hand, the absorption liquid separated from $CO_2$ and regenerated by the regeneration tower 232 is returned to the chemical absorption tower 230 and used again to absorb $CO_2$ contained in exhaust gas supplied from the thermal power generation device 2.

The absorption liquid used in the chemical absorption tower 230 may contain amine. The absorption liquid containing amine has high reactivity with carbon dioxide. Accordingly, the use of the absorption liquid containing amine enables carbon dioxide to be effectively recovered even if carbon dioxide in exhaust gas has a low partial pressure.

The absorption liquid containing amine may be an aqueous solution of alkanolamine (e.g., monoethanolamine).

Although the fourth aspect has been described above, a combination of the thermal power generation device 2 and the carbon dioxide recovery system 4 for recovering $CO_2$ from exhaust gas from the thermal power generation device 2 is not limited to the depicted combinations. For instance, the thermal power generation facility 1 according to some embodiments may include the thermal power generation device 2 (gas turbine combined power generation device) including the gas turbine 100 and the waste heat recovery boiler 110 shown in FIGS. 16 and 17 and the carbon dioxide recovery system 4 shown in FIG. 18 or 19. Alternatively, the thermal power generation facility 1 according to some embodiments may include the thermal power generation device 2 including the gas turbine 100 shown in FIGS. 18 and 19 and the carbon dioxide recovery system 4 shown in FIG. 16 or 17.

Fifth Aspect of Present Invention

In the embodiments shown in FIGS. 20, 21, 24, and 25, the thermal power generation device 2 includes a gas turbine 100. The gas turbine 100 basically has the same configuration as the gas turbine according to the first aspect of the present invention described above. However, a fuel (e.g., natural gas) is supplied from a fuel storage part 222 (omitted in FIGS. 24 and 25) to a combustor 104.

Hereinafter, the carbon dioxide recovery system 4 according to some embodiments will be described.

The carbon dioxide recovery system 4 according to the exemplary embodiments shown in FIGS. 20 to 24 includes a cathode inlet passage 410 through which exhaust gas from the thermal power generation device 2 flows and a bypass passage 420 diverging from the cathode inlet passage 410. Exhaust gas from the thermal power generation device 2 is divided at the branch point to the cathode inlet passage 410 and the bypass passage 428 and supplied to a cathode 12 of a fuel cell 10 and a waste heat recovery boiler 240 or a chemical absorption tower 230 described later, respectively.

That is, the cathode inlet passage 410 and the bypass passage 428 in the fifth aspect correspond to the first exhaust gas passage 6 and the second exhaust gas passage 8 in the first aspect, respectively.

As shown in FIGS. 20 to 25, the carbon dioxide recovery system 4 includes a fuel cell unit 404 including a cathode 12 to which exhaust gas from the thermal power generation device 2 is supplied and a carbon dioxide separation unit 405 for separating carbon dioxide from exhaust gas from the thermal power generation device 2. The carbon dioxide separation unit 405 is configured to separate $CO_2$ from exhaust heat using steam generated by exhaust heat caused by operation of the fuel cell unit 404.

$CO_2$ separated by the carbon dioxide separation unit 405 may be recovered after being compressed by a compressor 409 (omitted in FIGS. 24 and 25), for instance.

The fuel cell unit 404 basically has the same configuration as the fuel cell 10 according to the first aspect of the present invention described above. However, in embodiments according to the fifth aspect, exhaust gas containing $CO_2$ from the thermal power generation device 2 is supplied to the cathode 12 of the fuel cell 10 via the cathode inlet passage 410, and fuel gas containing hydrogen ($H_2$) is supplied from an anode inlet passage 414 to the anode 16. The fuel cell unit 404 may include a combustor 19 and a CO shift reactor 220 described below.

The anode inlet passage 414 (omitted in FIGS. 24 and 25) is connected to a fuel storage part 222 storing a fuel (e.g., natural gas) via a fuel supply passage 418. The fuel in the fuel storage part 222 is reformed to hydrogen ($H_2$) and supplied to the anode 16 via the anode inlet passage 414.

For instance, in the exemplary embodiments shown in FIGS. 20 to 23, the fuel is reformed to produce hydrogen ($H_2$) by an auxiliary reformer 224 disposed on the fuel supply passage 418 and a reformation part 18 disposed on the fuel cell 10. Then, hydrogen produced by reforming of fuel is supplied to the anode 16 via the anode inlet passage 414.

$CO_2$ produced at the anode 16 flows out to an anode outlet passage 416 (omitted in FIGS. 24 and 25) as a mixed gas (outlet gas of the anode 16) together with $H_2O$ and unreacted components (e.g., CO and $H_2$) of the fuel gas. On the anode outlet passage 416, a separator 336 is provided by which $CO_2$ is separated from the outlet gas of the anode 16. $CO_2$ separated by the separator 336 (i.e., $CO_2$ recovered at the anode 16 by the fuel cell 10) may be compressed by a compressor 409.

In some embodiments, the separator 336 may include a $CO_2$ separation membrane configured to separate $CO_2$ from the outlet gas of the anode 16.

Alternatively, the separator 336 may be configured to separate $CO_2$ from the outlet gas of the anode 16 by cryogenic separation process.

Further, a compressor 234 may be disposed upstream of the separator 336, on the anode outlet passage 416, to increase the pressure of the outlet gas of the anode 16 to a pressure suitable for a separation method adopted in the separator 336.

The above-described separator 336 disposed on the anode outlet passage 416 may be configured to separate hydrogen from the outlet gas of the anode 16. As shown in FIGS. 20 to 23, hydrogen separated by the separator 336 may be supplied to the anode 16 via the anode inlet passage 414 as a fuel used for reaction in the fuel cell 10.

Further, in some embodiments, as shown in FIGS. 20 to 23, the anode outlet passage 416 may be provided with a CO shift reactor 220, downstream of the anode 16 and upstream of the separator 336 and the compressor 234, for converting CO contained in the outlet gas of the anode 16. The CO shift reactor 220 may be configured to convert CO contained in the outlet gas of the anode 16 into $CO_2$ by reaction with water ($H_2O$), for instance.

Incidentally, the reforming reaction of fuel is an endothermic reaction and thus usually needs heat from the outside. In view of this, as shown in FIGS. 20 to 23, a heat exchanger 226 may be disposed upstream of the reformation part 18 to heat the fuel supplied to the reformation part 18 via the fuel supply passage 418. By supplying the fuel heated with the heat exchanger 226 to the reformation part 18, it is possible to efficiently reform the fuel.

In the embodiments shown in FIGS. 20 to 23, the heat exchanger 226 is configured to heat the fuel supplied from the fuel supply passage 418 to the reformation part 18 through heat exchange with the outlet gas of the anode 16.

A molten carbonate fuel cell works at a high temperature of about 600° C. to 700° C., and a gas flowing out of the anode 16 has nearly the same high temperature. Thus, with the above-described heat exchanger 226, it is possible to make use of reaction heat caused in the fuel cell 10 to reform the fuel.

In some embodiments, as shown in FIGS. 20 to 23, a combustor 19 is disposed on the cathode inlet passage 410. The combustor 19 is configured to heat exhaust gas (inlet gas of the cathode 12) supplied to the cathode 12 by combustion heat caused by combustion of the fuel at the combustor 19.

Figure 22:
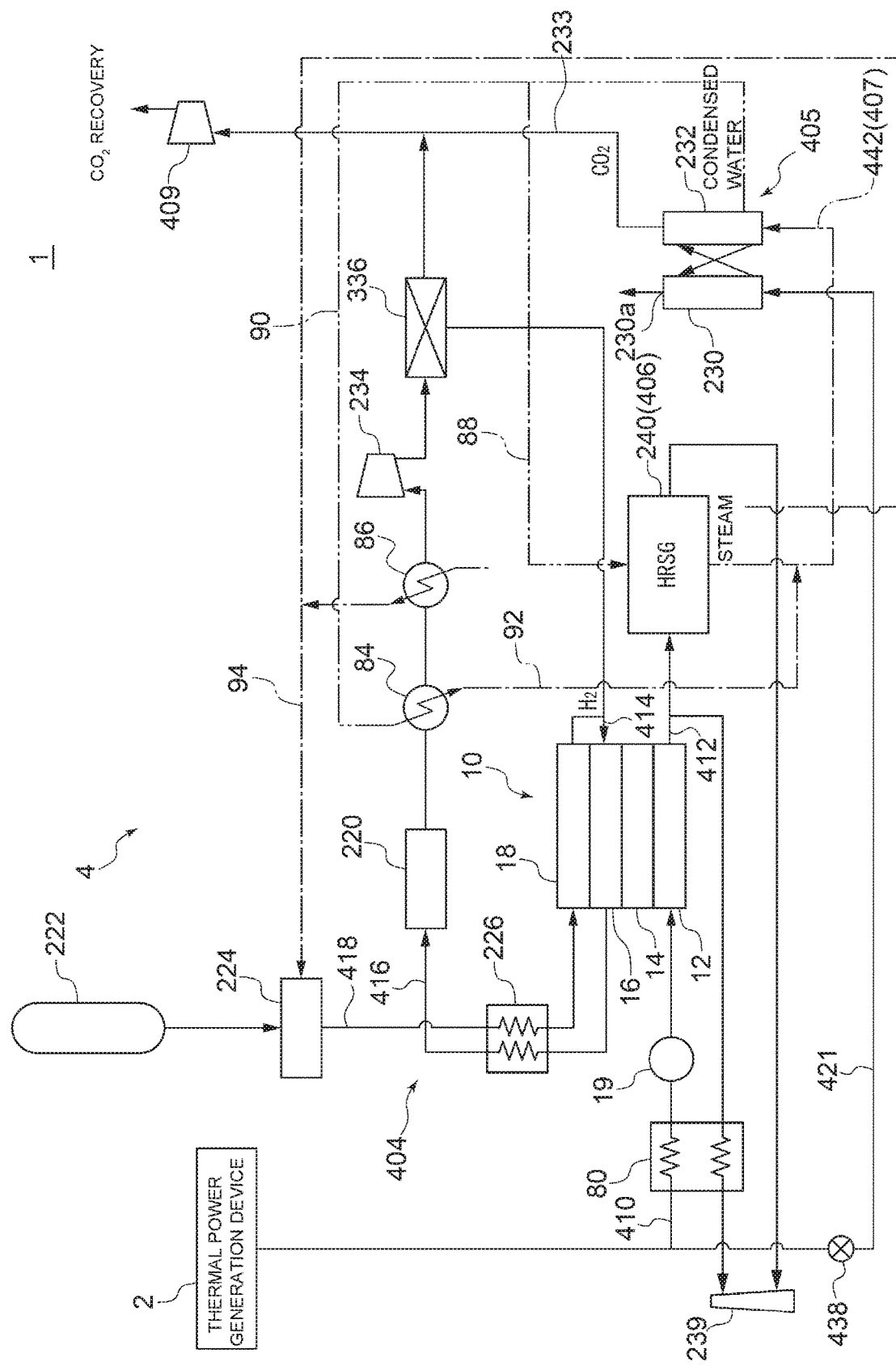
FIG. 22 is a schematic configuration diagram of a thermal power generation facility according to an embodiment.
Figure 23:
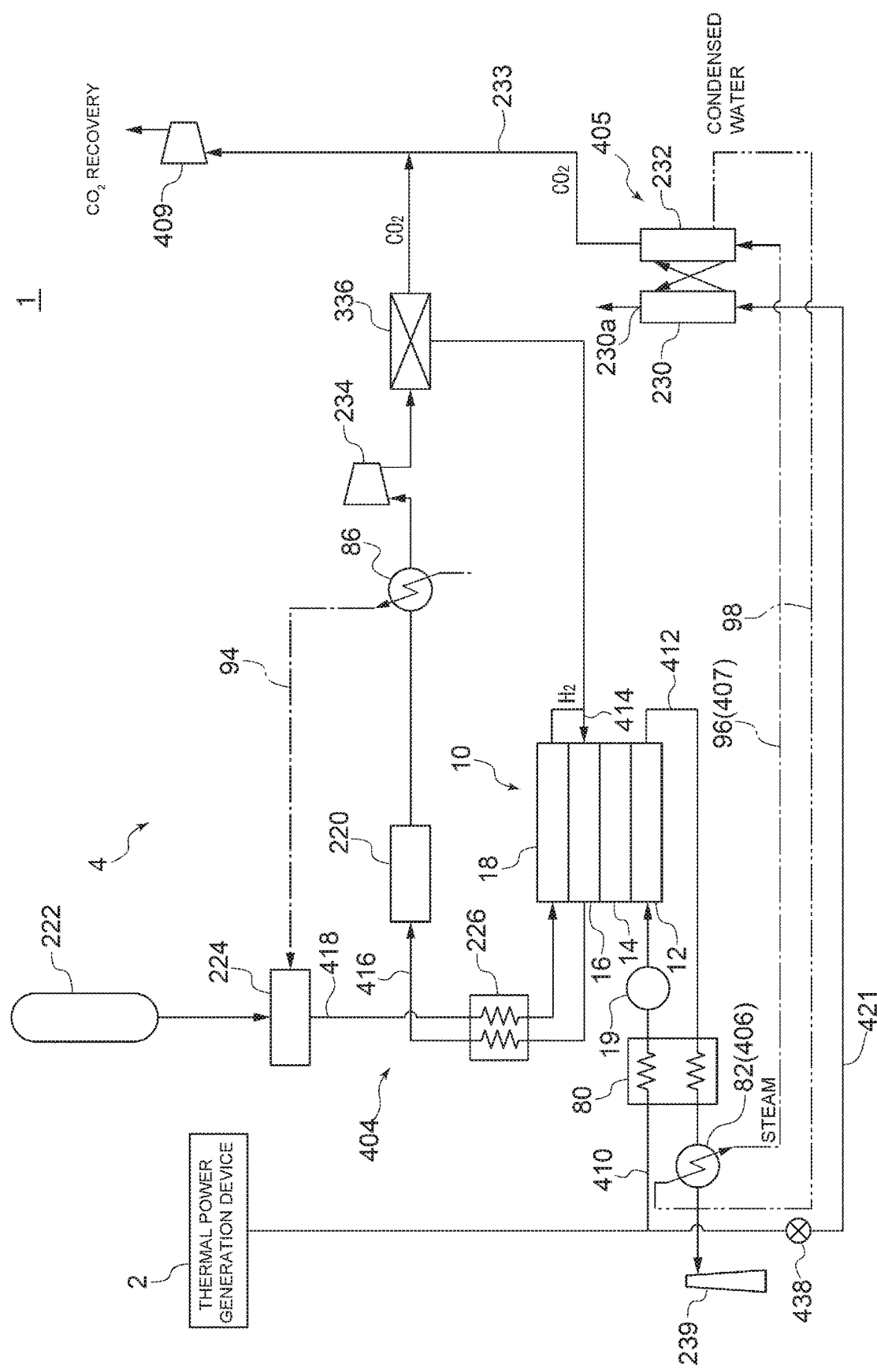
FIG. 23 is a schematic configuration diagram of a thermal power generation facility according to an embodiment.

Further, in some embodiments, as shown in FIGS. 22 and 23, a regeneration heat exchanger 80 for pre-heating exhaust gas flowing into the cathode 12 is disposed on the cathode inlet passage 410. The regeneration heat exchanger 80 is configured to heat exhaust gas flowing into the cathode 12 by heat exchange with at least a part of a gas (outlet gas of the cathode 12) discharged from the cathode 12 to the cathode outlet passage 412.

Generally, the operating temperature of the fuel cell 10 is about 600° C. to 700° C. Thus, to keep the fuel cell 10 in an appropriate operating state, it is desirable to have exhaust gas supplied to the fuel cell 10 at high temperature to some extent. Moreover, the temperature of exhaust gas from the thermal power generation device 2 can be lower than the operating temperature of the fuel cell 10 in some cases. Thus, by heating exhaust gas flowing into the cathode 12 by the combustor 19 and/or the regeneration heat exchanger 80 disposed upstream of the cathode 12, it is possible to make use of thermal energy generated at the fuel cell 10 to keep the appropriate temperature of the fuel cell 10 for stable operation.

As shown in FIGS. 22 and 23, the outlet gas of the cathode 12 exiting from the regeneration heat exchanger 80 after heat exchange with exhaust gas flowing into the cathode 12 may be discharged to the outside through a chimney 239.

The carbon dioxide separation unit 405 is configured to separate $CO_2$ from exhaust heat from the thermal power generation device 2, using steam generated by exhaust heat caused by operation of the fuel cell unit 404, as described above.

In some embodiments, as shown in FIGS. 20 and 22 to 25, the carbon dioxide separation unit 405 includes a chemical absorption tower 230 (omitted in FIGS. 24 and 25) having an absorption liquid for absorbing $CO_2$ contained in exhaust gas and a regeneration tower 232 configured to separate $CO_2$ from the absorption liquid absorbing $CO_2$ at the chemical absorption tower 230. Steam used for separation of $CO_2$ from the absorption liquid is supplied to the regeneration tower 232 via a first steam supply line 407.

Figure 21:
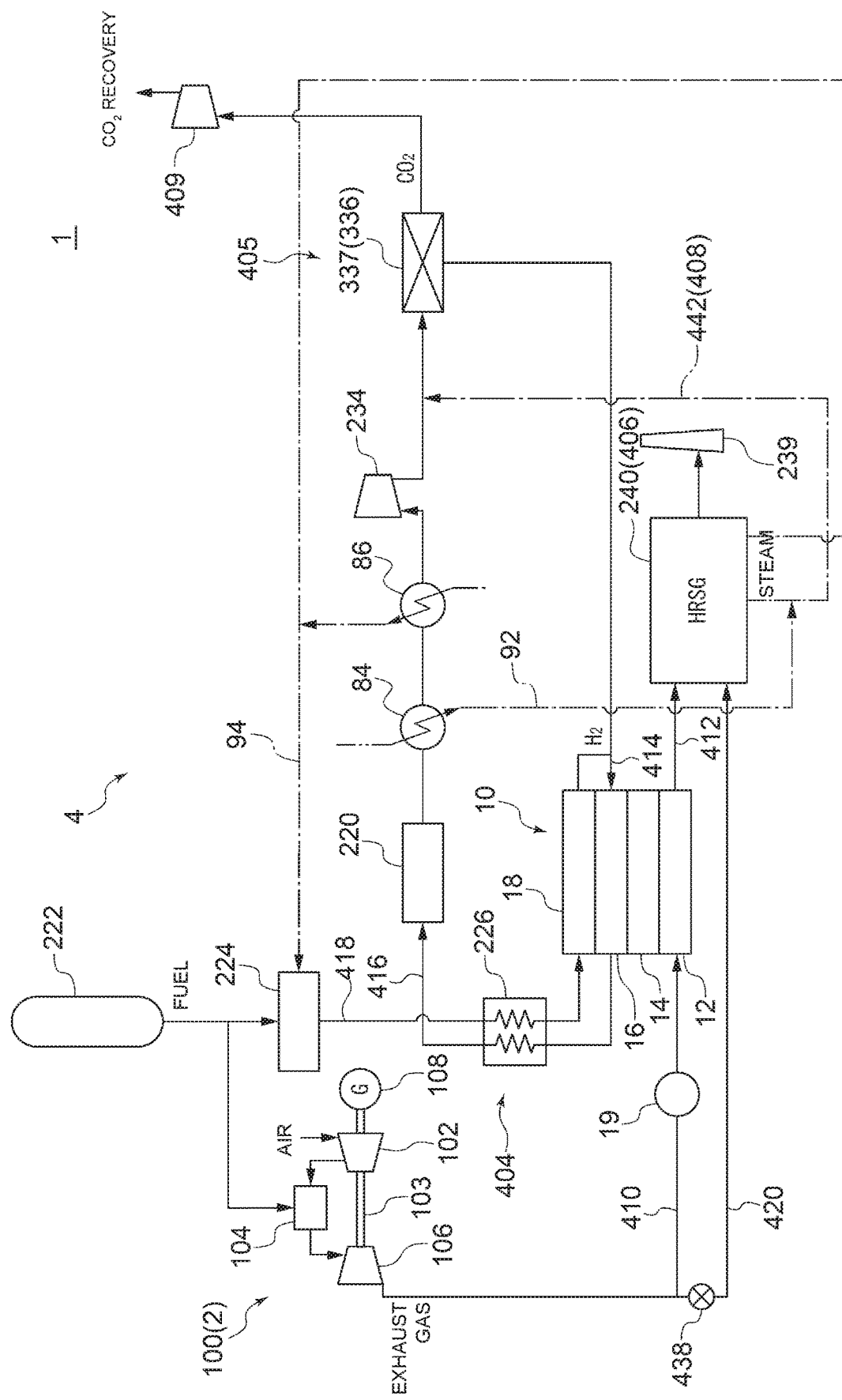
FIG. 21 is a schematic configuration diagram of a thermal power generation facility according to an embodiment.

Further, in some embodiments, as shown in FIG. 21, the carbon dioxide separation unit 405 includes a $CO_2$ separation membrane 337 (separator 336 described above) configured to separate $CO_2$ from the outlet gas of the anode 16. On the upstream side of the $CO_2$ separation membrane 337, steam for humidifying the outlet gas of the anode 16 is supplied via a second steam supply line 408.

Further, as shown in FIGS. 20 to 25, steam generated by operation exhaust heat of the fuel cell unit 404 is supplied via the first steam supply line 407 or the second steam supply line 408 to the regeneration tower 232 (embodiments shown in FIGS. 20 and 22 to 25) or an upstream portion of the $CO_2$ separation membrane 337 (embodiment shown in FIG. 21) in the carbon dioxide separation unit 405 described above.

$CO_2$ separation by the carbon dioxide separation unit 405 including the chemical absorption tower 230 and the $CO_2$ separation membrane 337 according to some embodiments will now be described.

Figure 20:
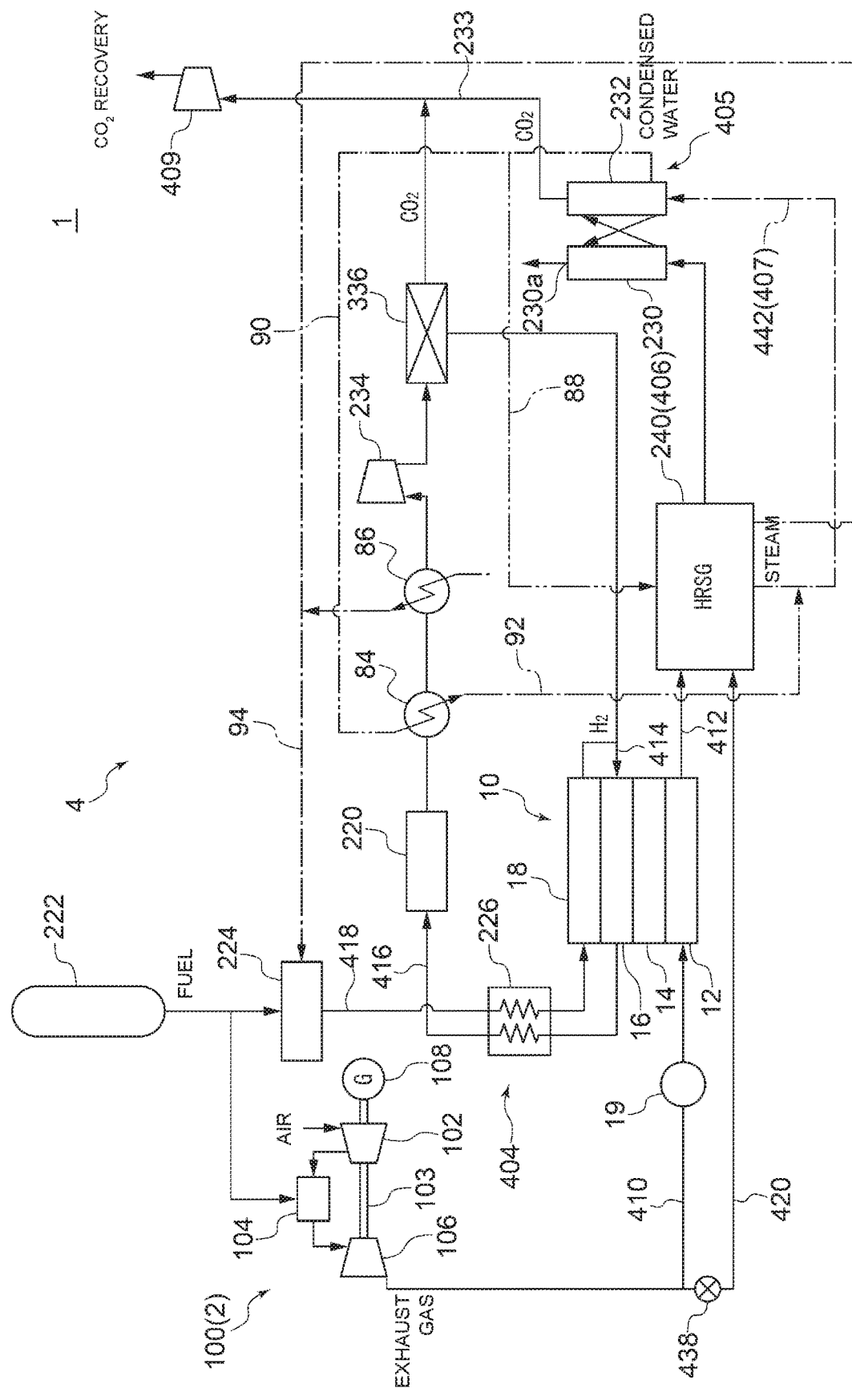
FIG. 20 is a schematic configuration diagram of a thermal power generation facility according to an embodiment.
Figure 24:
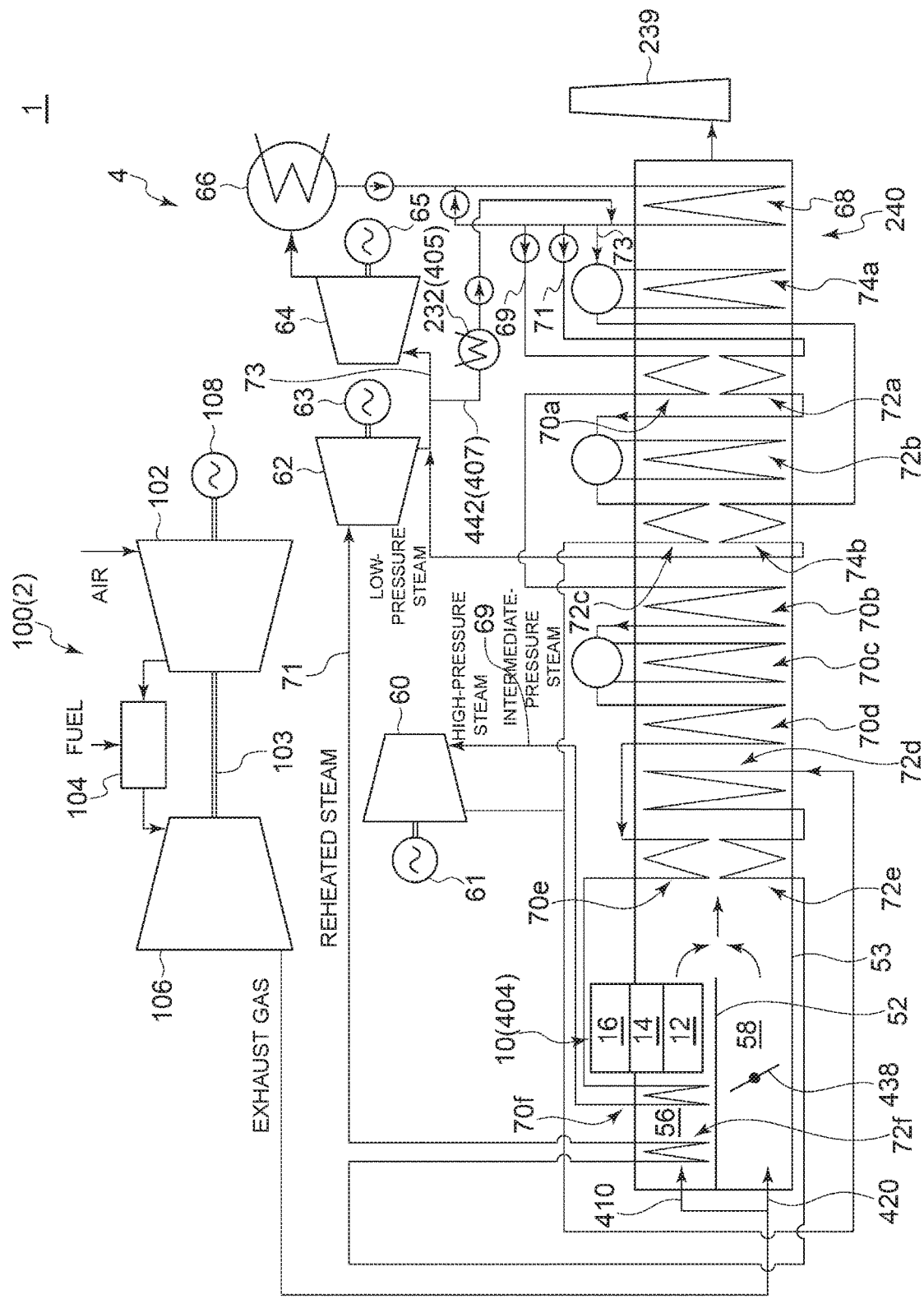
FIG. 24 is a schematic configuration diagram of a thermal power generation facility according to an embodiment.
Figure 25:
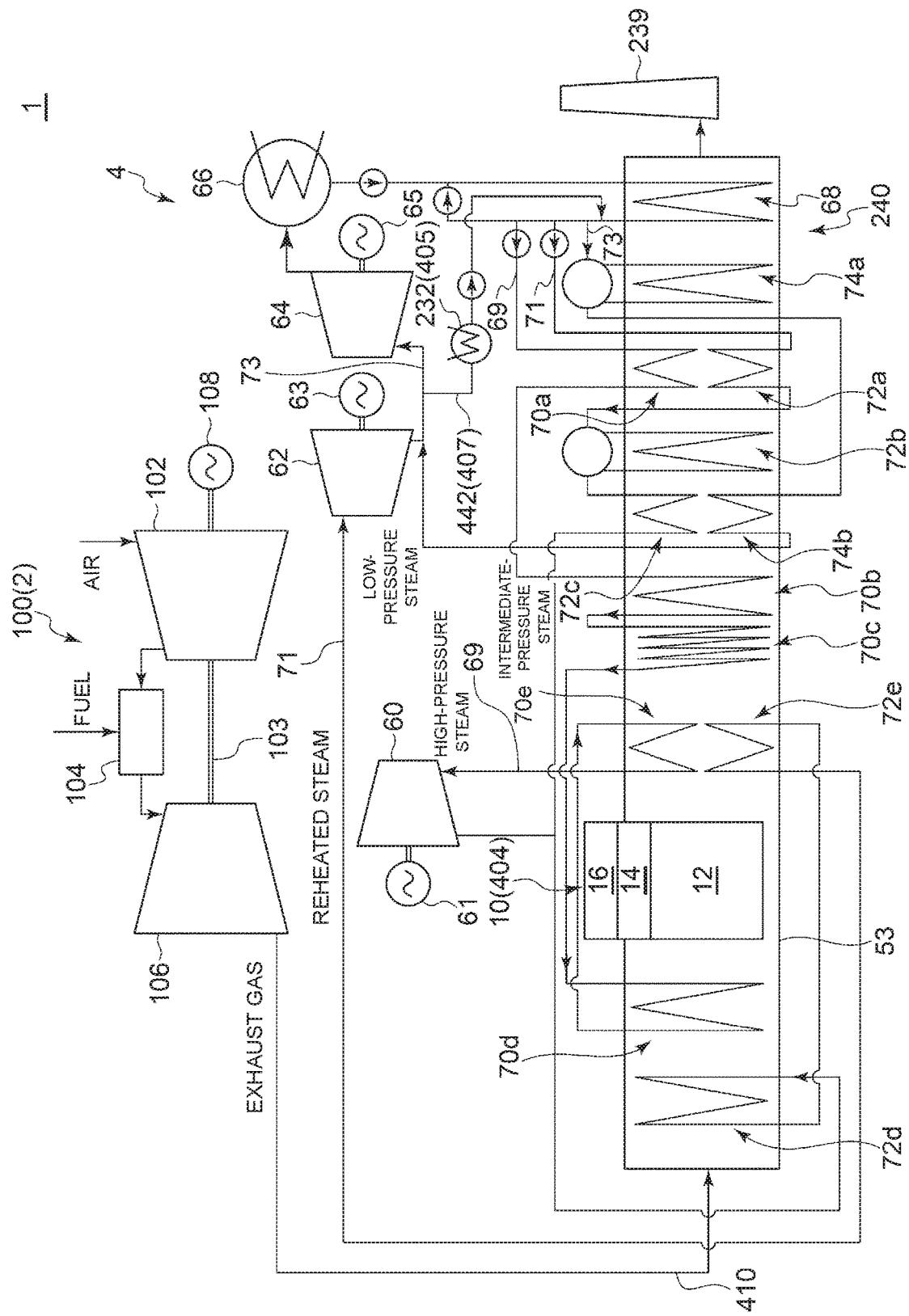
FIG. 25 is a schematic configuration diagram of a thermal power generation facility according to an embodiment.

In the exemplary embodiments shown in FIGS. 20, 22 to 25, exhaust gas from the thermal power generation device 2 is introduced to the chemical absorption tower 230 (omitted in FIGS. 24 and 25). The exhaust gas introduced to the chemical absorption tower 230 may include exhaust gas having passed through the cathode inlet passage 410 and the cathode 12 of the fuel cell 10 (see FIGS. 20 and 24), or may include exhaust gas having passed through the bypass passage (420, 421) diverging from the cathode inlet passage 410 without passing through the cathode 12 of the fuel cell 10 (see FIGS. 20 and 22 to 24). Further, the exhaust gas introduced to the chemical absorption tower 230 may include, for instance, exhaust gas from which a waste heat recovery boiler 240 descried below recovers heat, as shown in FIGS. 20, 22, and 24.

In the chemical absorption tower 230 according to an embodiment, the absorption liquid comes into contact with the above-described exhaust gas, and thereby the absorption liquid absorbs $CO_2$ contained in the exhaust gas. Consequently, $CO_2$ is removed from the exhaust gas. The exhaust gas from which $CO_2$ is removed is discharged from an outlet 230a of the chemical absorption tower 230 as post-treated exhaust gas.

The absorption liquid absorbing $CO_2$ is transferred from the chemical absorption tower 230 to a regeneration tower 232 and is regenerated at the regeneration tower 232. In the regeneration tower 232, the absorption liquid absorbing $CO_2$ is heated by steam supplied via the first steam supply line 407 to separate and remove $CO_2$ from the absorption liquid.

A gas containing $CO_2$ removed from the absorption liquid is discharged from the regeneration tower 232 to a discharge line 233 (omitted in FIGS. 24 and 25) and, for instance after moisture is removed by a moisture separator (not shown), $CO_2$ is recovered as gas. $CO_2$ from the discharge line 233 (i.e., $CO_2$ recovered by the chemical absorption tower 230) may be compressed by the compressor 409.

On the other hand, the absorption liquid separated from $CO_2$ and regenerated by the regeneration tower 232 is returned to the chemical absorption tower 230 and used again to absorb $CO_2$ contained in exhaust gas flowing from the thermal power generation device 2.

The absorption liquid used in the chemical absorption tower 230 may contain amine. The absorption liquid containing amine has high reactivity with carbon dioxide. Accordingly, the use of the absorption liquid containing amine enables carbon dioxide to be effectively recovered even if carbon dioxide in exhaust gas has a low partial pressure.

The absorption liquid containing amine may be an aqueous solution of alkanolamine (e.g., monoethanolamine).

In the exemplary embodiment shown in FIG. 21, the outlet gas of the anode 16 containing $CO_2$ ($CO_2$ produced by the anode 16 of the fuel cell 10) derived from $CO_2$ contained in exhaust gas from the thermal power generation device 2 is supplied to the $CO_2$ separation membrane 337.

The $CO_2$ separation membrane 337 according to some embodiments is configured to selectively permeate and thereby separate $CO_2$ from the outlet gas of the anode 16 containing $CO_2$ and components other than $CO_2$ (e.g. $H_2$ or CO) by using the difference in pressure between upstream and downstream of the $CO_2$ separation membrane 337 (e.g., difference in $CO_2$ partial pressure).

To an upstream portion of the $CO_2$ separation membrane 337, steam is supplied via the second steam supply line 408, and the outlet gas of the anode 16 humidified by the steam is introduced to the $CO_2$ separation membrane 337. Thereby, it is possible to impart suitable humidity to the outlet gas of the anode 16 to be treated for stable operation of the $CO_2$ separation membrane 337, and thus it is possible to stably separate $CO_2$ from the outlet gas of the anode 16 by the $CO_2$ separation membrane 337.

In some embodiments, the $CO_2$ separation membrane 337 may be a separation membrane using a $CO_2$ molecular gate membrane.

In the embodiment shown in FIG. 21, the second steam supply line 408 is configured to add steam to the outlet gas of the anode 16 downstream of the compressor 234 for increasing the pressure of the outlet gas of the anode 16 and upstream of the $CO_2$ separation membrane 337. Thus, the anode outlet gas can have a pressure suitable for operation of the $CO_2$ separation membrane 337. Further, it is possible to suppress erosion of the compressor 234 due to addition of steam.

Further, in the embodiment shown in FIG. 21, the second steam supply line 408 is configured to add steam to the outlet gas of the anode 16 downstream of the CO shift reactor 220 and upstream of the $CO_2$ separation membrane 337. Thus, CO contained in the anode outlet gas is converted into $CO_2$ by the CO shift reactor 220 before the anode outlet gas is supplied to the $CO_2$ separation membrane 337. As a result, it is possible to improve the recovery efficiency of $CO_2$.

As described above, the carbon dioxide separation unit 405 separates $CO_2$ from exhaust heat using steam. The steam supplied to the carbon dioxide separation unit 405, i.e., the steam generated by operation exhaust heat of the fuel cell unit 404 may be steam generated by exhaust heat of the outlet gas of the cathode 12, exhaust heat of the CO shift reactor 220, or combustion heat in a combustion unit (combustor 19 in the embodiment shown in FIGS. 20 to 23) disposed upstream or downstream of the cathode 12, as described below.

In some embodiments, as shown in FIGS. 20 to 25, the carbon dioxide recovery system 4 includes a first heat exchanger 406 (at least one of heat exchangers (68, 70a to 70f, 72a to 72f, 74a and 74b) of the waste heat recovery boiler 240 in the embodiments shown in FIGS. 24 and 25) for generating steam by heat exchange with a gas including gas discharged from the cathode 12 of the fuel cell unit 404 (outlet gas of the cathode 12). Steam generated by the first heat exchanger 406 is supplied to the carbon dioxide separation unit 405, and $CO_2$ in exhaust gas from the thermal power generation device 2 is recovered using this steam.

For instance, in the exemplary embodiments shown in FIGS. 20 to 22, 24, and 25, the first heat exchanger 406 is a heat exchanger of the waste heat recovery boiler 240 configured to generate steam by heat exchange with a gas including the outlet gas of the cathode 12. The waste heat recovery boiler 240 includes a duct 53 (see FIG. 24) communicating with at least the cathode outlet passage 412, and the gas including the outlet gas of the cathode 12 may be introduced to the duct 53. The first heat exchanger 406 is disposed in the duct 53, and steam generated by the first heat exchanger 406 of the waste heat recovery boiler 240 may be supplied to the carbon dioxide separation unit 405 via a steam supply line 442 (first steam supply line 407 or second steam supply line 408).

As shown in FIGS. 20, 21, and 24, the waste heat recovery boiler 240 may be connected to the bypass passage 420 diverging from the cathode inlet passage 410, and exhaust gas from the thermal power generation device 2 may be introduced to the duct 53 via the bypass passage 420 without passing through the cathode 12 of the fuel cell 10.

Further, as shown in FIG. 20, exhaust gas introduced to the chemical absorption tower 230 via the waste heat recovery boiler 240 may be the outlet gas of the cathode 12 or may be exhaust gas flowing from the bypass passage 420, or may be both.

As shown in FIGS. 21, 24, and 25, at least a part of exhaust gas discharged from the waste heat recovery boiler 240 may be discharged to the outside through a chimney 239.

In the embodiments shown in FIGS. 20 to 25, among exhaust gas from the thermal power generation device 2, the flow rate of exhaust gas flowing through the cathode inlet passage 410 and/or the bypass passage 420 may be adjusted by a flow rate adjustment part 438.

As shown in FIGS. 20 to 24, the flow rate adjustment part 438 may be disposed downstream of the branch point between the cathode inlet passage 410 and the bypass passage (420, 421). Further, as shown in FIG. 24, the flow rate adjustment part 438 may be disposed in the duct 53 of the waste heat recovery boiler 240.

The flow rate adjustment part 438 may be a damper disposed in the duct 53 of the waste heat recovery boiler 240, the cathode inlet passage 410, or the bypass passage (420, 421).

In the exemplary embodiment shown in FIG. 23, the first heat exchanger 406 is a heat exchanger 82, disposed downstream of the regeneration heat exchanger 80 on the cathode outlet passage 412, for generating steam by heat exchange with the outlet gas of the cathode 12 having passed through the regeneration heat exchanger 80. Steam generated by the heat exchanger 82 (first heat exchanger 406) is supplied to the regeneration tower 232 (carbon dioxide separation unit 405) via a steam supply line 96 (first steam supply line 407).

As shown in FIG. 23, water produced by condensing steam supplied to the regeneration tower 232 for regenerating the absorption liquid may be introduced to the heat exchanger 82 via a passage 98 from the regeneration tower 232 so that steam is generated by heat exchange with the outlet gas of the cathode 12 at the heat exchanger 82.

In some embodiments, as shown in FIGS. 20 to 22, the carbon dioxide recovery system 4 includes a second heat exchanger 84 disposed downstream of the CO shift reactor 220 for generating steam by heat exchange with the outlet gas of the anode 16. Steam generated by the second heat exchanger 84 is supplied to the carbon dioxide separation unit 405, and $CO_2$ in exhaust gas from the thermal power generation device 2 is recovered using this steam.

For instance, in the exemplary embodiments shown in FIGS. 20 to 22, steam generated by heat exchange with the outlet gas of the anode 16 at the second heat exchanger 84 is supplied to the carbon dioxide separation unit 405 via a third steam supply line 92.

As shown in FIGS. 20 and 22, water produced by condensing steam supplied to the regeneration tower 232 for regenerating the absorption liquid may be introduced to the second heat exchanger 84 via a passage 90 from the regeneration tower 232 so that steam is generated by heat exchange with the outlet gas of the anode 16 at the second heat exchanger 84.

In some embodiments, the carbon dioxide recovery system 4 includes a combustion unit (e.g., combustor 19 in FIGS. 20 to 23) disposed upstream or downstream of the cathode 12 for increasing the temperature of the inlet gas or the outlet gas of the cathode 12. The combustion unit combusts the outlet gas of the anode 16, or the outlet gas of the anode 16 from which $CO_2$ is removed, to increase the temperature of the inlet gas or the outlet gas of the cathode 12. Using exhaust heat of the inlet gas or the outlet gas of the cathode 12 heated by combustion heat with the combustion unit, steam supplied to the carbon dioxide separation unit 405 is generated. That is, using combustion heat in the combustion unit (a kind of operation exhaust heat of the fuel cell unit 404), steam supplied to the carbon dioxide separation unit 405 is generated.

For instance, in the embodiments shown in FIGS. 20 to 23, the combustor 19 for heating the inlet gas of the cathode 12 is disposed upstream of the cathode 12. The combustor 19 may receive the outlet gas of the anode 16 from the separator 336 disposed downstream of the anode 16; i.e., after the separator 336 separates $CO_2$ from the outlet gas of the anode 16, the resulting gas containing un-combusted components (e.g., $H_2$ or CO) may be introduced to the combustor 19 via a passage not depicted in the drawings. The combustor 19 may combust the gas thus introduced from the separator 336 to increase the temperature of the inlet gas of the cathode 12. Then, at the first heat exchanger 406, steam may be generated by heat exchange with the outlet gas of the cathode 12 derived from the inlet gas of the cathode 12 heated by combustion heat of the combustor 19, and the steam may be supplied to the carbon dioxide separation unit 405 via the first steam supply line 407 or the second steam supply line 408.

According to the carbon dioxide recovery system 4 described above, the fuel cell unit 404 enables recovery of $CO_2$ while electric power is generated. Thus, it is possible to suppress the reduction in energy efficiency of the entire plant with $CO_2$ recovery. Further, since steam generated by operation exhaust heat of the fuel cell unit 404 is used to separate $CO_2$ from exhaust heat by the carbon dioxide separation unit 405, it is possible to effectively recover $CO_2$ while suppressing the reduction in energy efficiency of the entire plant.

In some embodiments, in the carbon dioxide recovery system 4, the fuel supplied to the anode 16 is reformed by fuel reforming steam generated by operation exhaust heat of the fuel cell unit 404.

As shown in FIGS. 20 to 22, steam may be generated by heat exchange with a gas including the outlet gas of the cathode at a heat exchanger (which may be the same as the heat exchanger 406) of the waste heat recovery boiler 240, and the steam may be supplied as the fuel reforming steam to an auxiliary reformer 224 via a fourth steam supply line 94.

Further, as shown in FIGS. 20 to 23, steam may be generated by heat exchange with the outlet gas of the anode 16 at a heat exchanger 86 disposed downstream of the CO shift reactor 220, and the steam may be supplied as the fuel reforming steam to the auxiliary reformer 224 via the fourth steam supply line 94.

With reference to FIGS. 24 and 25, the waste heat recovery boiler 240 according to some embodiments will be described in more detail. The waste heat recovery boiler 240 shown in FIGS. 20, 22, and 23 may have the same configuration as the waste heat recovery boiler 240 shown in FIG. 24 or 25.

As described above, to the waste heat recovery boiler 240, exhaust gas from the gas turbine 100 constituting the thermal power generation device 2 is introduced via the cathode inlet passage 410 and/or the bypass passage 420.

The waste heat recovery boiler 240 has a duct 53 connected to the cathode inlet passage 410 and/or the bypass passage 420, and exhaust gas flows through the duct 53.

In the waste heat recovery boiler 240 shown in FIG. 24, an upstream region inside the duct 53 is divided by a partition wall 52 into a first portion 56 to which exhaust gas from the cathode inlet passage 410 is introduced and a second portion 58 to which exhaust gas from the bypass passage 420 is introduced. Further, the cathode 12 of the fuel cell 10 is disposed on the first portion of the duct 53 so that exhaust gas from the cathode inlet passage 410 is supplied to the cathode 12. Further, exhaust gas flowing out of the outlet of the cathode 12 is introduced to the first portion 56 of the duct 53 downstream of the cathode 12.

Then, exhaust gas flowing from the first portion 56 via the cathode 12 of the fuel cell 10 and exhaust gas flowing from the second portion 58 without passing through the cathode 12 join downstream of the partition wall 52.

In the waste heat recovery boiler 240 shown in FIG. 24, a damper is disposed on the second portion 58 of the duct 53 as the flow rate adjustment part 438 for adjusting the flow rate of exhaust gas in the cathode inlet passage 410 and/or the bypass passage 420. In other embodiments, the flow rate adjustment part 438 (e.g., damper) may be disposed on the first portion 56 of the duct 53.

In the waste heat recovery boiler 240 shown in FIG. 25, exhaust gas is introduced into the duct 53 from the cathode inlet passage 410. Further, the cathode 12 of the fuel cell 10 is disposed in an upstream region inside the duct 53, and exhaust gas from the cathode inlet passage 410 is supplied to the cathode 12. Exhaust gas flowing out of the outlet of the cathode 12 is introduced into the duct 53 downstream of the cathode 12.

The waste heat recovery boiler 240 includes a steam circulation channel including a high-pressure steam channel 69, an intermediate-pressure steam channel 71, and a low-pressure steam channel 73 and heat exchangers (68, 70a to 70f, 72a to 72f, 74a and 74b) disposed on each steam channel. Heat-transfer tubes forming these heat exchangers are disposed so as to pass inside the duct 53. Steam circulates in the heat-transfer tubes, and heat exchange occurs between the steam circulating in the heat-transfer tubes and exhaust gas (heating medium) flowing through the duct 53.

The heat exchangers (68, 70a to 70f, 72a to 72f, 74a and 74b) may be economizers, evaporators, super-heaters, or re-heaters, for instance.

The high-pressure steam channel 69, the intermediate-pressure steam channel 71, and the low-pressure steam channel 73 are respectively provided with a high-pressure turbine 60, an intermediate-pressure turbine 62, and a low-pressure turbine 64 each of which is configured to be driven by steam from the corresponding steam channel. That is, the high-pressure steam channel 69, the intermediate-pressure steam channel 71, and the low-pressure steam channel 73 are each a turbine steam supply line for supplying turbine driving steam generated by exhaust heat recovered from exhaust gas including the outlet gas of the cathode 12 by heat exchange with exhaust gas at the heat exchanger (68, 70a to 70f, 72a to 72f, 74a and 74b) to the steam turbine (high-pressure turbine 60, intermediate-pressure turbine 62, and low-pressure turbine 64).

To each steam turbine 60, 62, 64, a generator 61, 63, 65 is connected, so that the generator 61, 63, 65 is rotary driven by the steam turbine to generate electric power.

As shown in FIGS. 24 and 25, steam used in the high-pressure turbine 60 and the intermediate-pressure turbine 62 respectively join with the intermediate-pressure steam channel 71 and the low-pressure steam channel 73, and are heated again with the heat exchangers. The steam then flows into the intermediate-pressure turbine 62 and the low-pressure turbine 64 respectively to drive the turbines.

Steam flowing out of the outlet of the low-pressure turbine 64 is condensed by a condenser 66, then becomes steam again through the heat exchanger 68, and is transferred to the high-pressure steam channel 69, the intermediate-pressure steam channel 71, or the low-pressure steam channel 73.

In the carbon dioxide recovery system 4, at least one of the heat exchangers (68, 70a to 70f, 72a to 72f, 74a and 74b) disposed inside the duct 53 of the waste heat recovery boiler 240 is the first heat exchanger 406 of the carbon dioxide recovery system 4.

For instance, in the embodiments shown in FIGS. 24 and 25, at least one of the heat exchangers disposed downstream of the cathode 12 of the fuel cell 10 inside the duct 53 is the first heat exchanger 406. In the embodiments shown in FIG. 24, at least one of the heat exchangers (68, 70a to 70e, 72a to 72e, 74a and 74b) disposed downstream of the cathode 12 is the first heat exchanger 406. In the embodiments shown in FIG. 25, at least one of the heat exchangers (68, 70a to 70c, 72a to 72c, 74a and 74b) disposed downstream of the cathode 12 is the first heat exchanger 406.

In some embodiments, steam generated by the heat exchanger (68, 70a to 70f, 72a to 72f, 74a and 74b) which is the first heat exchanger 406 is supplied to the carbon dioxide separation unit 405 via the steam supply line 442.

The steam supply line 442 may be disposed downstream of the first heat exchanger 406 in the waste heat recovery boiler 240 so as to diverge from the high-pressure steam channel 69, the intermediate-pressure steam channel 71, or the low-pressure steam channel 73.

For instance, in the embodiments shown in FIGS. 24 and 25, the steam supply line 442 diverges from the low-pressure steam channel 73 through which low-pressure steam flows. Further, steam generated by the heat exchanger (68, 70a to 70f, 72a to 72f, 74a and 74b) as the first heat exchanger 406 is supplied to the regeneration tower 232 (carbon dioxide separation unit 405) via the steam supply line 442.

In the exemplary embodiments shown in FIGS. 24 and 25, the steam supply line 442 diverges from a portion downstream of the intermediate-pressure turbine 62 and upstream of the low-pressure turbine 64. Low-pressure steam flowing downstream of the intermediate-pressure turbine 62 in the low-pressure steam channel 73 includes steam (turbine driving steam) which has been used for driving the respective steam turbines of the high-pressure turbine 60 and the intermediate-pressure turbine 62. Thus, in the embodiments shown in FIGS. 24 and 25, turbine driving steam which has been used for driving the steam turbine is supplied to the regeneration tower 232 (carbon dioxide separation unit 405) via the steam supply line 442.

By supplying the turbine driving steam after used for driving the steam turbine (high-pressure turbine 60, intermediate-pressure turbine 62, or low-pressure turbine 64) to the carbon dioxide separation unit 405 to separate $CO_2$, it is possible to effectively use the energy of the entire plant.

The steam supply line 442 may diverge upstream of the steam turbine (high-pressure turbine 60, intermediate-pressure turbine 62, or low-pressure turbine 64) in the high-pressure steam channel 69, the intermediate-pressure steam channel 71, or the low-pressure steam channel 73. Among steam generated at the heat exchanger (68, 70a to 70f, 72a to 72f, 74a and 74b) as the first heat exchanger 406, steam that does not drive the steam turbines (steam not flowing into any of the high-pressure turbine 60, the intermediate-pressure turbine 62, and the low-pressure turbine 64) may be supplied to the carbon dioxide separation unit 405.

In some embodiments, as shown in FIGS. 24 and 25, the cathode 12 of the fuel cell unit 404 is disposed inside the duct 53 between a pair of adjacent heat exchangers of the heat exchangers (68, 70a to 70f, 72a to 72f, 74a and 74b), in a flow direction of exhaust gas in the duct 53 of the waste heat recovery boiler 240.

For instance, in the embodiment shown in FIG. 24, the cathode 12 of the fuel cell unit 404 is disposed between a heat exchanger 70f and a heat exchanger 70e which are adjacent to each other in the exhaust gas flow direction in the duct 53. Alternatively, in the embodiment shown in FIG. 25, the cathode 12 of the fuel cell unit 404 is disposed between a heat exchanger 70d and a heat exchanger 70e or 72e which are adjacent to each other in the exhaust gas flow direction in the duct 53.

Thus, a part of exhaust heat of exhaust gas before flowing into the cathode 12 is recovered at the heat exchanger (heat exchanger 70f in FIG. 24, heat exchanger 70d in FIG. 25) disposed upstream of the cathode 12. This prevents the temperature of exhaust gas at the cathode outlet from excessively increasing, thus enabling $CO_2$ recovery by the fuel cell unit 404 while ensuring the durability of the waste heat recovery boiler 240 (e.g., duct) or the fuel cell 10.

The duct 53 of the waste heat recovery boiler 240 to which exhaust gas of the thermal power generation device 2 is introduced may be formed by a contiguous duct tube, or may be formed by two or more duct tubes communicating with each other and each provided with the heat exchanger therein. For instance, the duct 53 may be formed by connecting an existing duct tube in which multiple heat exchangers are disposed with another duct tube in which the heat exchanger and the cathode 12 of the fuel cell 10 are disposed.

In some embodiments, the carbon dioxide recovery system 4 is configured to further heat steam which recovers heat of exhaust gas of the gas turbine 100, by operation exhaust gas of the fuel cell unit 404.

For instance, in the exemplary embodiment shown in FIG. 25, the heat-transfer tubes of the waste heat recovery boiler 240 include a heat exchanger 70d disposed upstream of the cathode 12 and a heat exchanger 70e disposed downstream of the cathode 12, on the high-pressure steam channel 69. At the heat exchanger 70d upstream of the cathode 12, heat exchange occurs between exhaust gas introduced to the duct 53 of the waste heat recovery boiler 240 from the gas turbine 100 and steam flowing through the heat exchanger 70d to transfer heat of the exhaust gas from the gas turbine 100 to the steam. Further, at the heat exchanger 70e downstream of the cathode 12, heat exchange occurs between the anode outlet gas with high temperature discharged from the cathode 12 and the steam after receiving heat of the exhaust gas at the heat exchanger 70d to further heat the steam.

Additionally, in the exemplary embodiment shown in FIG. 25, the heat-transfer tubes of the waste heat recovery boiler 240 include a heat exchanger 72d disposed upstream of the cathode 12 and a heat exchanger 72e disposed downstream of the cathode 12, on the intermediate-pressure steam channel 71. At the heat exchanger 72d upstream of the cathode 12, heat exchange occurs between exhaust gas introduced to the duct 53 of the waste heat recovery boiler 240 from the gas turbine 100 and steam flowing through the heat exchanger 72d to transfer heat of the exhaust gas from the gas turbine 100 to the steam. Further, at the heat exchanger 72e downstream of the cathode 12, heat exchange occurs between the anode outlet gas with high temperature discharged from the cathode 12 and the steam after receiving heat of the exhaust gas at the heat exchanger 72d to further heat the steam.

By pre-heating steam using exhaust heat of the gas turbine 100 and then further heating the steam using operation exhaust heat of the fuel cell unit 404, steam with higher temperature is obtained, which increases the efficiency of the entire plant.

In some embodiments, the carbon dioxide recovery system 4 is configured to recover operation exhaust heat of the fuel cell unit 404 to supercritical steam.

For instance, in the exemplary embodiments shown in FIGS. 24 and 25, among the heat exchangers (70a to 70f) disposed on the high-pressure steam channel 69, supercritical steam may flow in at least one (e.g. heat exchanger 70e in FIG. 24, heat exchanger 70e in FIG. 25) of the heat exchangers disposed downstream of the cathode in the duct 53 of the waste heat recovery boiler 240. In this case, operation exhaust heat of the fuel cell unit 404 is recovered to the supercritical steam by heat exchange between the cathode outlet gas of the fuel cell 10 and the supercritical steam flowing through the above-described heat exchanger. Then, the supercritical steam which receives operation exhaust heat of the fuel cell unit 404 flows into the high-pressure turbine 60 and drives the high-pressure turbine 60.

Thus, by recovering operation exhaust heat of the fuel cell unit 404 to the supercritical steam, it is possible to effectively use the operation exhaust heat with high temperature of the fuel cell unit 404 to improve the efficiency of the plant.

While FIGS. 24 and 25 show an example of the thermal power generation facility 1 including the carbon dioxide recovery system 4, the present invention is not limited thereto and widely covers a plant configured to recover operation exhaust heat of the fuel cell unit 404 to supercritical steam, regardless of presence or absence of the carbon dioxide recovery system 4. That is, the plant according to some embodiments of the present invention includes a fuel cell unit including an anode, a cathode, and an electrolyte disposed between the anode and the cathode and is configured to recover operation exhaust heat of the fuel cell unit to supercritical steam. In this case, the supercritical steam may be generated by using operation exhaust heat of the fuel cell unit 404 through heat exchange between exhaust gas having passed through the cathode 12 of the fuel cell unit 404 and steam at the first heat exchanger 406. The supercritical steam thus generated may be used for driving the high-pressure turbine 60, as described above.

The present invention is not limited to the examples shown in FIGS. 24 and 25 and widely covers a plant configured to further heat the steam after recovering exhaust gas of the gas turbine 100, using operation exhaust heat of the fuel cell unit 404, regardless of presence or absence of the carbon dioxide recovery system 4. That is, the plant according to some embodiments of the present invention includes a gas turbine, a fuel cell unit driven by exhaust gas of the gas turbine, a third heat exchanger (heat exchanger 70d in the example shown in FIG. 25) for heat exchange between steam and exhaust gas of the gas turbine before flowing into the fuel cell unit, and a fourth heat exchanger (heat exchanger 70e in the example shown in FIG. 25), disposed downstream of the third heat exchanger on a flow path of the steam, for heat exchange between the exhaust gas having passed through the fuel cell unit and the steam heated at the third heat exchanger. In this case, supercritical steam may be generated at the fourth heat exchanger. The supercritical steam thus generated may be used for driving the high-pressure turbine 60, as described above.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function. For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

REFERENCE SIGNS LIST

1 Thermal power generation facility
2 Thermal power generation device
4 Carbon dioxide recovery system
5 Control part
6 First exhaust gas passage
7 Flow rate adjustment part
8 Second exhaust gas passage
9 Discharge line
10 Fuel cell
10a Fuel cell unit
12 Cathode
12a Cathode inlet
12b Cathode outlet
14 Electrolyte
15 Anode inlet passage
16 Anode
17 Anode outlet passage
18 Reformation part
19 Combustor
20 Fuel storage part
22 Fuel supply passage
24 Combustor
26 Auxiliary reformer
28 Heat exchanger
30 CO transformer
32 Cooler
34 Compressor
36 Separator
40 Compressor
42 Steam turbine
44 Waste heat recovery boiler
44A First waste heat recovery boiler
44B Second waste heat recovery boiler
46 Chimney
48 Chemical absorption tower
48a Outlet
50 Regeneration tower
7 Steam supply channel
52 Partition wall
53 Duct
54 Duct
55 Duct wall
56 First portion
58 Second portion
60 High-pressure turbine
61 Generator
62 Intermediate-pressure turbine
63 Generator
64 Low-pressure turbine
65 Generator
66 Condenser
68 Heat exchanger
69 High-pressure steam channel
70a to 70f Heat exchanger
71 Intermediate-pressure steam channel
72a to 72f Heat exchanger
73 Low-pressure steam channel
74a and 74b Heat exchanger
76 Heat-transfer tube
80 Regeneration heat exchanger
82 Heat exchanger
84 Second heat exchanger
86 Heat exchanger
90 Passage
92 Third steam supply line
94 Fourth steam supply line
96 Steam supply line
98 Passage
100 Gas turbine
102 Compressor
103 Rotational shaft
104 Combustor
106 Turbine
108 Generator
110 Waste heat recovery boiler
112 Steam turbine
114 Generator
120 Chemical absorption tower
120a Outlet
122 Absorption liquid regeneration tower
124 Heat exchanger
126 Chimney
128 Fuel storage part
130 Combustor
132 Auxiliary reformer
134 Heat exchanger
136 Compressor
138 Separator
140 Compressor
142 Desulfurization device
144 Dust removal device
146 Anode inlet passage
148 Anode outlet passage
150 Fuel supply passage
152 Fuel supply passage
209 Compressor 220 CO shift reactor
222 Fuel storage part
224 Auxiliary reformer
226 Heat exchanger
228 $CO_2$-rich gas line
230 Chemical absorption tower
230a Outlet
232 Regeneration tower
233 Discharge line
234 Compressor
236 Gas separation unit
237 Separation membrane
239 Chimney
240 Waste heat recovery boiler
242 Steam turbine
244 Generator
250 Combustor
252 Recycle line
254 Hz-rich gas line
270 Cathode inlet passage
272 Cathode outlet passage
274 Fuel supply passage
276 Anode inlet passage
278 Bypass passage
280 Heat exchanger
336 Separator
337 $CO_2$ separation membrane
350 Oxygen supply part
352 Oxygen production device
354 Oxidation reaction unit
356 Flow rate adjustment value
358 Concentration sensor
360 Controller
362 Heat exchanger
364 Heat exchanger
404 Fuel cell unit
405 Carbon dioxide separation unit
406 First heat exchanger
407 First steam supply line
408 Second steam supply line
409 Compressor
438 Flow rate adjustment part
442 Steam supply line
410 Cathode inlet passage
412 Cathode outlet passage
414 Anode inlet passage
416 Anode outlet passage
418 Fuel supply passage
420 Bypass passage
421 Bypass passage

The invention claimed is:

1. A carbon dioxide recovery system for collecting carbon dioxide from an exhaust gas generated in a facility including a combustion device, the carbon dioxide recovery system comprising:
a first exhaust gas passage through which the exhaust gas containing carbon dioxide flows;
a fuel cell including an anode, a cathode disposed on the first exhaust gas passage so that the exhaust gas from the first exhaust gas passage is supplied to the cathode, and an electrolyte transferring, from the cathode to the anode, a carbonate ion derived from carbon dioxide contained in the exhaust gas from the first exhaust gas passage; and
a second exhaust gas passage diverging from the first exhaust gas passage upstream of the cathode so as to bypass the cathode,
wherein the second exhaust gas passage is configured to guide a part of the exhaust gas toward a downstream side of the combustion device, and
wherein the following relationship is satisfied, F*min≤FFC RATED≤F*max
where FFC RATED is a treatment flow rate of the exhaust gas during rated operation of the fuel cell, F*min is a total flow rate of the exhaust gas during operation at 30% load of the facility including the combustion device, and F*max is a total flow rate of the exhaust gas during operation at 80% load of the facility.

2. The carbon dioxide recovery system according to claim 1,
wherein a treatment flow rate of the exhaust gas during rated operation of the fuel cell is smaller than a total flow rate of the exhaust gas during rated operation of the facility.

3. The carbon dioxide recovery system according to claim 1,
wherein the facility is a gas turbine, and the cathode of the fuel cell is disposed downstream of the gas turbine and upstream of a first waste heat recovery boiler for recovering exhaust heat of the gas turbine,
wherein the second exhaust gas passage bypasses the cathode and is connected to a second waste heat recovery boiler for recovering exhaust heat of the gas turbine, and
wherein a part of the exhaust gas of the gas turbine is introduced to the second waste heat recovery boiler via the second exhaust gas passage at least during rated operation of the gas turbine.

4. The carbon dioxide recovery system according to claim 3, further comprising a chemical absorption tower disposed on the second exhaust gas passage downstream of the second waste heat recovery boiler and having an absorption liquid for absorbing carbon dioxide contained in the exhaust gas from the second waste heat recovery boiler,
wherein the first exhaust gas passage and the second exhaust gas passage are disposed independently of each other so as to prevent the exhaust gas flowing through the first exhaust gas passage from mixing with the exhaust gas flowing from the second waste heat recovery boiler to the chemical absorption tower through the second exhaust gas passage, on a downstream side of the first waste heat recovery boiler.

5. The carbon dioxide recovery system according to claim 3,
wherein a first heat exchanger disposed on a most upstream side in the first waste heat recovery boiler obtains a heating medium having higher temperature than that a second heat exchanger disposed on a most upstream side in the second waste heat recovery boiler obtains by heat exchange.

6. The carbon dioxide recovery system according to claim 3, comprising a flow rate adjustment part for adjusting a first flow rate of the exhaust gas supplied to the cathode via the first exhaust gas passage,
wherein the first waste heat recovery boiler and the second waste heat recovery boiler include:
a common duct; and
a partition wall disposed in the common duct so that at least an upstream region of the common duct is divided into a first portion at least partially forming the first exhaust gas passage and a second portion at least partially forming the second exhaust gas passage, and wherein the flow rate adjustment part includes a damper disposed on the first portion or the second portion of the common duct.

7. The carbon dioxide recovery system according to claim 3, further comprising:
a chemical absorption tower disposed on the second exhaust gas passage and having an absorption liquid for absorbing carbon dioxide contained in the exhaust gas flowing through the second exhaust gas passage; and
a regeneration tower configured to heat the absorption liquid by steam generated by thermal energy recovered from the exhaust gas at the first waste heat recovery boiler or the second waste heat recovery boiler to regenerate the absorption liquid.

8. The carbon dioxide recovery system according to claim 3, further comprising:
a compressor for compressing at least carbon dioxide recovered at the anode by the fuel cell; and
a steam turbine for driving the compressor,
wherein the steam turbine is configured to be driven by steam generated by thermal energy recovered from the exhaust gas at the first waste heat recovery boiler or the second waste heat recovery boiler.

9. The carbon dioxide recovery system according to claim 1, further comprising a heat exchanger for heat exchange between the exhaust gas on an inlet side of the cathode in the first exhaust gas passage and the exhaust gas on an outlet side of the cathode in the first exhaust gas passage.

10. The carbon dioxide recovery system according to claim 1, further comprising a desulfurization device disposed on the first exhaust gas passage upstream of a branch point between the first exhaust gas passage and the second exhaust gas passage, the desulfurization device being configured to remove sulfur contents contained in the exhaust gas.

11. The carbon dioxide recovery system according to claim 1, further comprising a dust removal device disposed on the first exhaust gas passage downstream of a branch point between the first exhaust gas passage and the second exhaust gas passage and upstream of the cathode, the dust removal device being configured to remove soot and dust in the exhaust gas to be supplied to the cathode.

12. A thermal power generation facility comprising:
a thermal power generation device which is a facility including a combustion device; and
the carbon dioxide recovery system according to claim 1 configured to recover carbon dioxide contained in an exhaust gas from the thermal power generation device.

13. The carbon dioxide recovery method according to claim 1, further comprising performing heat exchange between the exhaust gas on an inlet side of the cathode and the exhaust gas on an outlet side of the cathode.

14. A carbon dioxide recovery system for collecting carbon dioxide from an exhaust gas generated in a facility including a combustion device, the carbon dioxide recovery system comprising:
a first exhaust gas passage through which the exhaust gas containing carbon dioxide flows;
a fuel cell including an anode, a cathode disposed on the first exhaust gas passage so that the exhaust gas from the first exhaust gas passage is supplied to the cathode, and an electrolyte transferring, from the cathode to the anode, a carbonate ion derived from carbon dioxide contained in the exhaust gas from the first exhaust gas passage;
a second exhaust gas passage diverging from the first exhaust gas passage upstream of the cathode so as to bypass the cathode, wherein a part of the exhaust gas is introduced to the second exhaust gas passage; and
a flow rate adjustment part for adjusting a first flow rate of the exhaust gas supplied to the cathode via the first exhaust gas passage.

15. The carbon dioxide recovery system according to claim 14, further comprising a control part for controlling the flow rate adjustment part,
wherein the control part is configured to control the flow rate adjustment part so that the first flow rate is kept constant at a rated flow rate of the fuel cell in at least a partial load range of the facility including the combustion device, regardless of magnitude of load of the facility.

16. The carbon dioxide recovery system according to claim 14,
wherein the flow rate adjustment part includes a damper disposed on the first exhaust gas passage or the second exhaust gas passage, and
wherein the first exhaust gas passage and the second exhaust gas passage are disposed independently of each other at least upstream of an installation position of the damper.

17. The carbon dioxide recovery system according to claim 14, wherein, in at least a partial load range of the facility where a total flow rate of the exhaust gas from the facility is less than a treatment flow rate of the exhaust gas during rated operation of the fuel cell, the exhaust gas is supplied to the fuel cell at the first flow rate that is equal to the total flow rate of the exhaust gas.

18. A carbon dioxide recovery system for collecting carbon dioxide from an exhaust gas generated in a facility including a combustion device, the carbon dioxide recovery system comprising:
a first exhaust gas passage through which the exhaust gas containing carbon dioxide flows;
a fuel cell including an anode, a cathode disposed on the first exhaust gas passage so that the exhaust gas from the first exhaust gas passage is supplied to the cathode, and an electrolyte transferring, from the cathode to the anode, a carbonate ion derived from carbon dioxide contained in the exhaust gas from the first exhaust gas passage; and
a second exhaust gas passage diverging from the first exhaust gas passage upstream of the cathode so as to bypass the cathode, wherein the second exhaust gas passage is configured to guide a part of the exhaust gas toward a downstream side of the combustion device; and
a chemical absorption tower disposed on the second exhaust gas passage and having an absorption liquid for absorbing carbon dioxide contained in the exhaust gas supplied from the second exhaust gas passage.

19. The carbon dioxide recovery system according to claim 18, wherein the absorption liquid contains amine.

* * * * *